US009449051B2

(12) United States Patent
Iwasaki et al.

(10) Patent No.: US 9,449,051 B2
(45) Date of Patent: Sep. 20, 2016

(54) TOPIC EXTRACTION APPARATUS AND PROGRAM

(71) Applicants: Kabushiki Kaisha Toshiba, Minato-ku (JP); Toshiba Solutions Corporation, Minato-ku (JP)

(72) Inventors: Hideki Iwasaki, Fuchu (JP); Kazuyuki Goto, Kawasaki (JP); Shigeru Matsumoto, Nishitokyo (JP); Yasunari Miyabe, Fuchu (JP); Mikito Kobayashi, Fuchu (JP)

(73) Assignees: KABUSHIKI KAISHA TOSHIBA, Minato-ku (JP); TOSHIBA SOLUTIONS CORPORATION, Minato-ku (JP)

( * ) Notice: Subject to any disclaimer, the term of this patent is extended or adjusted under 35 U.S.C. 154(b) by 342 days.

(21) Appl. No.: 14/023,108

(22) Filed: Sep. 10, 2013

(65) Prior Publication Data

US 2014/0019445 A1 Jan. 16, 2014

Related U.S. Application Data

(63) Continuation of application No. PCT/JP2012/056004, filed on Mar. 8, 2012.

(30) Foreign Application Priority Data

Mar. 11, 2011 (JP) ................................ 2011-054497

(51) Int. Cl.
*G06F 17/30* (2006.01)
*G06F 7/00* (2006.01)
*G06F 17/27* (2006.01)

(52) U.S. Cl.
CPC ....... *G06F 17/3053* (2013.01); *G06F 17/2775* (2013.01)

(58) Field of Classification Search
CPC ...................... G06F 17/3071; G06F 17/30864
See application file for complete search history.

(56) References Cited

U.S. PATENT DOCUMENTS 6,366,908 B1 * 4/2002 Chong .............. G06F 17/30616
2008/0033938 A1 * 2/2008 Okamoto .......... G06F 17/30731

(Continued)

FOREIGN PATENT DOCUMENTS

CN 101118560 A 2/2008
JP 2000-194745 7/2000

(Continued)

OTHER PUBLICATIONS

International Search Report mailed May 1, 2012, in PCT/JP2012/056004 filed Mar. 8, 2012 (with English Translation).

(Continued)

*Primary Examiner* — Sangwoo Ahn
(74) *Attorney, Agent, or Firm* — Oblon, McClelland, Maier & Neustadt, L.L.P.

(57) ABSTRACT

According to one embodiment, a topic extracting apparatus extracts each term from a target document set, and calculates an appearance frequency of each term and a document frequency that each term appears. The topic extracting apparatus acquires a document set of appearance documents with respect to each extracted term, calculates a topic degree, extracts each term whose topic degree is not lower than a predetermined value as a topic word, and calculates freshness of the extracted topic word based on an appearance date and time. The topic extracting apparatus presents the extracted topic words in order of the freshness and also presents the number of appearance documents of each presented topic word per unit span.

17 Claims, 43 Drawing Sheets

(56) References Cited

U.S. PATENT DOCUMENTS

| | | | | |
|---|---|---|---|---|
| 2008/0319746 | A1* | 12/2008 | Okamoto | G06F 17/30719 704/245 |
| 2011/0219001 | A1* | 9/2011 | Marik | G06F 17/30 707/738 |

FOREIGN PATENT DOCUMENTS

| | | |
|---|---|---|
| JP | 2005-258678 | 9/2005 |
| JP | 2005-316899 | 11/2005 |
| JP | 2008-40636 | 2/2008 |
| JP | 4234740 | 12/2008 |
| JP | 4342575 | 7/2009 |

OTHER PUBLICATIONS

International Written Opinion mailed May 1, 2012, in PCT/JP2012/056004 filed Mar. 8, 2012.

Takayuki Adachi et al., "Wadaigo Chushutsu Kino o Motta News Stream Etsuran System", Proceedings of the $10^{th}$ annual meeting of the Association for Natural Language Processing , The Association for Natural Language Processing, Mar. 16, 2004, 5 pages.

Toshiaki Fujiki et al., "Identification of bursts in a document stream", IPSJ SIG Technical Report 2004-NL-160 (13), Mar. 5, 2004, pp. 85-92.

Combined Chinese Office Action and Search Report issued Nov. 30, 2015 in Patent Application No. 201280004293.X (with English language translation).

* cited by examiner

| | | |
|---|---|---|
| 11 | Document ID | d001 |
| 12 | Title | Foot-and-mouth disease, accidents in line of duty due to destruction |
| 13 | Body text | Due to epidemic of foot-and-mouth disease, destruction or burying work of farm animals continues in XX prefecture. Prefectural civil servants involved in this destruction work got burned with lime, and personnel section in prefecture had dozens of inquiries about applications for accidents in line of duty till 26th. Three applications have been already submitted, and they are expected to be acknowledged |
| 14 | Date of submission | 2008/05/08 |

FIG. 2

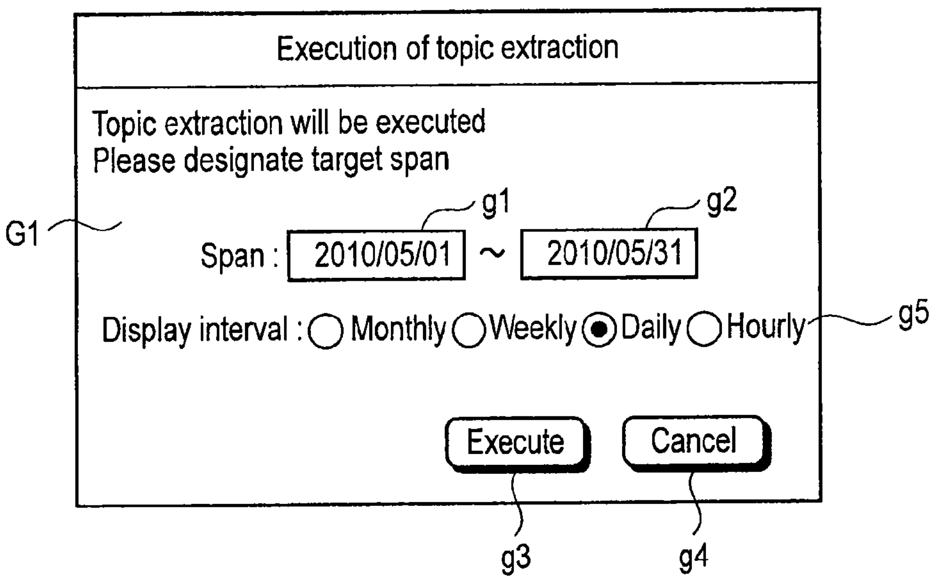

Politics

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| Mr./Ms. X(93) | 0 | 0 | 0 | 3 | 1 | 1 | 0 | 1 | 1 | 0 | 2 | 1 | 1 | 0 | 0 | 2 | 1 | 0 | 1 | 1 | 1 | 0 | 1 | 1 | 0 | 2 | 4 | 15 | 14 | 26 | 13 |
| Resignation(90) | 0 | 2 | 0 | 1 | 0 | 0 | 0 | 0 | 0 | 1 | 2 | 1 | 0 | 0 | 0 | 0 | 0 | 1 | 0 | 0 | 0 | 1 | 2 | 1 | 2 | 3 | 32 | 27 | 8 | 4 | 2 |
| Retreat(66) | 1 | 1 | 0 | 1 | 1 | 0 | 0 | 2 | 0 | 0 | 2 | 1 | 0 | 0 | 0 | 0 | 0 | 0 | 1 | 0 | 0 | 1 | 1 | 1 | 3 | 3 | 12 | 28 | 5 | 1 | 1 |
| Dismissal(27) | 0 | 0 | 0 | 0 | 0 | 0 | 0 | 0 | 0 | 0 | 0 | 0 | 0 | 0 | 0 | 0 | 0 | 0 | 0 | 0 | 2 | 2 | 11 | 1 | 6 | 0 | 1 | 3 | 0 | 1 | 0 |
| Defection(49) | 1 | 0 | 0 | 0 | 0 | 0 | 0 | 0 | 0 | 0 | 1 | 3 | 0 | 0 | 1 | 0 | 0 | 1 | 1 | 3 | 2 | 1 | 3 | 2 | 7 | 4 | 9 | 4 | 0 | 4 | 2 |
| Statement(66) | 0 | 0 | 0 | 0 | 0 | 0 | 0 | 0 | 0 | 0 | 0 | 1 | 0 | 1 | 1 | 3 | 1 | 3 | 1 | 5 | 4 | 9 | 13 | 3 | 3 | 1 | 5 | 5 | 2 | 3 | 2 |
| Prime minister (330) | 10 | 8 | 1 | 8 | 6 | 5 | 7 | 5 | 5 | 2 | 8 | 10 | 5 | 9 | 8 | 8 | 5 | 9 | 14 | 7 | 7 | 11 | 17 | 5 | 10 | 10 | 39 | 36 | 19 | 26 | 10 |
| Foot-and-mouth disease(62) | 0 | 0 | 0 | 1 | 0 | 1 | 0 | 0 | 0 | 1 | 2 | 5 | 5 | 3 | 2 | 1 | 2 | 2 | 4 | 3 | 2 | 6 | 2 | 2 | 5 | 4 | 2 | 1 | 2 | 1 | 3 |
| Coalition(101) | 4 | 3 | 0 | 4 | 3 | 2 | 1 | 0 | 0 | 0 | 4 | 3 | 1 | 0 | 2 | 1 | 1 | 5 | 5 | 3 | 3 | 4 | 9 | 3 | 8 | 5 | 11 | 5 | 1 | 8 | 2 |
| Transfer(214) | 8 | 7 | 1 | 7 | 7 | 5 | 7 | 8 | 3 | 2 | 8 | 7 | 4 | 5 | 5 | 5 | 2 | 9 | 9 | 1 | 3 | 2 | 7 | 6 | 9 | 5 | 14 | 12 | 4 | 8 | 6 |
| | '10 May 1 | '10 May 2 | '10 May 3 | '10 May 4 | '10 May 5 | '10 May 6 | '10 May 7 | '10 May 8 | '10 May 9 | '10 May 10 | '10 May 11 | '10 May 12 | '10 May 13 | '10 May 14 | '10 May 15 | '10 May 16 | '10 May 17 | '10 May 18 | '10 May 19 | '10 May 20 | '10 May 21 | '10 May 22 | '10 May 23 | '10 May 24 | '10 May 25 | '10 May 26 | '10 May 27 | '10 May 28 | '10 May 29 | '10 May 30 | '10 May 31 |

FIG. 4

TDT : Term Document table

TDT_f TDT_df TDT_tf TDT_L1

| Term | Appearance frequency | | | | | All documents | |
|---|---|---|---|---|---|---|---|
| | d001 | d002 | d003 | d004 | ... | Document frequency | Term frequency |
| Foot-and-mouth disease | 2 | 3 | 0 | 0 | ... | OO | XX |
| Prefecture | 1 | 5 | 1 | 2 | ... | OO | XX |
| Infection | 0 | 2 | 0 | 0 | ... | OO | XX |
| Futenma | 0 | 5 | 2 | 1 | ... | OO | XX |
| Tokunoshima | 0 | 5 | 0 | 0 | ... | OO | XX |
| Transfer | 0 | 1 | 1 | 0 | ... | OO | XX |
| Stud bull | 0 | 0 | 5 | 3 | ... | OO | XX |
| Henoko | | | | | | | |
| Destruction | 2 | 0 | | | | | |
| : | : | : | : | : | | | |

F I G. 5

TST : Term span table

TST_tid TST_t TST_spn

| Term ID | Term | Span |
|---|---|---|
| t0001 | Foot-and-mouth disease | 2010/05/01~2010/05/31 |
| t0002 | Infection | 2010/05/01~2010/05/31 |
| t0003 | Futenma | 2010/05/01~2010/05/31 |
| t0004 | Tokunoshima | 2010/05/01~2010/05/31 |
| t0005 | Transfer | 2010/05/01~2010/05/31 |
| t0006 | Stud bull | 2010/05/01~2010/05/31 |
| t0007 | Henoko | 2010/05/01~2010/05/31 |
| t0008 | Destruction | 2010/05/01~2010/05/31 |
| : | : | : |

FIG. 6

TWT : Topic word table

After topic word extraction processing

| Term ID (TWT_tid) | Term (TWT_t) | Span (TWT_spn) | Appearance document (TWT_did) | Document frequency (TWT_df) | Term frequency (TWT_tf) | Topic degree (TWT_score) | Freshness (TWT_fresh) | Parent term (TWT_root) |
|---|---|---|---|---|---|---|---|---|
| TWT_L1 t0001 | Foot-and -mouth disease | 2010/05/01~2010/05/31 | d001, d002, d006, ... | ○○ | ×× | △△ | ◇◇ | |
| TWT_L2 t0002 | Infection | 2010/05/01~2010/05/31 | d001, d002, d006, ... | ○○ | ×× | △△ | ◇◇ | |
| t0003 | Futenma | 2010/05/01~2010/05/31 | d001, d002, d006, ... | ○○ | ×× | △△ | ◇◇ | |
| t0004 | Tokunoshima | 2010/05/01~2010/05/31 | d001, d002, d006, ... | ○○ | ×× | △△ | ◇◇ | |
| t0005 | Transfer | 2010/05/01~2010/05/31 | d001, d002, d006, ... | ○○ | ×× | △△ | ◇◇ | |
| t0006 | Stud bull | 2010/05/01~2010/05/31 | d001, d002, d006, ... | ○○ | ×× | △△ | ◇◇ | |
| t0007 | Henoko | 2010/05/01~2010/05/31 | d001, d002, d006, ... | ○○ | ×× | △△ | ◇◇ | |
| t0008 | Destruction | 2010/05/01~2010/05/31 | d001, d002, d006, ... | ○○ | ×× | △△ | ◇◇ | |
| : | : | : | : | : | : | : | : | |

F I G. 7

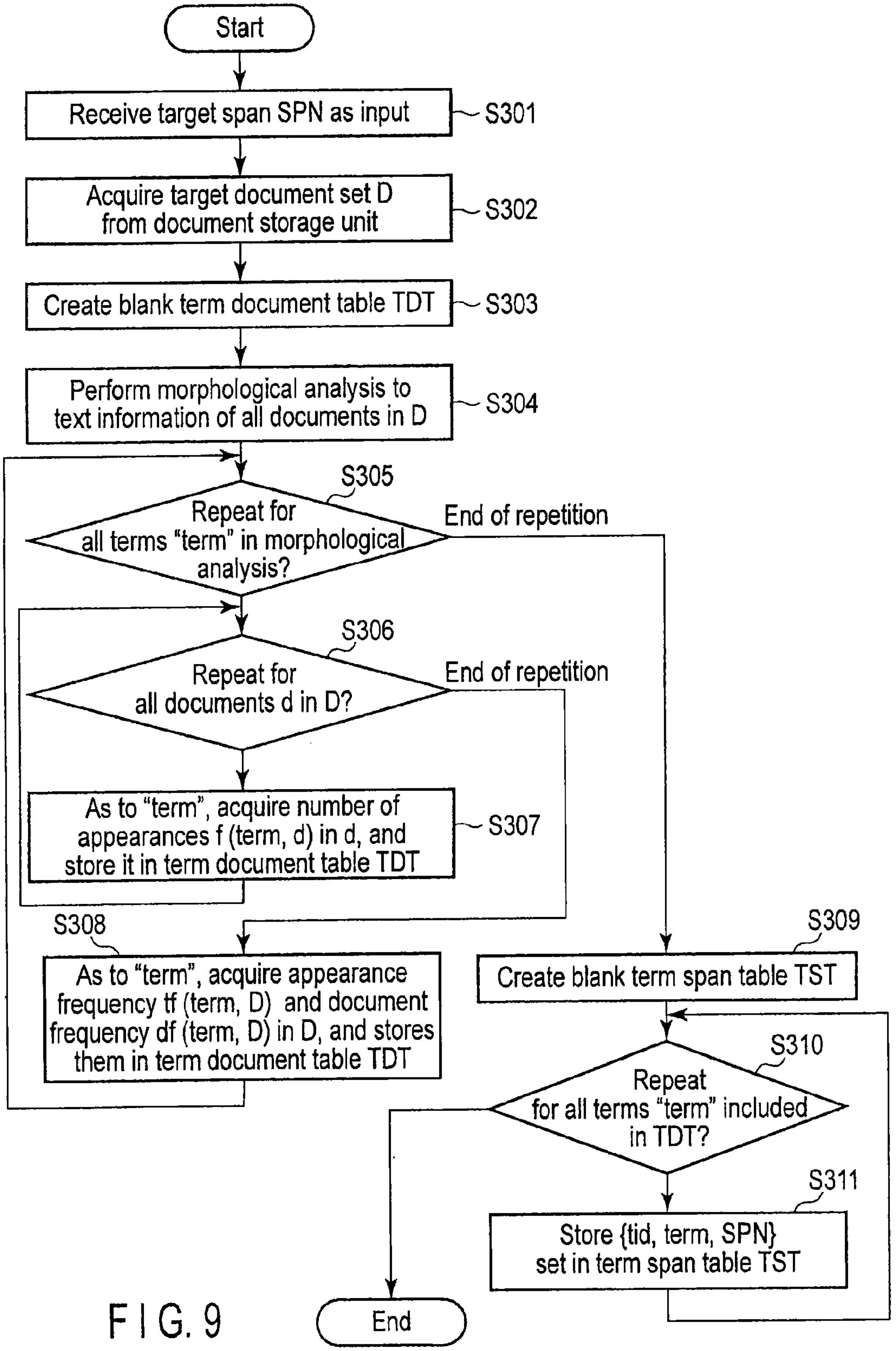
F I G. 9

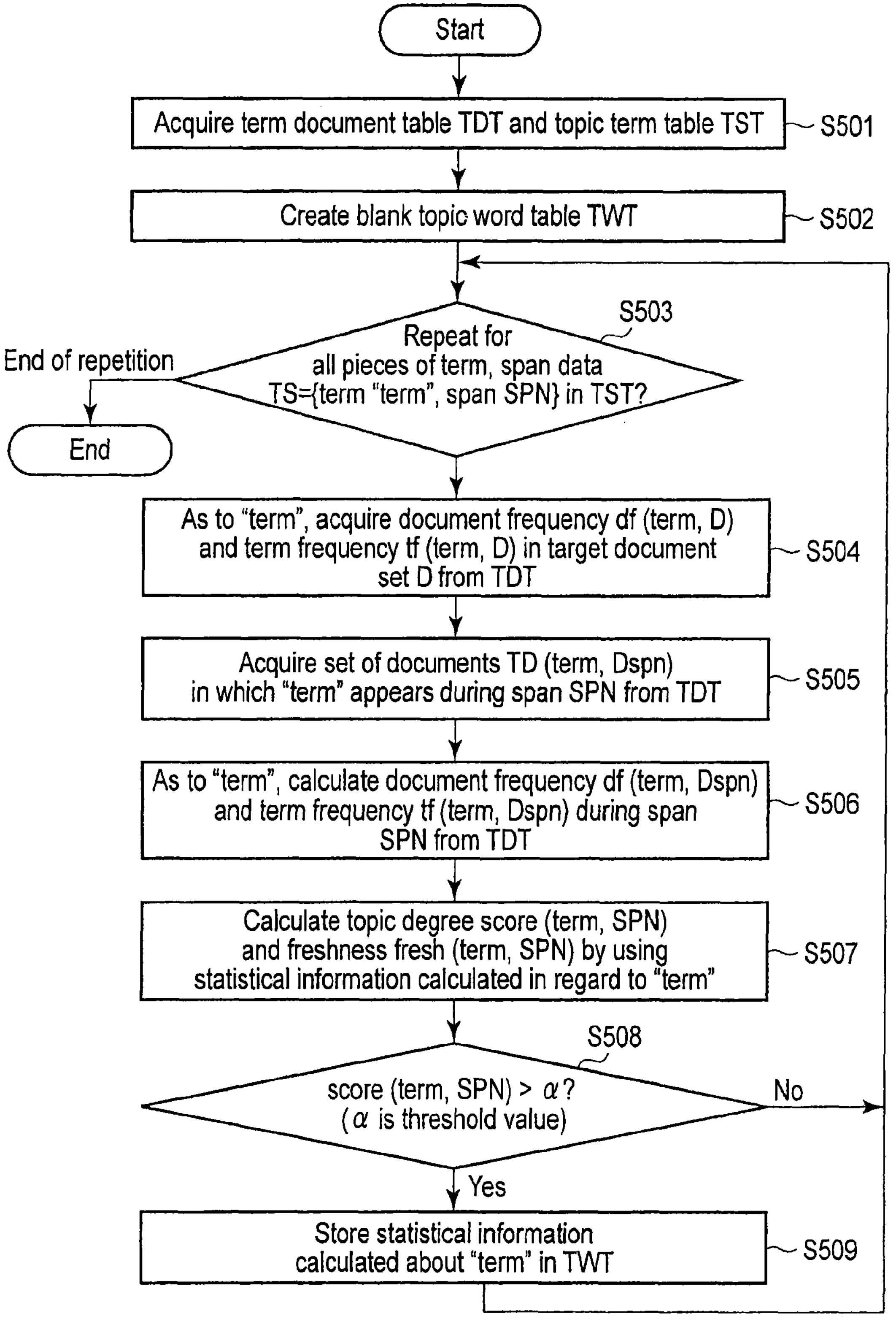
F I G. 10

TWT : Topic word table

After topic word aggregation processing

| | Term ID (TWT_tid) | Term (TWT_t) | Span (TWT_spn) | Appearance document (TWT_did) | Document frequency (TWT_df) | Term frequency (TWT_tf) | Topic degree (TWT_score) | Freshness (TWT_fresh) | Parent term (TWT_root) |
|---|---|---|---|---|---|---|---|---|---|
| TWT_L1' | t0001 | Foot-and-mouth disease, infection | 2010/05/01～2010/05/31 | d001, d002, d006, ... | ○○ | ×× | △△ | ◇◇ | |
| TWT_L2' | t0003 | Futenma, Base | 2010/05/01～2010/05/31 | d001, d002, d006, ... | ○○ | ×× | △△ | ◇◇ | |
| TWT_L3' | t0004 | Tokunoshima | 2010/05/01～2010/05/31 | d001, d002, d006, ... | ○○ | ×× | △△ | ◇◇ | |
| TWT_L4' | t0005 | Transfer, outside prefecture | 2010/05/01～2010/05/31 | d001, d002, d006, ... | ○○ | ×× | △△ | ◇◇ | |
| TWT_L5' | t0006 | Stud bull, destruction | 2010/05/01～2010/05/31 | d001, d002, d006, ... | ○○ | ×× | △△ | ◇◇ | |
| TWT_L6' | t0007 | Henoko | 2010/05/01～2010/05/31 | d001, d002, d006, ... | ○○ | ×× | △△ | ◇◇ | |
| | : | : | : | : | : | : | : | : | |

F I G. 13

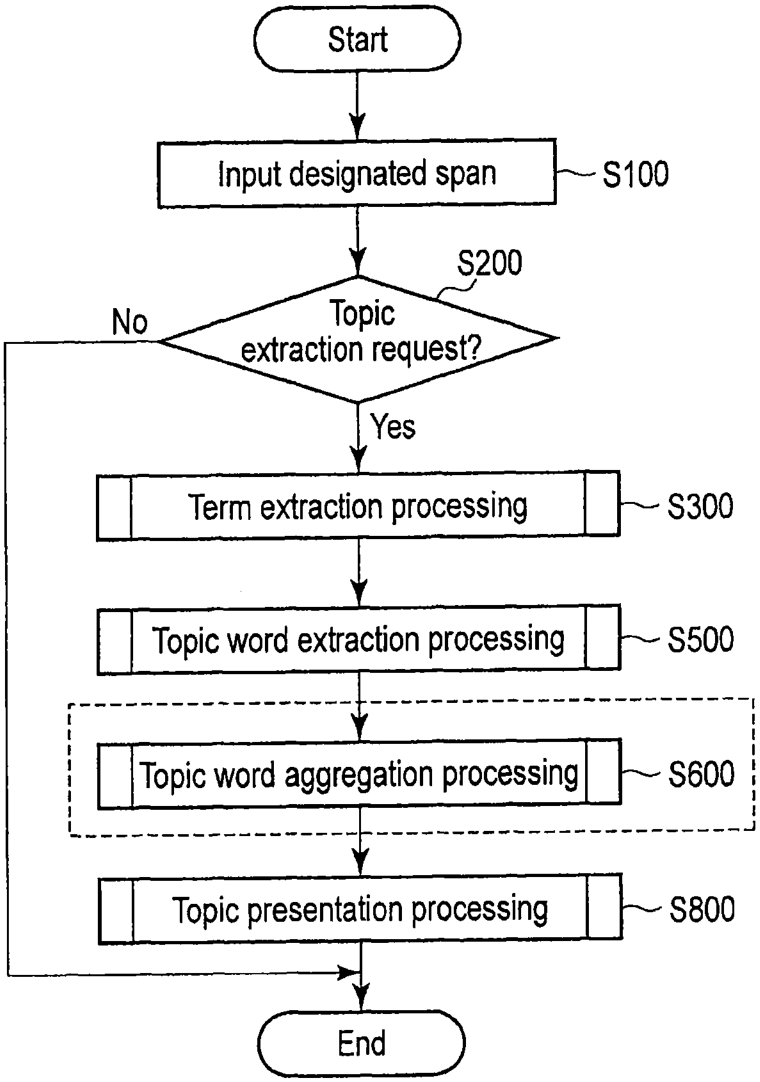
F I G. 14

G20

| Topic word | 5/1 | 5/2 | 5/3 | 5/4 | 5/5 | 5/6 | 5/7 | 5/8 | 5/9 | 5/10 | 5/11 | 5/12 | 5/13 |
|---|---|---|---|---|---|---|---|---|---|---|---|---|---|
| Foot-and-mouth disease, infection | 1 | 1 | 5 | 7 | 1 | 6 | 8 | 3 | 6 | 1 | 5 | 4 | 6 |
| Futenma, base | 2 | 4 | 5 | 8 | 2 | 8 | 10 | 1 | 9 | 9 | 9 | 14 | 10 |
| Tokunoshima | 0 | 0 | 0 | 5 | 1 | 2 | 4 | 0 | 2 | 1 | 2 | 5 | 1 |
| Transfer, outside prefecture | 0 | 0 | 2 | 8 | 1 | 4 | 5 | 0 | 5 | 2 | 3 | 6 | 4 |
| Destruction, stud bull | 1 | 1 | 0 | 1 | 0 | 0 | 1 | 1 | 0 | 0 | 1 | 0 | 1 |
| Henoko | 0 | 0 | 0 | 4 | 0 | 1 | 2 | 0 | 2 | 1 | 1 | 3 | 2 |
| XX coalition | 1 | 1 | 1 | 1 | 1 | 4 | 2 | 0 | 3 | 3 | 2 | 2 | 0 |
| Defection | 0 | 0 | 0 | 0 | 0 | 1 | 0 | 0 | 0 | 0 | 0 | 0 | 0 |
| Dismissal | 0 | 0 | 0 | 0 | 0 | 0 | 0 | 0 | 0 | 0 | 0 | 0 | 0 |

| Topic word | 5/14 | 5/15 | 5/16 | 5/17 | 5/18 | 5/19 | 5/20 | 5/21 | 5/22 | 5/23 | 5/24 | 5/25 | 5/26 | 5/27 | 5/28 | 5/29 | 5/30 | 5/31 |
|---|---|---|---|---|---|---|---|---|---|---|---|---|---|---|---|---|---|---|
| Foot-and-mouth disease, infection | 7 | 2 | 7 | 8 | 15 | 6 | 9 | 8 | 8 | 7 | 12 | 10 | 5 | 11 | 5 | 4 | 9 | 7 |
| Futenma, base | 6 | 4 | 12 | 9 | 9 | 6 | 8 | 7 | 4 | 11 | 13 | 11 | 10 | 14 | 18 | 5 | 9 | 2 |
| Tokunoshima | 0 | 0 | 1 | 1 | 0 | 1 | 0 | 0 | 2 | 1 | 0 | 2 | 0 | 2 | 2 | 1 | 3 | 0 |
| Transfer, outside prefecture | 3 | 1 | 4 | 2 | 1 | 3 | 2 | 2 | 2 | 8 | 4 | 5 | 3 | 8 | 12 | 5 | 9 | 2 |
| Destruction, stud bull | 0 | 0 | 1 | 4 | 6 | 1 | 3 | 5 | 5 | 2 | 5 | 3 | 2 | 6 | 0 | 2 | 3 | 1 |
| Henoko | 0 | 0 | 0 | 2 | 0 | 1 | 1 | 1 | 1 | 6 | 2 | 2 | 2 | 7 | 7 | 1 | 6 | 0 |
| XX coalition | 0 | 0 | 5 | 5 | 1 | 1 | 2 | 1 | 1 | 4 | 2 | 3 | 4 | 5 | 11 | 4 | 8 | 2 |
| Defection | 0 | 0 | 1 | 3 | 0 | 0 | 1 | 0 | 0 | 1 | 1 | 3 | 2 | 1 | 3 | 2 | 7 | 1 |
| Dismissal | 0 | 0 | 0 | 0 | 0 | 0 | 0 | 0 | 0 | 0 | 0 | 0 | 2 | 2 | 11 | 1 | 6 | 0 |

FIG. 16

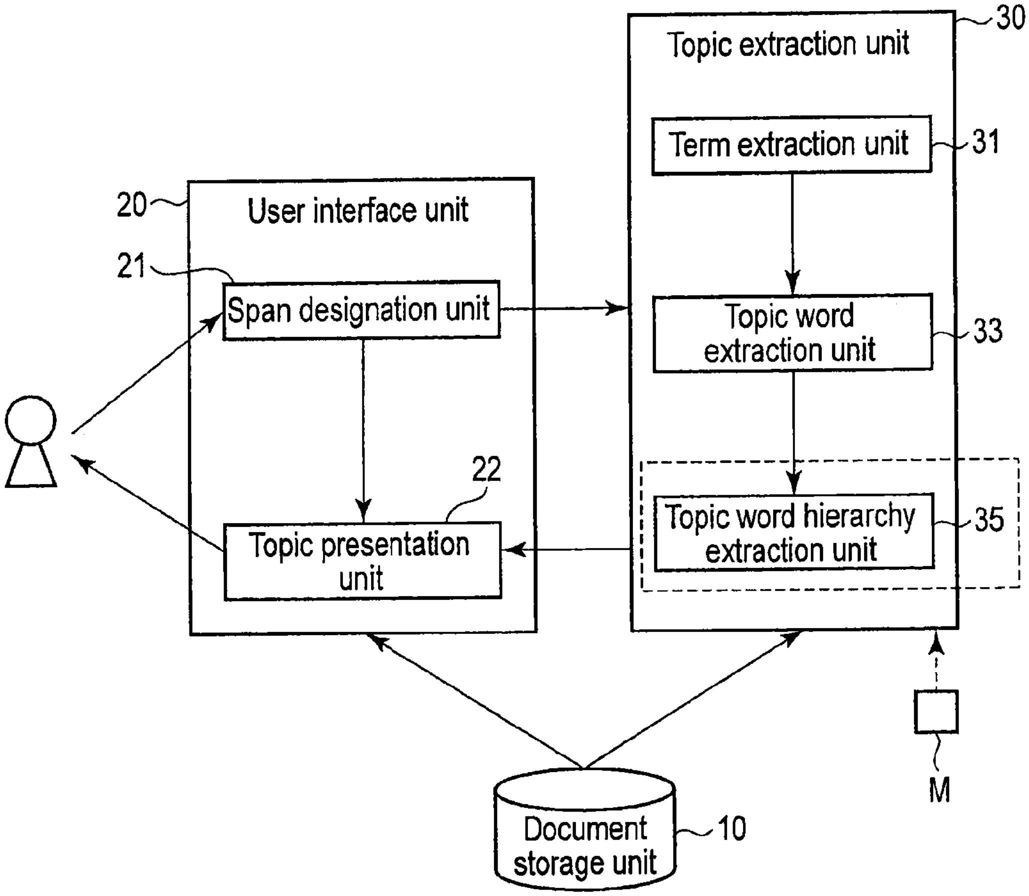
F I G. 17

TWT : Topic word table

After topic word hierarchy extraction processing

| Term ID (TWT_tid) | Term (TWT_t) | Span (TWT_spn) | Appearance document (TWT_did) | Document frequency (TWT_df) | Term frequency (TWT_tf) | Topic degree (TWT_score) | Freshness (TWT_fresh) | Parent term (TWT_root) |
|---|---|---|---|---|---|---|---|---|
| t0001 (TWT_L1) | Foot-and-mouth disease | 2010/05/01~2010/05/31 | d001, d002, d006, ... | ○○ | ×× | △△ | ◇◇ | (root) |
| t0002 (TWT_L2) | Infection | 2010/05/01~2010/05/31 | d001, d002, d006, ... | ○○ | ×× | △△ | ◇◇ | (root) |
| t0003 | Futenma | 2010/05/01~2010/05/31 | d001, d002, d006, ... | ○○ | ×× | △△ | ◇◇ | (root) |
| t0004 | Tokunoshima | 2010/05/01~2010/05/31 | d001, d002, d006, ... | ○○ | ×× | △△ | ◇◇ | t0005, ... |
| t0005 | Transfer | 2010/05/01~2010/05/31 | d001, d002, d006, ... | ○○ | ×× | △△ | ◇◇ | t0003, ... |
| t0006 | Stud bull | 2010/05/01~2010/05/31 | d001, d002, d006, ... | ○○ | ×× | △△ | ◇◇ | t0001, t0002 |
| t0007 | Henoko | 2010/05/01~2010/05/31 | d001, d002, d006, ... | ○○ | ×× | △△ | ◇◇ | t0005, ... |
| t0008 | Destruction | 2010/05/01~2010/05/31 | d001, d002, d006, ... | ○○ | ×× | △△ | ◇◇ | t0001, t0002 |
| : | : | : | : | : | : | : | : | |

FIG. 18

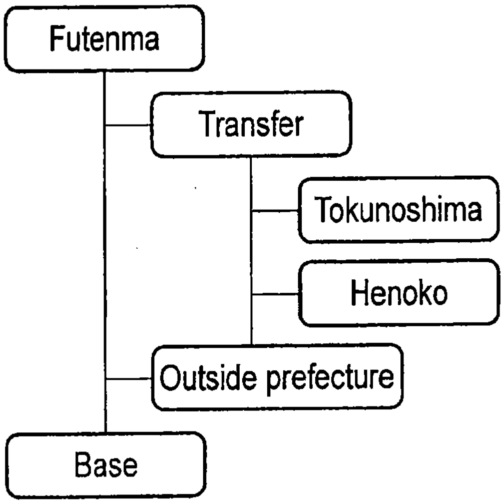
F I G. 19A
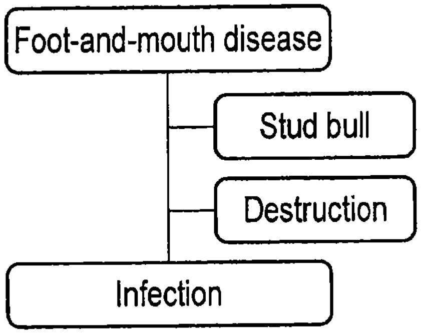
F I G. 19B

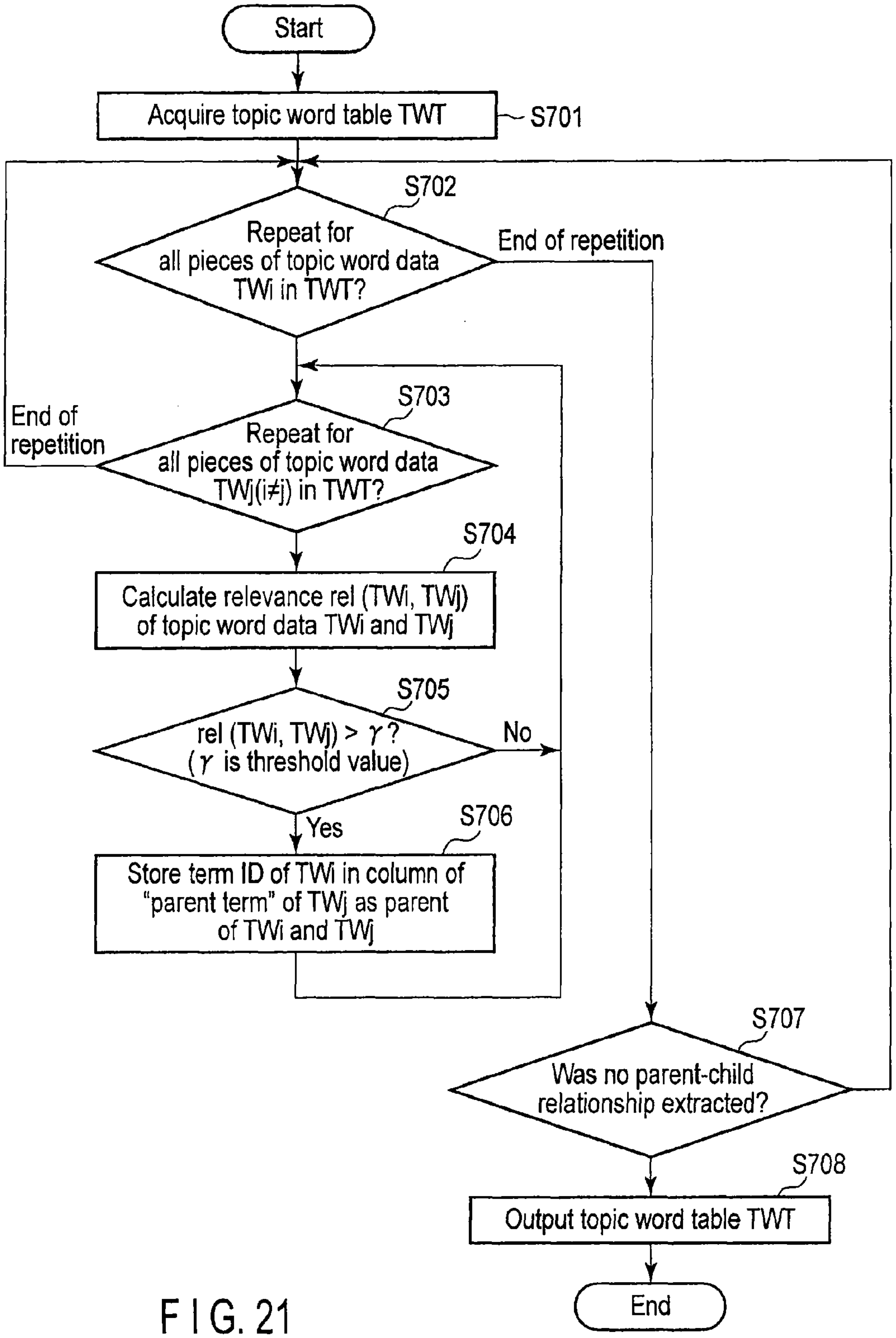
F I G. 21

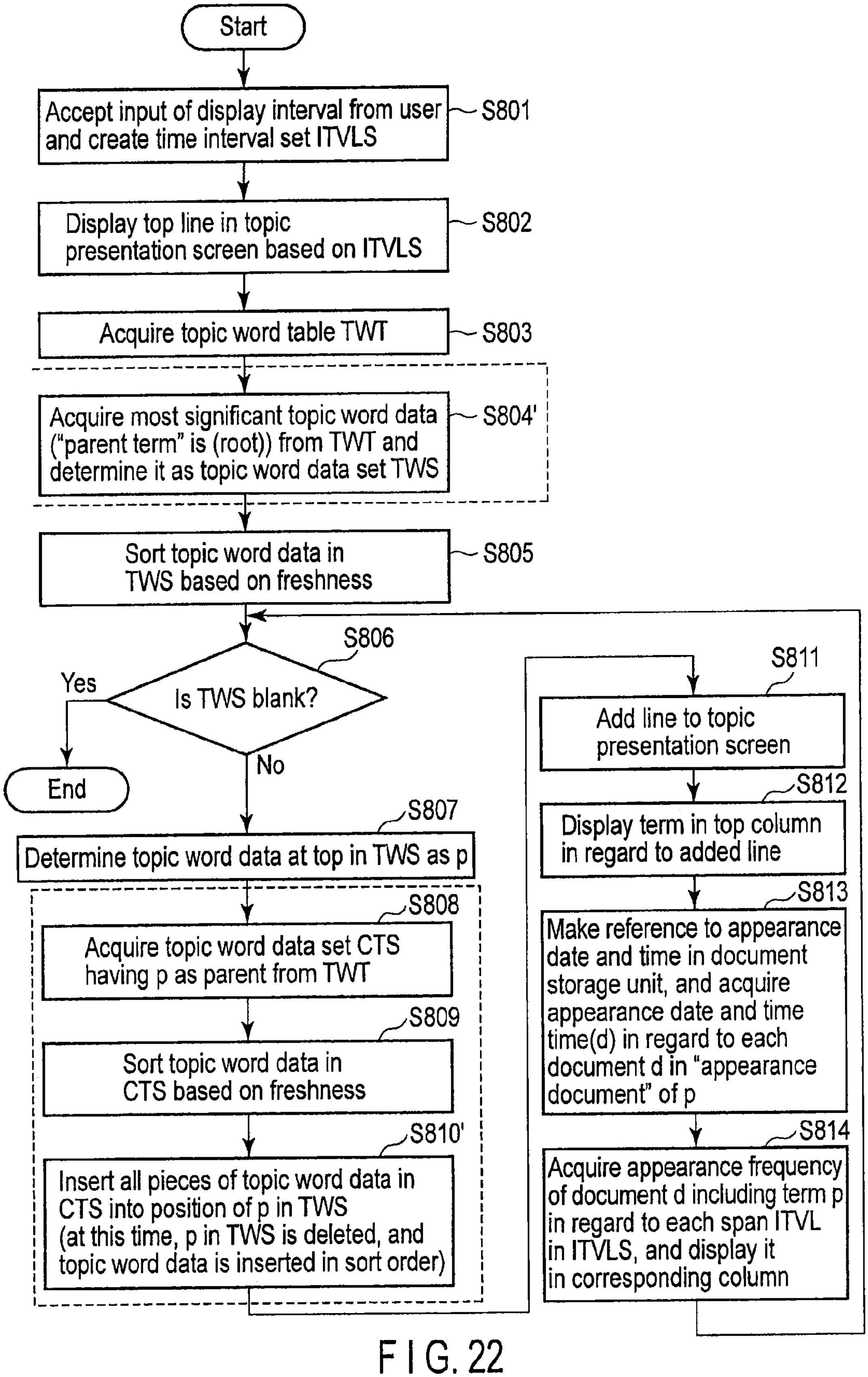
F I G. 22

G30

| Topic word | 5/1 | 5/2 | 5/3 | 5/4 | 5/5 | 5/6 | 5/7 | 5/8 | 5/9 | 5/10 | 5/11 | 5/12 | 5/13 |
|---|---|---|---|---|---|---|---|---|---|---|---|---|---|
| ⊟ Futenma | 2 | 4 | 5 | 8 | 2 | 8 | 10 | 1 | 9 | 9 | 9 | 14 | 10 |
| ⊟ Transfer | 0 | 0 | 2 | 8 | 1 | 4 | 5 | 0 | 5 | 2 | 3 | 6 | 4 |
| ⊟ Tokunoshima | 0 | 0 | 0 | 5 | 1 | 2 | 4 | 0 | 2 | 1 | 2 | 5 | 1 |
| ⊟ Henoko | 0 | 0 | 0 | 4 | 0 | 1 | 2 | 0 | 2 | 1 | 1 | 3 | 2 |
| ⊟ Outside prefecture | 0 | 0 | 2 | 8 | 1 | 4 | 5 | 0 | 5 | 2 | 3 | 6 | 4 |
| ⊟ XX coalition | 1 | 1 | 1 | 1 | 1 | 4 | 2 | 0 | 3 | 3 | 2 | 2 | 0 |
| ⊟ Defection | 0 | 0 | 0 | 0 | 0 | 1 | 0 | 0 | 0 | 0 | 0 | 0 | 0 |
| ⊟ Dismissal | 0 | 0 | 0 | 0 | 0 | 0 | 0 | 0 | 0 | 0 | 0 | 0 | 0 |
| ⊟ Base | 2 | 4 | 5 | 8 | 2 | 8 | 10 | 1 | 9 | 9 | 9 | 14 | 10 |
| ⊟ Foot-and-mouth disease | 1 | 1 | 5 | 7 | 1 | 6 | 8 | 3 | 6 | 1 | 5 | 4 | 6 |
| ⊟ Destruction | 1 | 1 | 0 | 1 | 0 | 0 | 1 | 1 | 0 | 0 | 1 | 0 | 1 |
| ⊟ Stud bull | 1 | 1 | 0 | 1 | 0 | 0 | 1 | 1 | 0 | 0 | 1 | 0 | 1 |
| ⊟ Infection | 1 | 1 | 5 | 7 | 1 | 6 | 8 | 3 | 6 | 1 | 5 | 4 | 6 |

| 5/14 | 5/15 | 5/16 | 5/17 | 5/18 | 5/19 | 5/20 | 5/21 | 5/22 | 5/23 | 5/24 | 5/25 | 5/26 | 5/27 | 5/28 | 5/29 | 5/30 | 5/31 |
|---|---|---|---|---|---|---|---|---|---|---|---|---|---|---|---|---|---|
| 6 | 4 | 12 | 9 | 9 | 6 | 8 | 7 | 4 | 11 | 13 | 11 | 10 | 14 | 18 | 5 | 9 | 2 |
| 3 | 1 | 4 | 2 | 1 | 3 | 2 | 2 | 2 | 8 | 4 | 5 | 3 | 8 | 12 | 5 | 9 | 2 |
| 0 | 0 | 1 | 1 | 0 | 1 | 0 | 0 | 2 | 1 | 0 | 2 | 0 | 2 | 2 | 1 | 3 | 0 |
| 0 | 0 | 0 | 2 | 0 | 1 | 1 | 1 | 1 | 6 | 2 | 2 | 2 | 7 | 7 | 1 | 6 | 0 |
| 3 | 1 | 4 | 2 | 1 | 3 | 2 | 2 | 2 | 8 | 4 | 5 | 3 | 8 | 12 | 5 | 9 | 2 |
| 0 | 0 | 5 | 5 | 1 | 1 | 2 | 1 | 1 | 4 | 2 | 3 | 4 | 5 | 11 | 4 | 8 | 2 |
| 0 | 0 | 1 | 3 | 0 | 0 | 1 | 0 | 0 | 1 | 1 | 3 | 2 | 1 | 3 | 2 | 7 | 1 |
| 0 | 0 | 0 | 0 | 0 | 0 | 0 | 0 | 0 | 0 | 0 | 0 | 2 | 2 | 11 | 1 | 6 | 0 |
| 6 | 4 | 12 | 9 | 9 | 6 | 8 | 7 | 4 | 11 | 13 | 11 | 10 | 14 | 18 | 5 | 9 | 2 |
| 7 | 2 | 7 | 8 | 15 | 6 | 9 | 8 | 8 | 7 | 12 | 10 | 5 | 11 | 5 | 4 | 9 | 7 |
| 0 | 0 | 1 | 4 | 6 | 1 | 3 | 5 | 5 | 2 | 5 | 3 | 2 | 6 | 0 | 2 | 3 | 1 |
| 0 | 0 | 1 | 4 | 6 | 1 | 3 | 5 | 5 | 2 | 5 | 3 | 2 | 6 | 0 | 2 | 3 | 1 |
| 7 | 2 | 7 | 8 | 15 | 6 | 9 | 8 | 8 | 7 | 12 | 10 | 5 | 11 | 5 | 4 | 9 | 7 |

F I G. 23

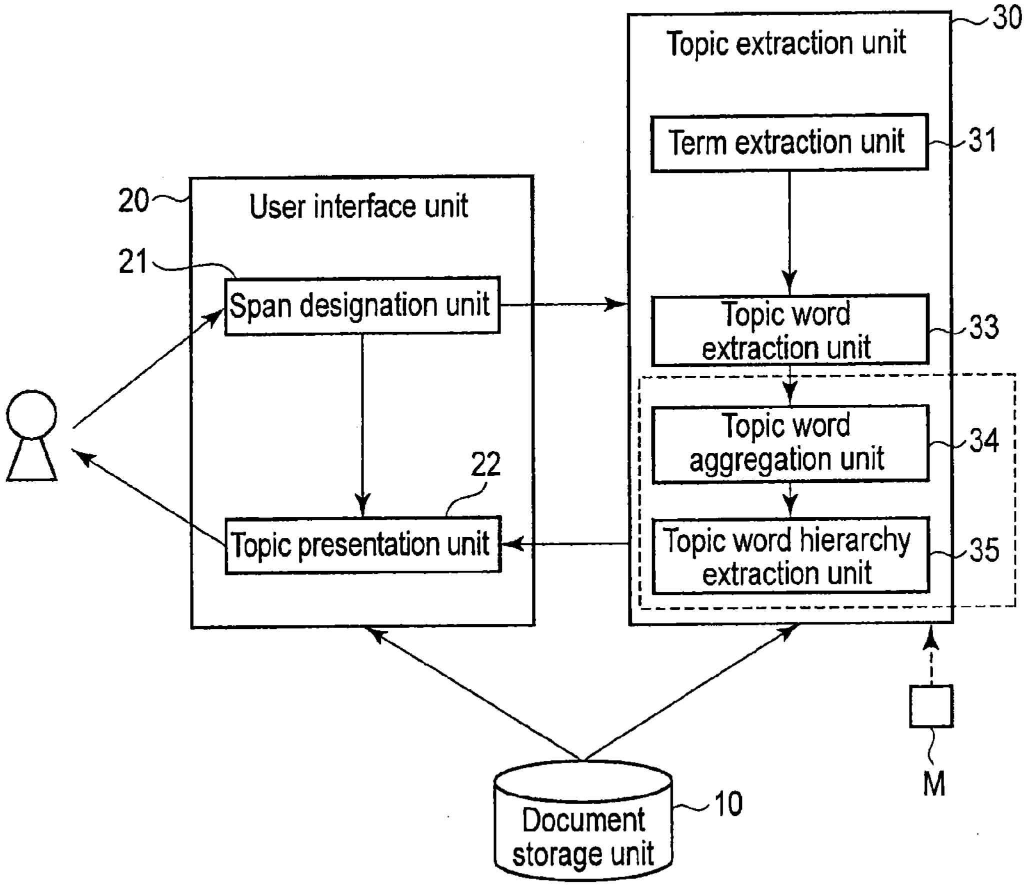
F I G. 24

TWT_root

| Term ID | Term | Span | Appearance document | Document frequency | Term frequency | Topic degree | Freshness | Parent term |
|---|---|---|---|---|---|---|---|---|
| t0001 | Foot-and-mouth disease, infection | 2010/05/01~2010/05/31 | d001, d002, d006, ... | ○○ | ×× | △△ | ◇◇ | (root) |
| t0003 | Futenma, base | 2010/05/01~2010/05/31 | d001, d002, d006, ... | ○○ | ×× | △△ | ◇◇ | (root) |
| t0004 | Tokunoshima | 2010/05/01~2010/05/31 | d001, d002, d006, ... | ○○ | ×× | △△ | ◇◇ | t0003 |
| t0005 | Transfer, outside prefecture | 2010/05/01~2010/05/31 | d001, d002, d006, ... | ○○ | ×× | △△ | ◇◇ | t0003 |
| t0006 | Stud bull, destruction | 2010/05/01~2010/05/31 | d001, d002, d006, ... | ○○ | ×× | △△ | ◇◇ | t0001 |
| t0007 | Henoko | 2010/05/01~2010/05/31 | d001, d002, d006, ... | ○○ | ×× | △△ | ◇◇ | t0003 |
| : | : | : | : | : | : | : | : | |

F I G. 25

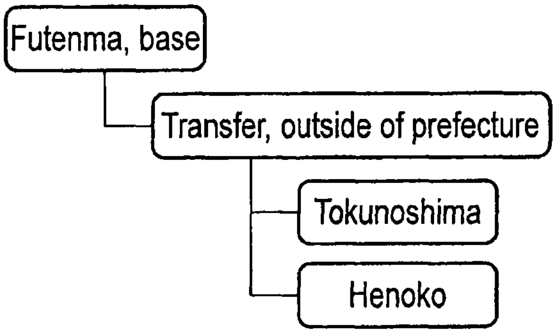
F I G. 26A
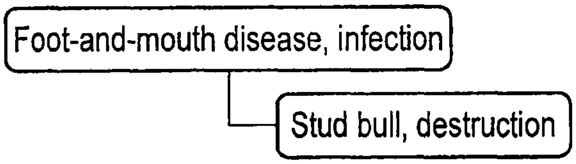
F I G. 26B

G40

| Topic word | 5/1 | 5/2 | 5/3 | 5/4 | 5/5 | 5/6 | 5/7 | 5/8 | 5/9 | 5/10 | 5/11 | 5/12 | 5/13 |
|---|---|---|---|---|---|---|---|---|---|---|---|---|---|
| Futenma, base | 2 | 4 | 5 | 8 | 2 | 8 | 10 | 1 | 9 | 9 | 9 | 14 | 10 |
| Transfer, outside prefecture | 0 | 0 | 2 | 8 | 1 | 4 | 5 | 0 | 5 | 2 | 3 | 6 | 4 |
| Tokunoshima | 0 | 0 | 0 | 5 | 1 | 2 | 4 | 0 | 2 | 1 | 2 | 5 | 1 |
| Henoko | 0 | 0 | 0 | 4 | 0 | 1 | 2 | 0 | 2 | 1 | 1 | 3 | 2 |
| XX coalition | 1 | 1 | 1 | 1 | 1 | 4 | 2 | 0 | 3 | 3 | 2 | 2 | 0 |
| Defection | 0 | 0 | 0 | 0 | 0 | 1 | 0 | 0 | 0 | 0 | 0 | 0 | 0 |
| Dismissal | 0 | 0 | 0 | 0 | 0 | 0 | 0 | 0 | 0 | 0 | 0 | 0 | 0 |
| Foot-and-mouth disease, infection | 1 | 1 | 5 | 7 | 1 | 6 | 8 | 3 | 6 | 1 | 5 | 4 | 6 |
| Destruction, stud bull | 1 | 1 | 0 | 1 | 0 | 0 | 1 | 1 | 0 | 0 | 1 | 0 | 1 |

| 5/14 | 5/15 | 5/16 | 5/17 | 5/18 | 5/19 | 5/20 | 5/21 | 5/22 | 5/23 | 5/24 | 5/25 | 5/26 | 5/27 | 5/28 | 5/29 | 5/30 | 5/31 |
|---|---|---|---|---|---|---|---|---|---|---|---|---|---|---|---|---|---|
| 6 | 4 | 12 | 9 | 9 | 6 | 8 | 7 | 4 | 11 | 13 | 11 | 10 | 14 | 18 | 5 | 9 | 2 |
| 3 | 1 | 4 | 2 | 1 | 3 | 2 | 2 | 2 | 8 | 4 | 5 | 3 | 8 | 12 | 5 | 9 | 2 |
| 0 | 0 | 1 | 1 | 0 | 1 | 0 | 0 | 2 | 1 | 0 | 2 | 0 | 2 | 2 | 1 | 3 | 0 |
| 0 | 0 | 0 | 2 | 0 | 1 | 1 | 1 | 1 | 6 | 2 | 2 | 2 | 7 | 7 | 1 | 6 | 0 |
| 0 | 0 | 5 | 5 | 1 | 1 | 2 | 1 | 1 | 4 | 2 | 3 | 4 | 5 | 11 | 4 | 8 | 2 |
| 0 | 0 | 1 | 3 | 0 | 0 | 1 | 0 | 0 | 1 | 1 | 3 | 2 | 1 | 3 | 2 | 7 | 1 |
| 0 | 0 | 0 | 0 | 0 | 0 | 0 | 0 | 0 | 0 | 0 | 0 | 2 | 2 | 11 | 1 | 6 | 0 |
| 7 | 2 | 7 | 8 | 15 | 6 | 9 | 8 | 8 | 7 | 12 | 10 | 5 | 11 | 5 | 4 | 9 | 7 |
| 0 | 0 | 1 | 4 | 6 | 1 | 3 | 5 | 5 | 2 | 5 | 3 | 2 | 6 | 0 | 2 | 3 | 1 |

FIG. 28

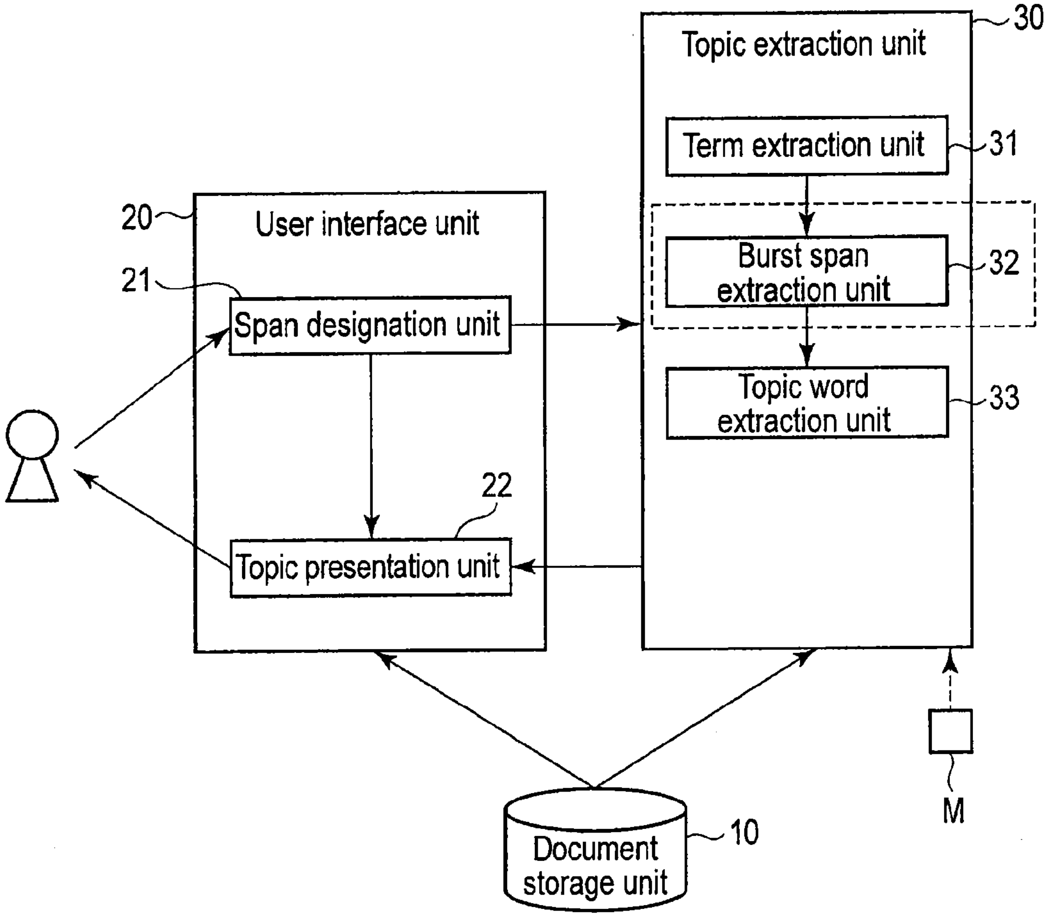
F I G. 29

TST : Term span table

TST_tid TST_t TST_spn

| Term ID | Term | Span |
|---|---|---|
| t0001 | Foot-and-mouth disease | 2010/05/03~2010/05/31 |
| t0002 | Infection | 2010/05/01~2010/05/31 |
| t0003 | Futenma | 2010/05/02~2010/05/30 |
| t0004 | Tokunoshima | 2010/05/23~2010/05/30 |
| t0005 | Transfer | 2010/05/23~2010/05/30 |
| t0006 | Stud bull | 2010/05/17~2010/05/27 |
| t0007 | Henoko | 2010/05/23~2010/05/30 |
| t0008 | Destruction | 2010/05/23~2010/05/30 |
| : | : | : |

F I G. 30

G50

Politics

| | '10 May 1 | '10 May 2 | '10 May 3 | '10 May 4 | '10 May 5 | '10 May 6 | '10 May 7 | '10 May 8 | '10 May 9 | '10 May 10 | '10 May 11 | '10 May 12 | '10 May 13 | '10 May 14 | '10 May 15 | '10 May 16 | '10 May 17 | '10 May 18 | '10 May 19 | '10 May 20 | '10 May 21 | '10 May 22 | '10 May 23 | '10 May 24 | '10 May 25 | '10 May 26 | '10 May 27 | '10 May 28 | '10 May 29 | '10 May 30 | '10 May 31 |
|---|---|---|---|---|---|---|---|---|---|---|---|---|---|---|---|---|---|---|---|---|---|---|---|---|---|---|---|---|---|---|---|
| Mr./Ms. X (93) | 0 | 0 | 0 | 3 | 1 | 1 | 0 | 1 | 1 | 0 | 2 | 1 | 1 | 0 | 0 | 2 | 1 | 0 | 1 | 1 | 1 | 0 | 1 | 1 | 0 | 2 | 4 | 15 | 14 | 26 | 13 |
| Resignation (90) | 0 | 2 | 0 | 1 | 0 | 0 | 0 | 0 | 0 | 1 | 2 | 1 | 0 | 0 | 0 | 0 | 0 | 1 | 0 | 0 | 0 | 1 | 2 | 1 | 2 | 3 | 32 | 27 | 8 | 4 | 2 |
| Retreat(66) | 1 | 1 | 0 | 1 | 1 | 0 | 0 | 2 | 0 | 0 | 2 | 1 | 0 | 0 | 0 | 0 | 0 | 0 | 1 | 0 | 0 | 1 | 1 | 1 | 3 | 3 | 12 | 28 | 5 | 1 | 1 |
| Defection(49) | 1 | 0 | 0 | 0 | 0 | 0 | 0 | 0 | 0 | 0 | 1 | 3 | 0 | 0 | 1 | 0 | 0 | 1 | 1 | 3 | 2 | 1 | 3 | 2 | 7 | 4 | 9 | 4 | 0 | 4 | 2 |
| Dismissal(27) | 0 | 0 | 0 | 0 | 0 | 0 | 0 | 0 | 0 | 0 | 0 | 0 | 0 | 0 | 0 | 0 | 0 | 0 | 0 | 0 | 2 | 2 | 11 | 1 | 6 | 0 | 1 | 3 | 0 | 1 | 0 |
| Transfer(214) | 8 | 7 | 1 | 7 | 7 | 5 | 7 | 8 | 3 | 2 | 8 | 7 | 4 | 5 | 5 | 5 | 2 | 9 | 9 | 1 | 3 | 2 | 7 | 6 | 9 | 5 | 14 | 12 | 4 | 8 | 6 |
| Statement(66) | 0 | 0 | 0 | 0 | 0 | 0 | 0 | 0 | 0 | 0 | 0 | 1 | 0 | 1 | 1 | 3 | 1 | 3 | 1 | 5 | 4 | 9 | 13 | 3 | 3 | 1 | 5 | 5 | 2 | 3 | 2 |
| Coalition(101) | 4 | 3 | 0 | 4 | 3 | 2 | 1 | 0 | 0 | 0 | 4 | 3 | 1 | 0 | 2 | 1 | 1 | 5 | 5 | 3 | 3 | 4 | 9 | 3 | 8 | 5 | 11 | 5 | 1 | 8 | 2 |
| | 0 | 0 | 0 | 1 | 0 | 1 | 0 | 0 | 0 | 1 | 2 | 5 | 5 | 3 | 2 | 1 | 2 | 2 | 4 | 3 | 2 | 6 | 2 | 2 | 5 | 4 | 2 | 1 | 2 | 1 | 3 |
| Prime minister (330) | 10 | 8 | 1 | 8 | 6 | 5 | 7 | 5 | 5 | 2 | 8 | 10 | 5 | 9 | 8 | 8 | 5 | 9 | 14 | 7 | 7 | 11 | 17 | 5 | 10 | 10 | 39 | 36 | 19 | 26 | 10 |
| Transfer(214) | 8 | 7 | 1 | 7 | 7 | 5 | 7 | 8 | 3 | 2 | 8 | 7 | 4 | 5 | 5 | 5 | 2 | 9 | 9 | 1 | 3 | 2 | 7 | 6 | 9 | 5 | 14 | 12 | 4 | 8 | 6 |

Foot-and-mouth disease (62)

FIG. 34

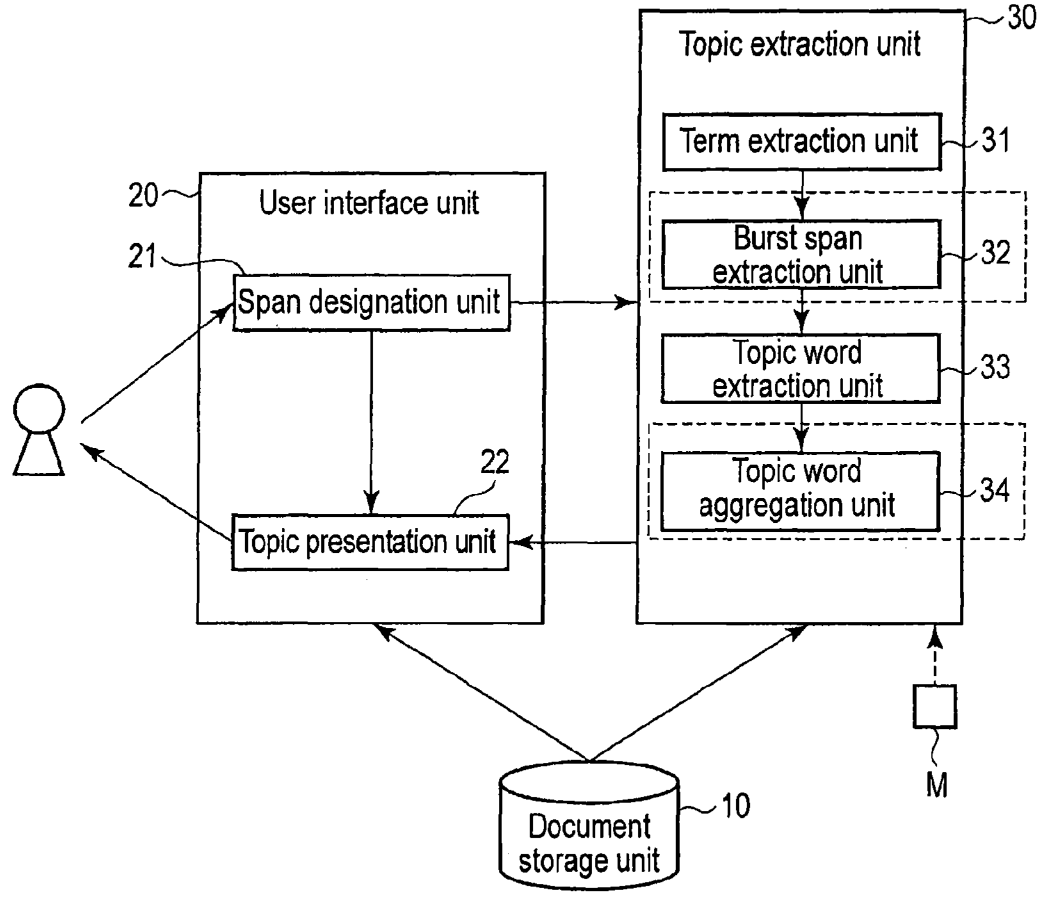
F I G. 35

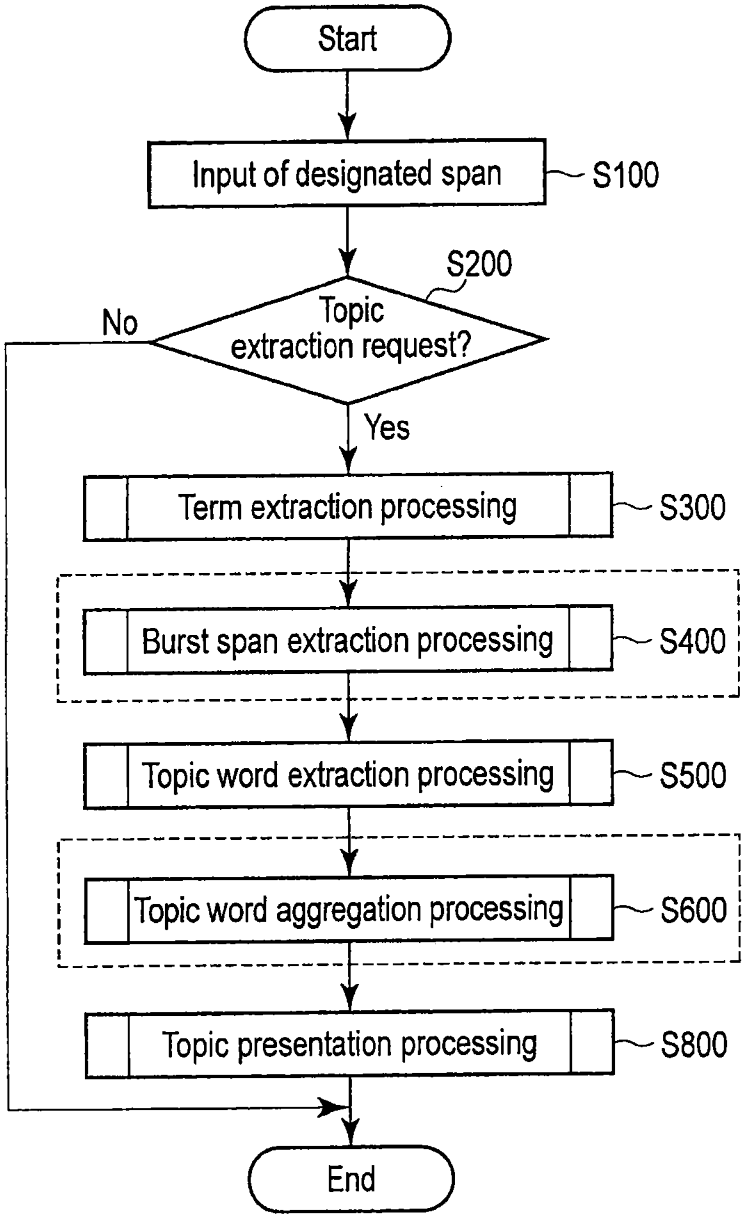
F I G. 36

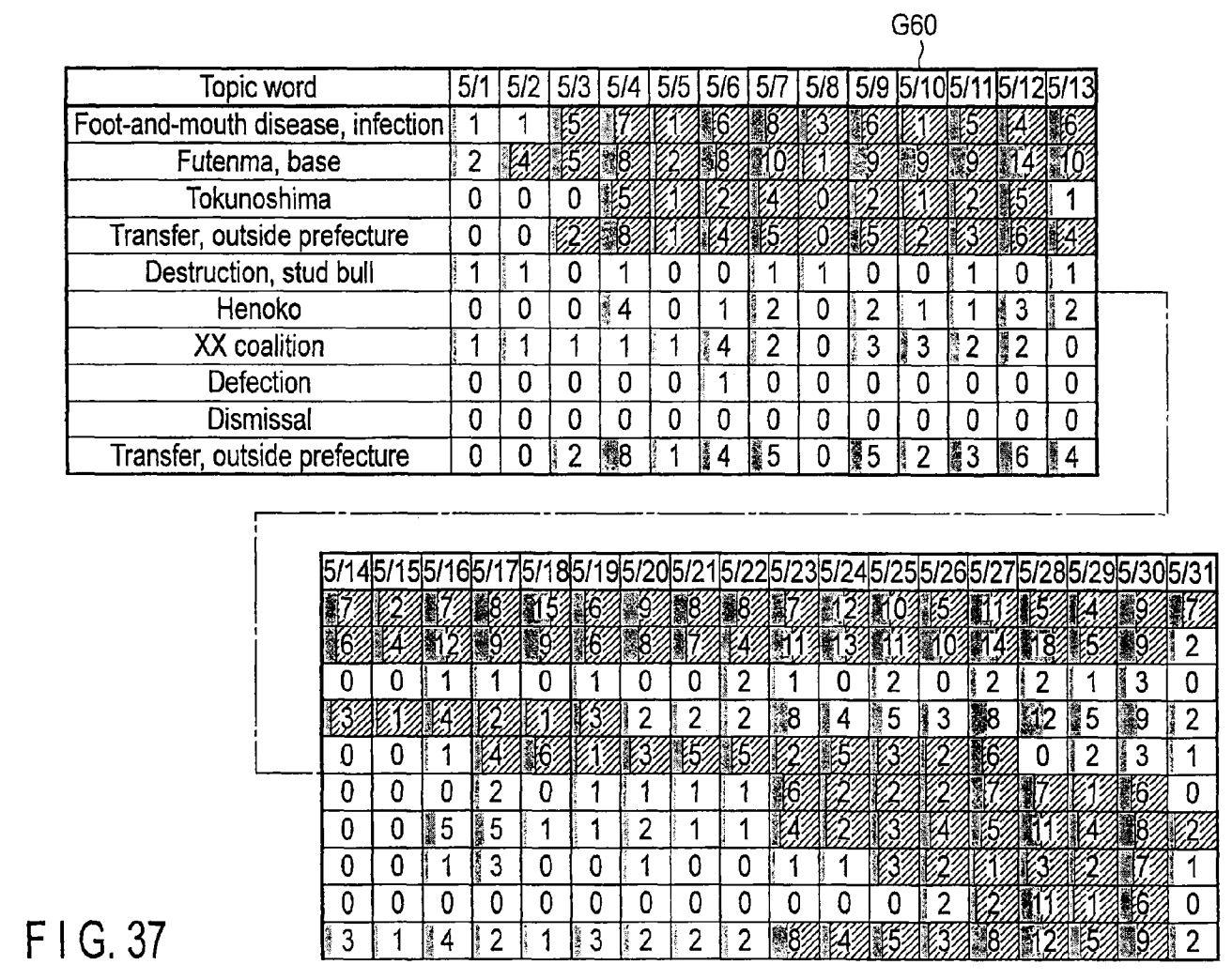

G60

| Topic word | 5/1 | 5/2 | 5/3 | 5/4 | 5/5 | 5/6 | 5/7 | 5/8 | 5/9 | 5/10 | 5/11 | 5/12 | 5/13 |
|---|---|---|---|---|---|---|---|---|---|---|---|---|---|
| Foot-and-mouth disease, infection | 1 | 1 | 5 | 7 | 1 | 6 | 8 | 3 | 6 | 1 | 5 | 4 | 6 |
| Futenma, base | 2 | 4 | 5 | 8 | 2 | 8 | 10 | 1 | 9 | 9 | 9 | 14 | 10 |
| Tokunoshima | 0 | 0 | 0 | 5 | 1 | 2 | 4 | 0 | 2 | 1 | 2 | 5 | 1 |
| Transfer, outside prefecture | 0 | 0 | 2 | 8 | 1 | 4 | 5 | 0 | 5 | 2 | 3 | 6 | 4 |
| Destruction, stud bull | 1 | 1 | 0 | 1 | 0 | 0 | 1 | 1 | 0 | 0 | 1 | 0 | 1 |
| Henoko | 0 | 0 | 0 | 4 | 0 | 1 | 2 | 0 | 2 | 1 | 1 | 3 | 2 |
| XX coalition | 1 | 1 | 1 | 1 | 1 | 4 | 2 | 0 | 3 | 3 | 2 | 2 | 0 |
| Defection | 0 | 0 | 0 | 0 | 0 | 1 | 0 | 0 | 0 | 0 | 0 | 0 | 0 |
| Dismissal | 0 | 0 | 0 | 0 | 0 | 0 | 0 | 0 | 0 | 0 | 0 | 0 | 0 |
| Transfer, outside prefecture | 0 | 0 | 2 | 8 | 1 | 4 | 5 | 0 | 5 | 2 | 3 | 6 | 4 |

| Topic word | 5/14 | 5/15 | 5/16 | 5/17 | 5/18 | 5/19 | 5/20 | 5/21 | 5/22 | 5/23 | 5/24 | 5/25 | 5/26 | 5/27 | 5/28 | 5/29 | 5/30 | 5/31 |
|---|---|---|---|---|---|---|---|---|---|---|---|---|---|---|---|---|---|---|
| Foot-and-mouth disease, infection | 7 | 2 | 7 | 8 | 15 | 6 | 9 | 8 | 8 | 7 | 12 | 10 | 5 | 11 | 5 | 4 | 9 | 7 |
| Futenma, base | 6 | 4 | 12 | 9 | 9 | 6 | 8 | 7 | 4 | 11 | 13 | 11 | 10 | 14 | 18 | 5 | 9 | 2 |
| Tokunoshima | 0 | 0 | 1 | 1 | 0 | 1 | 0 | 0 | 2 | 1 | 0 | 2 | 0 | 2 | 2 | 1 | 3 | 0 |
| Transfer, outside prefecture | 3 | 1 | 4 | 2 | 1 | 3 | 2 | 2 | 2 | 8 | 4 | 5 | 3 | 8 | 12 | 5 | 9 | 2 |
| Destruction, stud bull | 0 | 0 | 1 | 4 | 6 | 1 | 3 | 5 | 5 | 2 | 5 | 3 | 2 | 6 | 0 | 2 | 3 | 1 |
| Henoko | 0 | 0 | 0 | 2 | 0 | 1 | 1 | 1 | 1 | 6 | 2 | 2 | 2 | 7 | 7 | 1 | 6 | 0 |
| XX coalition | 0 | 0 | 5 | 5 | 1 | 1 | 2 | 1 | 1 | 4 | 2 | 3 | 4 | 5 | 11 | 4 | 8 | 2 |
| Defection | 0 | 0 | 1 | 3 | 0 | 0 | 1 | 0 | 0 | 1 | 1 | 3 | 2 | 1 | 3 | 2 | 7 | 1 |
| Dismissal | 0 | 0 | 0 | 0 | 0 | 0 | 0 | 0 | 0 | 0 | 0 | 0 | 2 | 2 | 11 | 1 | 6 | 0 |
| Transfer, outside prefecture | 3 | 1 | 4 | 2 | 1 | 3 | 2 | 2 | 2 | 8 | 4 | 5 | 3 | 8 | 12 | 5 | 9 | 2 |

FIG. 37

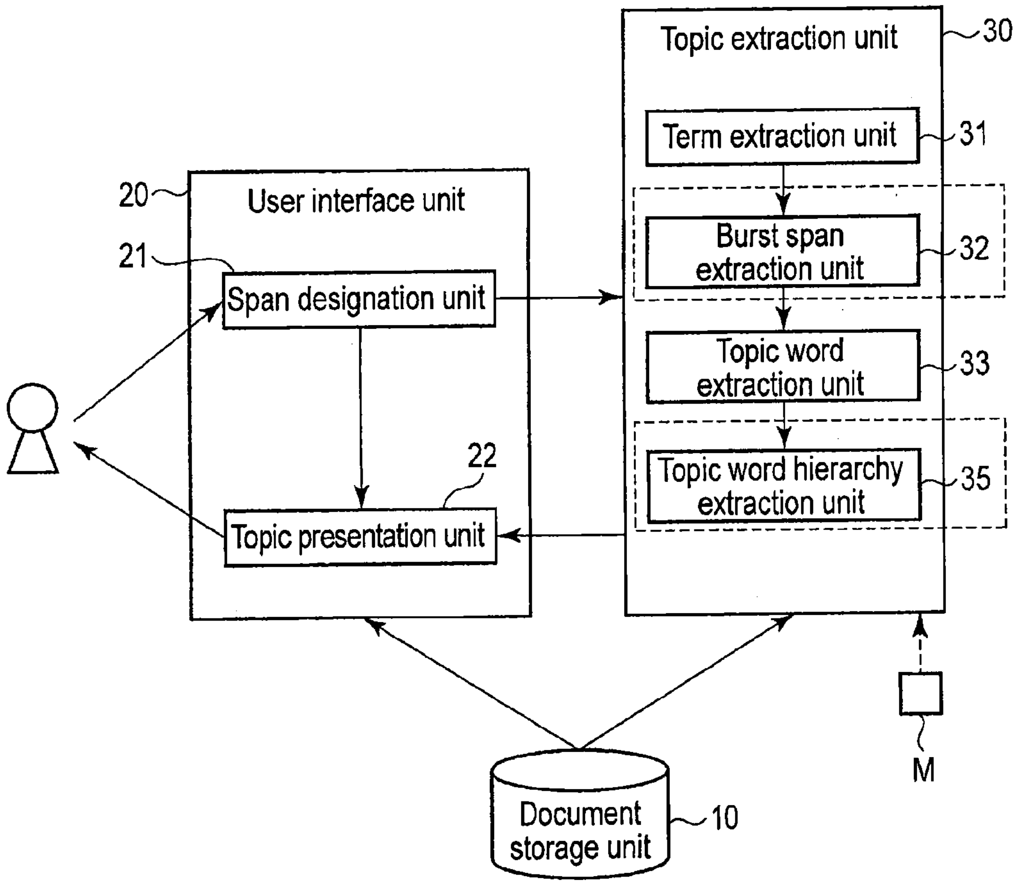
F I G. 38

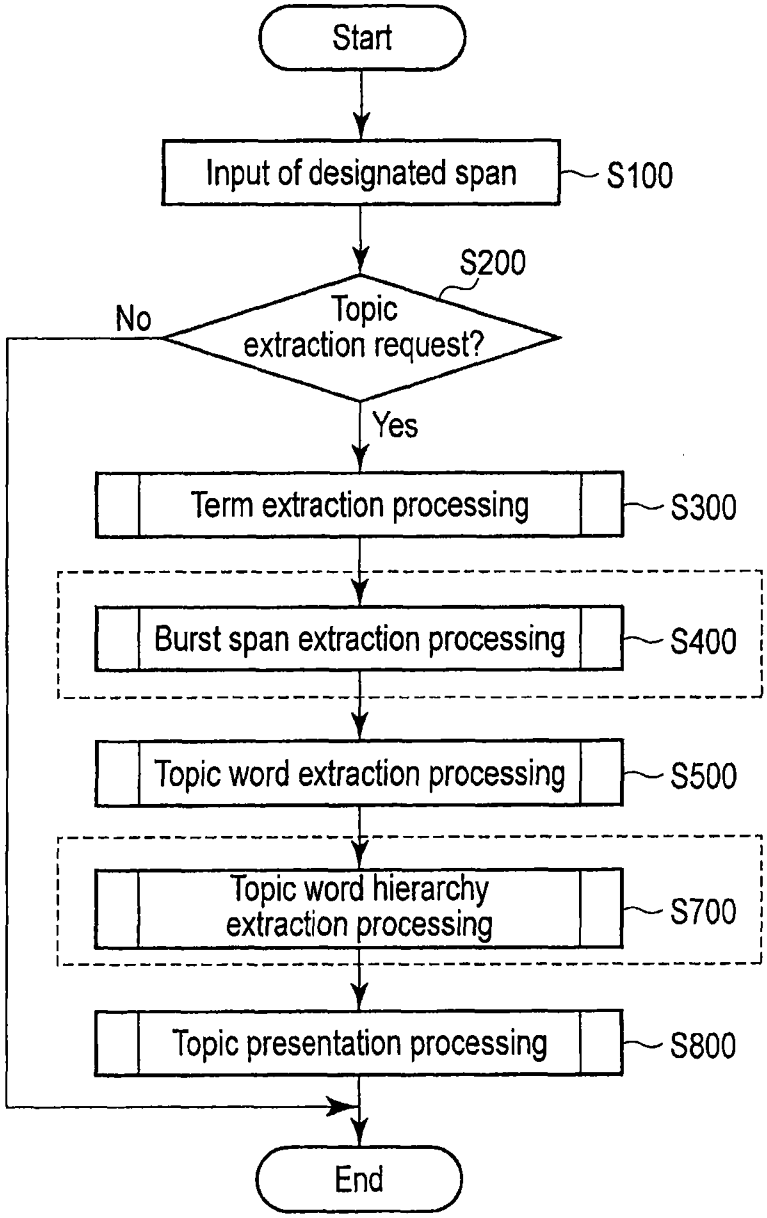
F I G. 39

G70

| Topic word | 5/1 | 5/2 | 5/3 | 5/4 | 5/5 | 5/6 | 5/7 | 5/8 | 5/9 | 5/10 | 5/11 | 5/12 | 5/13 |
|---|---|---|---|---|---|---|---|---|---|---|---|---|---|
| ⊟ Futenma | 2 | 4 | 5 | 8 | 2 | 8 | 10 | 1 | 9 | 9 | 9 | 14 | 10 |
| ⊟ Transfer | 0 | 0 | 2 | 8 | 1 | 4 | 5 | 0 | 5 | 2 | 3 | 6 | 4 |
| ⊟ Tokunoshima | 0 | 0 | 0 | 5 | 1 | 2 | 4 | 0 | 2 | 1 | 2 | 5 | 1 |
| ⊟ Outside prefecture | 0 | 0 | 2 | 8 | 1 | 4 | 5 | 0 | 5 | 2 | 3 | 6 | 4 |
| ⊟ Transfer | 0 | 0 | 2 | 8 | 1 | 4 | 5 | 0 | 5 | 2 | 3 | 6 | 4 |
| ⊟ Henoko | 0 | 0 | 0 | 4 | 0 | 1 | 2 | 0 | 2 | 1 | 1 | 3 | 2 |
| ⊟ Outside prefecture | 0 | 0 | 2 | 8 | 1 | 4 | 5 | 0 | 5 | 2 | 3 | 6 | 4 |
| ⊟ XX coalition | 1 | 1 | 1 | 1 | 1 | 4 | 2 | 0 | 3 | 3 | 2 | 2 | 0 |
| ⊟ Defection | 0 | 0 | 0 | 0 | 0 | 1 | 0 | 0 | 0 | 0 | 0 | 0 | 0 |
| ⊟ Dismissal | 0 | 0 | 0 | 0 | 0 | 0 | 0 | 0 | 0 | 0 | 0 | 0 | 0 |
| ⊟ Base | 2 | 4 | 5 | 8 | 2 | 8 | 10 | 1 | 9 | 9 | 9 | 14 | 10 |
| ⊟ Foot-and-mouth disease | 1 | 1 | 5 | 7 | 1 | 6 | 8 | 3 | 6 | 1 | 5 | 4 | 6 |
| ⊟ Destruction | 1 | 1 | 0 | 1 | 0 | 0 | 1 | 1 | 0 | 0 | 1 | 0 | 1 |
| ⊟ Stud bull | 1 | 1 | 0 | 1 | 0 | 0 | 1 | 1 | 0 | 0 | 1 | 0 | 1 |
| ⊟ Infection | 1 | 1 | 5 | 7 | 1 | 6 | 8 | 3 | 6 | 1 | 5 | 4 | 6 |

| Topic word | 5/14 | 5/15 | 5/16 | 5/17 | 5/18 | 5/19 | 5/20 | 5/21 | 5/22 | 5/23 | 5/24 | 5/25 | 5/26 | 5/27 | 5/28 | 5/29 | 5/30 | 5/31 |
|---|---|---|---|---|---|---|---|---|---|---|---|---|---|---|---|---|---|---|
| ⊟ Futenma | 6 | 4 | 12 | 9 | 9 | 6 | 8 | 7 | 4 | 11 | 13 | 11 | 10 | 14 | 18 | 5 | 9 | 2 |
| ⊟ Transfer | 3 | 1 | 4 | 2 | 1 | 3 | 2 | 2 | 2 | 8 | 4 | 5 | 3 | 8 | 12 | 5 | 9 | 2 |
| ⊟ Tokunoshima | 0 | 0 | 1 | 1 | 0 | 1 | 0 | 0 | 2 | 1 | 0 | 2 | 0 | 2 | 2 | 1 | 3 | 0 |
| ⊟ Outside prefecture | 3 | 1 | 4 | 2 | 1 | 3 | 2 | 2 | 2 | 8 | 4 | 5 | 3 | 8 | 12 | 5 | 9 | 2 |
| ⊟ Transfer | 3 | 1 | 4 | 2 | 1 | 3 | 2 | 2 | 2 | 8 | 4 | 5 | 3 | 8 | 12 | 5 | 9 | 2 |
| ⊟ Henoko | 0 | 0 | 0 | 2 | 0 | 1 | 1 | 1 | 1 | 6 | 2 | 2 | 2 | 7 | 7 | 1 | 6 | 0 |
| ⊟ Outside prefecture | 3 | 1 | 4 | 2 | 1 | 3 | 2 | 2 | 2 | 8 | 4 | 5 | 3 | 8 | 12 | 5 | 9 | 2 |
| ⊟ XX coalition | 0 | 0 | 5 | 5 | 1 | 1 | 2 | 1 | 1 | 4 | 2 | 3 | 4 | 5 | 11 | 4 | 8 | 2 |
| ⊟ Defection | 0 | 0 | 1 | 3 | 0 | 0 | 1 | 0 | 0 | 1 | 1 | 3 | 2 | 1 | 3 | 2 | 7 | 1 |
| ⊟ Dismissal | 0 | 0 | 0 | 0 | 0 | 0 | 0 | 0 | 0 | 0 | 0 | 0 | 2 | 2 | 11 | 1 | 6 | 0 |
| ⊟ Base | 6 | 4 | 12 | 9 | 9 | 6 | 8 | 7 | 4 | 11 | 13 | 11 | 10 | 14 | 18 | 5 | 9 | 2 |
| ⊟ Foot-and-mouth disease | 7 | 2 | 7 | 8 | 15 | 6 | 9 | 8 | 8 | 7 | 12 | 10 | 5 | 11 | 5 | 4 | 9 | 7 |
| ⊟ Destruction | 0 | 0 | 1 | 4 | 6 | 1 | 3 | 5 | 5 | 2 | 5 | 3 | 2 | 6 | 0 | 2 | 3 | 1 |
| ⊟ Stud bull | 0 | 0 | 1 | 4 | 6 | 1 | 3 | 5 | 5 | 2 | 5 | 3 | 2 | 6 | 0 | 2 | 3 | 1 |
| ⊟ Infection | 7 | 2 | 7 | 8 | 15 | 6 | 9 | 8 | 8 | 7 | 12 | 10 | 5 | 11 | 5 | 4 | 9 | 7 |

FIG. 41

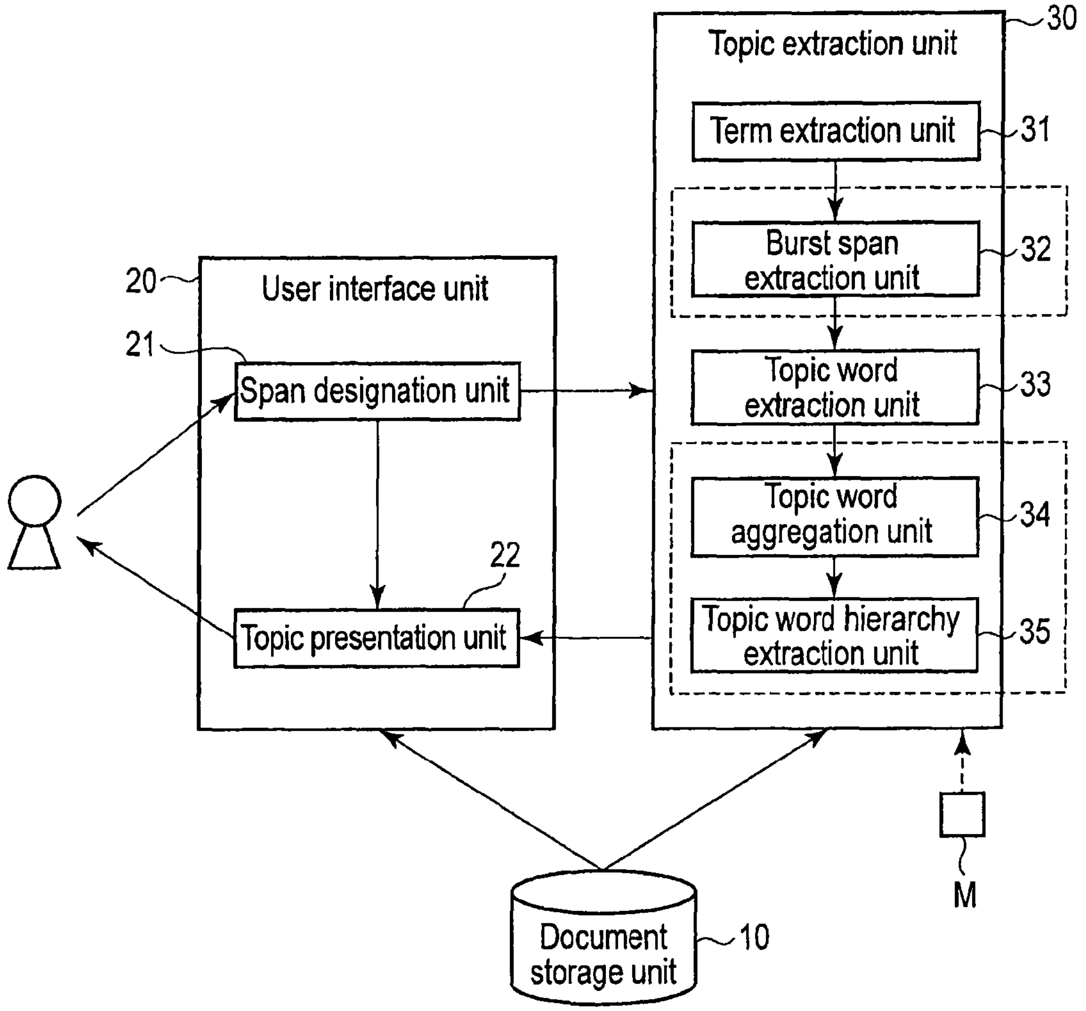
F I G. 42

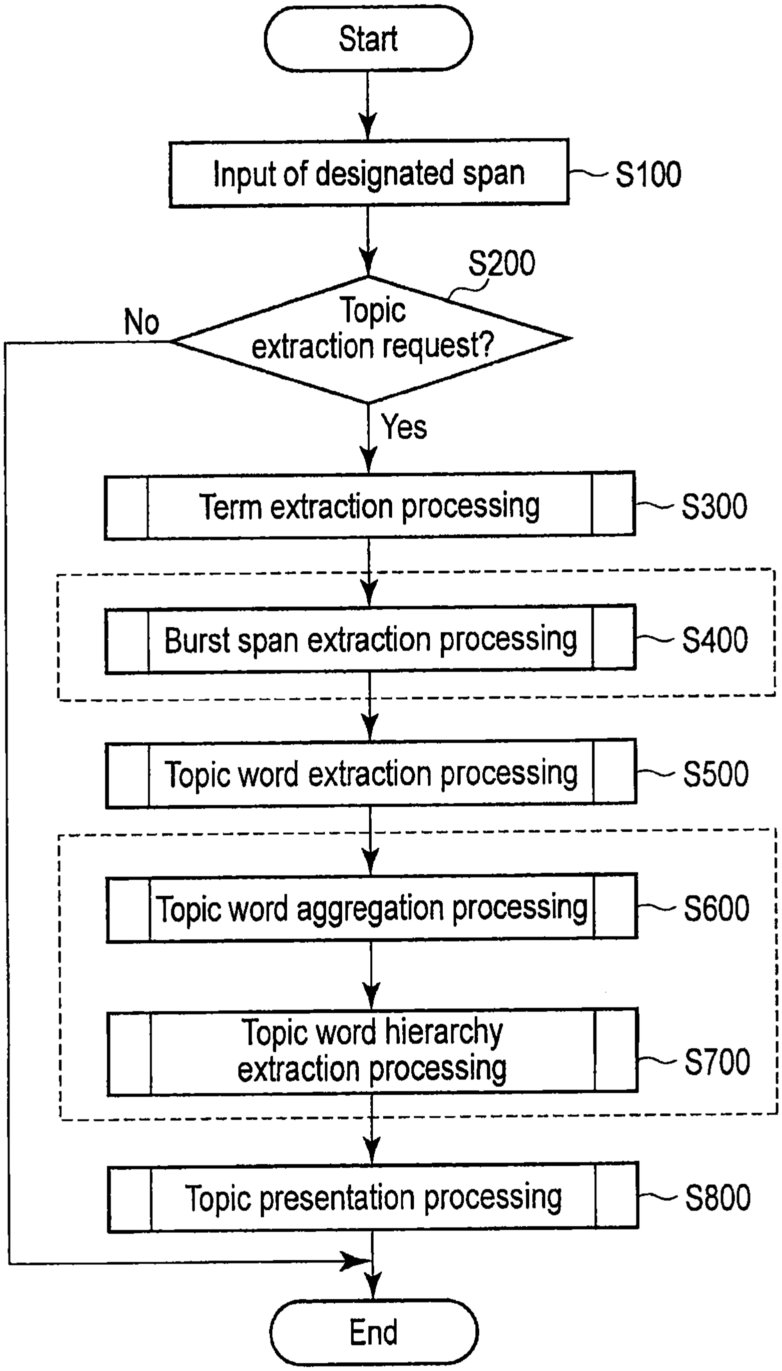
F I G. 43

G80

| Topic word | 5/1 | 5/2 | 5/3 | 5/4 | 5/5 | 5/6 | 5/7 | 5/8 | 5/9 | 5/10 | 5/11 | 5/12 | 5/13 |
|---|---|---|---|---|---|---|---|---|---|---|---|---|---|
| ⊟Futenma, base | 2 | 4 | 5 | 8 | 2 | 8 | 10 | 1 | 9 | 9 | 9 | 14 | 10 |
| ⊟Transfer, outside prefecture | 0 | 0 | 2 | 8 | 1 | 4 | 5 | 0 | 5 | 2 | 3 | 6 | 4 |
| ⊟Tokunoshima | 0 | 0 | 0 | 5 | 1 | 2 | 4 | 0 | 2 | 1 | 2 | 5 | 1 |
| ⊟Transfer, outside prefecture | 0 | 0 | 2 | 8 | 1 | 4 | 5 | 0 | 5 | 2 | 3 | 6 | 4 |
| ⊟Henoko | 0 | 0 | 0 | 4 | 0 | 1 | 2 | 0 | 2 | 1 | 1 | 3 | 2 |
| ⊟XX coalition | 1 | 1 | 1 | 1 | 1 | 4 | 2 | 0 | 3 | 3 | 2 | 2 | 0 |
| ⊟Defection | 0 | 0 | 0 | 0 | 0 | 1 | 0 | 0 | 0 | 0 | 0 | 0 | 0 |
| ⊟Dismissal | 0 | 0 | 0 | 0 | 0 | 0 | 0 | 0 | 0 | 0 | 0 | 0 | 0 |
| ⊟ (Foot-and-mouth disease, infection) | 1 | 1 | 5 | 7 | 1 | 6 | 8 | 3 | 6 | 1 | 5 | 4 | 6 |
| ⊟Destruction, stud bull | 1 | 1 | 0 | 1 | 0 | 0 | 1 | 1 | 0 | 0 | 1 | 0 | 1 |

Foot-and-mouth disease, infection

| Topic word | 5/14 | 5/15 | 5/16 | 5/17 | 5/18 | 5/19 | 5/20 | 5/21 | 5/22 | 5/23 | 5/24 | 5/25 | 5/26 | 5/27 | 5/28 | 5/29 | 5/30 | 5/31 |
|---|---|---|---|---|---|---|---|---|---|---|---|---|---|---|---|---|---|---|
| ⊟Futenma, base | 6 | 4 | 12 | 9 | 9 | 6 | 8 | 7 | 4 | 11 | 13 | 11 | 10 | 14 | 18 | 5 | 9 | 2 |
| ⊟Transfer, outside prefecture | 3 | 1 | 4 | 2 | 1 | 3 | 2 | 2 | 2 | 8 | 4 | 5 | 3 | 8 | 12 | 5 | 9 | 2 |
| ⊟Tokunoshima | 0 | 0 | 1 | 1 | 0 | 1 | 0 | 0 | 2 | 1 | 0 | 2 | 0 | 2 | 2 | 1 | 3 | 0 |
| ⊟Transfer, outside prefecture | 3 | 1 | 4 | 2 | 1 | 3 | 2 | 2 | 2 | 8 | 4 | 5 | 3 | 8 | 12 | 5 | 9 | 2 |
| ⊟Henoko | 0 | 0 | 0 | 2 | 0 | 1 | 1 | 1 | 1 | 6 | 2 | 2 | 2 | 7 | 7 | 1 | 6 | 0 |
| ⊟XX coalition | 0 | 0 | 5 | 5 | 1 | 1 | 2 | 1 | 1 | 4 | 2 | 3 | 4 | 5 | 11 | 4 | 8 | 2 |
| ⊟Defection | 0 | 0 | 1 | 3 | 0 | 0 | 1 | 0 | 0 | 1 | 1 | 3 | 2 | 1 | 3 | 2 | 7 | 1 |
| ⊟Dismissal | 0 | 0 | 0 | 0 | 0 | 0 | 0 | 0 | 0 | 0 | 0 | 0 | 2 | 2 | 11 | 1 | 6 | 0 |
| ⊟ (Foot-and-mouth disease, infection) | 7 | 2 | 7 | 8 | 15 | 6 | 9 | 8 | 8 | 7 | 12 | 10 | 5 | 11 | 5 | 4 | 9 | 7 |
| ⊟Destruction, stud bull | 0 | 0 | 1 | 4 | 6 | 1 | 3 | 5 | 5 | 2 | 5 | 3 | 2 | 6 | 0 | 2 | 3 | 1 |

FIG. 44

TOPIC EXTRACTION APPARATUS AND PROGRAM

CROSS REFERENCE TO RELATED APPLICATIONS

This application is a Continuation application of PCT Application No. PCT/JP2012/056004, filed Mar. 8, 2012 and based upon and claiming the benefit of priority from Japanese Patent Application No. 2011-054497, filed Mar. 11, 2011, the entire contents of all of which are incorporated herein by reference.

FIELD

Embodiments described herein relate generally to a topic extraction apparatus and program.

BACKGROUND

In recent years, with the realization of computers of high performance, capacity enlargement of a storage medium, and spread of computer networks, large quantities of digitized documents can be circulated and exploited on computer systems on a daily basis. The documents mentioned herein mean documents or the like shared on a network, e.g., news articles, e-mail, and web pages. Further, the documents mentioned herein also mean documents exploited in each business enterprise (e.g., discrepancy information of products, information of queries from customers, and others).

In general, there are needs for finding recent topics gaining attention from news articles or blogs in these documents. Likewise, in business enterprises are growing needs for tracking down recently increasing problems from discrepancy information of products that accumulates on a daily basis and requiring early countermeasures and needs for finding new demands from information of queries from customers and exploiting them for product planning.

In regard to these needs, for example, according to a conventional topic extraction system, scoring is performed based on an appearance frequency with respect to each term included in a document set in a designated span, and extraction and hierarchization of topic words are carried out. Furthermore, according to the conventional topic extraction system, history information of a score of each topic word is held, and a status such as "new arrival" is presented based on a difference from a score obtained at the time of previous extraction.

The above-described conventional topic extraction system is usually not problematic, but there is room for further improvement in this system according to the examination conducted by the present inventor.

For example, the conventional topic extraction system uses a method of presenting a status such as "new arrival" based on history information of a score of each topic word. However, this method is suitable for a usage application of becoming aware of a topic "of the moment" in a fixed-point observation manner, but it is insufficient for a usage application of becoming aware of a transition of topics within a fixed span, e.g., one week or one month.

A problem to be solved by the present invention is to provide a topic extraction apparatus and program that can present a transition of topics in a designated target span.

BRIEF DESCRIPTION OF THE DRAWINGS

FIG. 2 is a schematic view showing an example of document data in the first embodiment;

FIG. 3 is a schematic view showing an example of a designation screen in the first embodiment;

FIG. 4 is a schematic view showing an example of a topic presentation screen in the first embodiment;

FIG. 5 is a schematic view showing an example of a term document table in the first embodiment;

FIG. 6 is a schematic view showing an example of a term span table in the first embodiment;

FIG. 7 is a schematic view showing an example of a topic word table in the first embodiment;

FIG. 9 is a flowchart showing a flow of entire term extraction processing in the first embodiment;

FIG. 10 is a flowchart showing a flow of topic extraction processing in the first embodiment;

FIG. 13 is a schematic view showing an example of a topic word table in the second embodiment;

FIG. 14 is a flowchart showing a flow of entire processing in the second embodiment;

FIG. 16 is a schematic view showing an example of a topic presentation screen in the second embodiment;

FIG. 17 is a block diagram showing a configuration of a topic extraction apparatus according to a third embodiment;

FIG. 18 is a schematic view showing an example of a topic word table in the third embodiment;

FIG. 19A is a schematic view showing an example of a hierarchy of topic words in the third embodiment;

FIG. 19B is a schematic view showing an example of the hierarchy of topic words in the third embodiment;

FIG. 21 is a flowchart showing a flow of topic word hierarchy extraction processing in the third embodiment;

FIG. 22 is a flowchart showing a flow of topic presentation processing in the third embodiment;

FIG. 23 is a schematic view showing an example of a topic presentation screen in the third embodiment;

FIG. 24 is a block diagram showing a configuration of a topic extraction apparatus according to a fourth embodiment;

FIG. 25 is a schematic view showing an example of a topic word table in the fourth embodiment;

FIG. 26A is a schematic view showing an example of a hierarchy of topic words in the fourth embodiment;

FIG. 26B is a schematic view showing an example of the hierarchy of topic words in the fourth embodiment;

FIG. 28 is a schematic view showing an example of a topic presentation screen in the fourth embodiment;

FIG. 29 is a block diagram showing a configuration of a topic extraction apparatus according to a fifth embodiment;

FIG. 30 is a schematic view showing an example of a term span table in the fifth embodiment;

FIG. 34 is a schematic view showing an example of a topic presentation screen in the fifth embodiment;

FIG. 35 is a block diagram showing a configuration of a topic extraction apparatus according to a sixth embodiment;

FIG. 36 is a flowchart showing a flow of entire processing in the sixth embodiment;

FIG. 37 is a schematic view showing an example of a topic presentation screen in the sixth embodiment;

FIG. 38 is a block diagram showing a configuration of a topic extraction apparatus according to a seventh embodiment;

FIG. 39 is a flowchart showing a flow of entire processing in the seventh embodiment;

FIG. 41 is a schematic view showing an example of a topic presentation screen in the seventh embodiment;

FIG. 42 is a block diagram showing a configuration of a topic extraction apparatus according to an eighth embodiment;

FIG. 43 is a flowchart showing a flow of entire processing in the eighth embodiment; and FIG. 44 is a schematic view showing an example of a topic presentation screen in the eighth embodiment.

DETAILED DESCRIPTION

Figure 1:
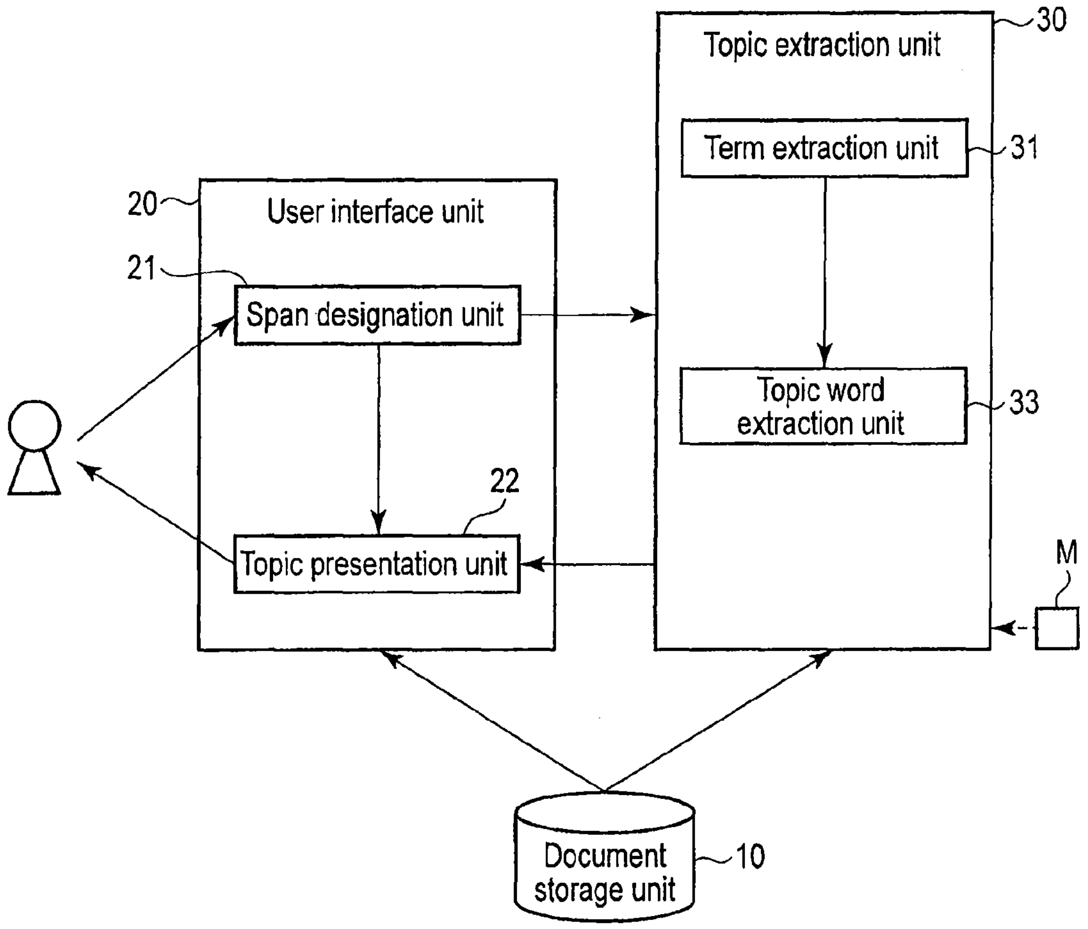
FIG. 1 is a block diagram showing a configuration of a topic extraction apparatus according to a first embodiment.

In general, according to one embodiment, a topic extraction apparatus comprises a document storing device, a span designating device, a topic extracting device, and a topic presenting device.

The document storing device stores a target document set comprising documents each having text information and date and time information.

The span designating device accepts designation of a target span which is a target of topic extraction.

The topic extracting device extracts a topic word which is a term representing a topic in the designated target span from the target document set stored in the document storing device, and calculates freshness which is a scale representing topicality of each topic word.

The topic presenting device presents topic words extracted by the topic extracting device in order of the freshness and also presents the number of documents in which each of the presented topic words appears per unit time.

The topic extracting device comprises a term extracting device and a topic word extracting device.

The term extracting device extracts each term from the target document set stored in the document storing device and calculates an appearance frequency of each term and a document frequency representing the number of documents in which each term appears.

The topic extracting device acquires a document set of appearance documents in which each term appears during the target span with respect to each term extracted by the term extracting device, calculates a topic degree which is a scale representing topic word identity based on a value representing significance of the appearance frequency of the appearance document and a weighted value of the term based on the appearance frequency and the document frequency of the term, and extracts each term whose topic degree is equal to or more than a predetermined value as a topic word, and calculates freshness based on an appearance date and time during the target span with respect to the extracted topic word.

Each embodiment will now be described hereinafter with reference to the drawings but, prior to this, main signs used in each embodiment will be listed below.

SPN: a span (period from start date and time to end date and time).

BST: a burst span (fourth to eighth embodiments).

D: a target document set.

Dspn: a set of documents included in a given span SPN in the target document set D (where $Dspn \subset D$). It is to be noted that a set of documents included in the burst span BST in the target document set D is represented as Dbst (where $Dbst \subset Dspn \subset D$). As described above, in the case of using the burst span BST, "SPN" or the subscript "spn" can be read as "BST" or the subscript "bst", respectively.

Docs: a union of a set of documents Dspni included in a given span SPNi and a set of documents Dspnj included in a given span SPNj in the target document set D ($Docs = Dspni \cup Dspnj$). It is to be noted that, in the case of using burst spans BSTi and BSTj, the union Docs can be read as $Docs = Dbsti \cup Dbstj$.

|Docs|: the number of documents included in the document set Docs.

f(term, d): the number of appearances of a term "term" in a document d.

df(term, Docs): the number of documents each of which includes the term "term" in the document set Docs.

tf(term, Docs): the number of appearances of the term "term" in the document set Docs.

tc(Docs): a total number of terms included in the document set Docs.

time(d): an appearance date and time of a document d.

TD(term, Docs): a set of documents including the term "term" in the document set Docs.

co(term 1, term 2, Docs): the number of documents in which both terms term1 and term2 appear in the document set Docs.

cospan(SPN1, SPN2): a span which is common to the spans SPN1 and SPN2. It is to be noted that, in the case of using burst spans BST1 and BST2, the common span cospan(SPN1, SPN2) can be also read as a common span cospan(BST1, BST2).

|SPN|: a length of the span SPN. It is to be noted that a length of the burst span BST is represented as |BST|.

ITVLS: a set of time intervals at the time of presenting topic data to a user.

For example, in regard to 2010/05/01~2010/05/31, in the case of presenting the number of appearances per day, a set of time intervals ITVLS has the following values.

$$
\begin{aligned}
ITVLS = \{&2010/05/01\ 00{:}00 \sim 2010/05/01\ 23{:}59,\\
&2010/05/02\ 00{:}00 \sim 2010/05/02\ 23{:}59,\\
&\vdots\\
&2010/05/31\ 00{:}00 \text{ to } 2010/05/31\ 23{:}59\}
\end{aligned}
$$

Further, although a description will be given as to an example where a span presented by the set of time intervals ITVLS has the same length as the span SPN, the span is not restricted thereto, and a span longer than the span length SPN may be presented.

The above is the description of the main signs used in each embodiment. These main signs are used for calculation of various values and others in each embodiment.

Furthermore, each embodiment relates to a topic extraction apparatus configured to extract a topic from a digitized document group based on text information and date and time information included in each document. The topic extraction apparatus according to each embodiment can be implemented by either a hardware structure or a combination structure including a hardware resource and software. As the software in the combination structure, as shown in FIG. 1. FIG. 12, FIG. 17, FIG. 24, FIG. 29, FIG. 35, FIG. 38, and FIG. 42, there is used a program configured to realize a function of the topic extraction apparatus in a computer when it is installed to the computer from a network or a non-transitory computer-readable storage medium M in advance and executed by a processor of the computer.

<First Embodiment>

FIG. 1 is a block diagram showing a c configuration of a topic extraction apparatus according to a first embodiment. A document storage unit 10 is a device for storing document data as a target of topic extraction. Although the document storage unit 10 is generally realized by a file system, a document database, or the like, it may be formed of, e.g., a storage device connected through a computer network. The document storage unit 10 stores documents as document data. Each piece of document data has text information and date and time information as shown in FIG. 2.

As shown in FIG. 2, the document storage unit 10 stores a target document set D consisting of documents (d) each having text information (12, 13) and date and time information (14). Each document d has a "document ID" 11 which is a unique identifier. Each document d has text information such as a "title" 12 or "body text" 13 as a text, i.e., data written in a natural language such as Japanese or English. Furthermore, each document d has one or more date and time attributes (date and time information) like a "submission date and time" 14. The topic extraction apparatus obtains freshness of each term or the like based on this date and time attribute. When each document d has date and time attributes, a user may designate which date and time attribute to be used at the time of executing topic extraction.

A user interface unit 20 is a device for accepting designation of a span as a topic extraction target and presenting a result of topic extraction performed by a later-described topic extraction unit 30. The user interface unit is constituted of a span designation unit 21 and a topic presentation unit 22.

The span designation unit 21 is a device for accepting designation of a target span SPN which is a topic extraction target, and it has, e.g., a function of supplying the designated target span and a topic extraction execution request to the topic extraction unit 30. For example, the span designation unit 21 accepts input of a target span designated by a user through such a designation screen G1 as shown in FIG. 3 and supplies this target span and a request for execution in the topic extraction unit 30 to the topic extraction unit 30.

Like a topic presentation screen G10 shown in FIG. 4, the topic presentation unit 22 presents topic words extracted by the topic extraction unit 30 in a freshness order and also presents the number of appearance documents of each presented topic word after a unit span. It is to be noted that the freshness order may be either an ascending order or descending order. Additionally, the unit span is a span shorter than the designated target span.

The topic extraction unit 30 is a device for extracting topic words which are terms representing a topic in the target span SPN designated by the span designation unit 21 from the target document set D stored in the document storage unit 10, and calculating freshness which is a scale representing topicality of each topic word. The topic presentation unit 22 realizes presentation using this freshness so that a user can grasp a transition of topic words in chronological order. In the first embodiment, the topic extraction unit 30 is constituted of a topic extraction unit 31 and a topic word extraction unit 33.

The word extraction unit 31 is a device for extracting each term from the target document set D stored in the document storage unit 10 and calculating an appearance frequency (tf(term, D)) of each term and a document frequency (df (term, D)) representing the number of documents in which each term appears, respectively. In detail, the term extraction unit 31 calculates the number of appearances of each term in each document d, calculates a term frequency and a document frequency in the entire target document set D, and generates such a term document table TDT as shown in FIG. 5. As candidates for terms extracted as topic words, terms included in the term document table are output in the form of the term span table TST as shown in FIG. 6. In the term span table TST, respective terms are held while coordinating their target spans.

As shown in FIG. 5, the term document table TDT holds "appearance frequency" TDT_f which is the number of times that each term included in the target documents D appears in each document. Further, it also holds "document frequency" TDT_df that is the number of documents in which each term appears in the entire target document set D and "term frequency" TDT_tf which is a sum total of appearance frequencies of each term. The term document table TDT is held as internal data in the topic extraction unit 30, and it is used by a burst span extraction unit 32, a topic word extraction unit 33, a topic word aggregation unit 34, and a topic word hierarchy extraction unit 35 which will be described later.

As shown in FIG. 6, the term span table TST holds candidates for a term that is extracted as a topic word and a span which is a target of this term. Each term has "term ID" TST_tid which is a unique identifier, "term" TST_t which is a representation of this term, and "span" TST_span which is a span as a target of this term. Here, the term extraction unit 31 sets a target span acquired from the user interface unit 20 to TST_span with respect to all terms included in the term document table TDT. Therefore, a value of TST_span is "2010/05/01~2010/05/31". Further, the term span table TST is also generated by the later-described burst span extraction unit 32. The burst span extraction unit 32 holds a burst span extracted with respect to each term in TST_span. It is to be noted that particulars of the burst span extraction unit 32 will be described later.

The topic word extraction unit 33 is a device for acquiring a document set (TD(term, Dspn)) of appearance documents in which a corresponding term appears during the target span SPN, calculating a topic degree which is a scale representing topic word identity based on a value representing significance of the appearance frequency of the appearance document and a weighted value of the term based on the appearance frequency and the document frequency of the term, and extracting each term whose topic degree is equal to or more than a predetermined value as a topic word, and calculating freshness based on an appearance date and time during the target span with respect to the extracted topic word.

For example, the topic word extraction unit 33 extracts a topic word by using the term document table TDT and the term span table TST. In this case, the topic word extraction unit 33 calculates appearance documents, a document frequency, and a term frequency during a corresponding span with respect to each term included in the term span table TST, obtains a topic degree representing topic word identity with use of the frequency information and date and time information of the appearance documents, and extracts each topic word based on this topic degree. Moreover, it also obtains freshness representing topicality of the extracted topic word based on a series of date and time information of the appearance documents. Additionally, in regard to the extracted topic word, such a topic word table TWT as shown in FIG. 7 is generated.

As shown in FIG. 7, the topic word table TWT is data that is generated by the topic word extraction unit 33 and output to the topic presentation unit 22 as a result of extraction performed by the topic extraction unit 33. The topic word table TWT is updated by the topic aggregation unit 34 and the topic word hierarchy extraction unit 35 which will be described later. The topic word extraction unit 33 stores "term ID" TWT_tic, "term" TWT_t, "span" TWT_span, "appearance document" TWT_did, "document frequency" TWT_df, "term frequency" TWT_tf, "topic degree" TWT_score, and "freshness" TWT_fresh in columns in the topic word table TWT. "Term ID" TWT_tf, "term" TWT_t, and "span" TWT_span are values of "term ID" TST_tid, "term" TST_t, and "span" TST_spn in the term span table TST. However, the term TWT_t held in the topic word term table TWT is limited to each term that is determined to be a topic word by the topic word extraction unit 33 in the term TST_t included in the term span table TST. In regard to each term, the topic word extraction unit 33 acquires "appearance document" as a document set TD(term, Dspn) that appears during "span", "document frequency" as a document number df(term, Dspn) of "appearance document", and "term frequency" as an appearance frequency tf(term, Dspn) of a term in the document set of "appearance document", and stores them in respective columns of "appearance document" TWT_did, "document frequency" TWT_df, and "term frequency" TWT_tf. Moreover, the topic word extraction unit 33 calculates "topic degree" score(term, SPN) which is a scale representing topic word identity calculated based on these pieces of information and "freshness" fresh (term, SPN) which is a scale representing topicality of the topic and stores them in respective columns of "topic degree" TWT_score and "freshness" TWT_fresh.

An operation of the thus configured topic extraction apparatus will now be described with reference to flowcharts shown in FIG. 8 to FIG. 11.

Figure 8:
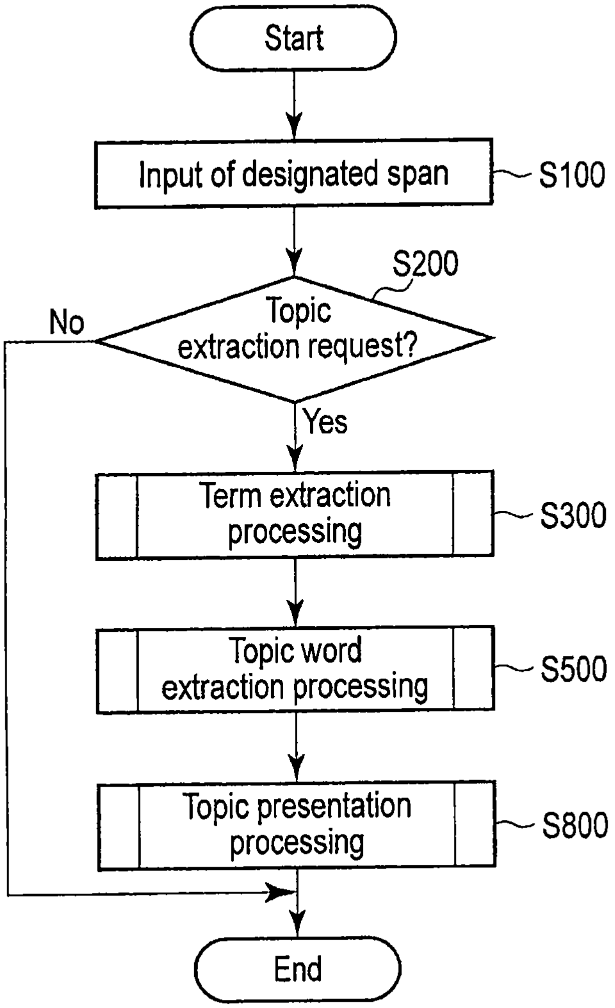
FIG. 8 is a flowchart showing a flow of entire processing in the first embodiment.

As shown in FIG. 8, the span designation unit 21 in the user interface unit 20 accepts designation of a target span from a user (a step S100) and accepts a request for execution of topic extraction (a step S200). In regard to the designation of the target span, for example, as shown in FIG. 3, in the designation screen G1, the user sets a start date and time g1 and an end date and time g2 of the target span. Further, the span designation unit 21 transmits the target span SPN and the request for execution of topic extraction to the topic extraction unit 30 in accordance with a click operation of an "execution" button g3 performed by the user.

When the "execution" button g3 has been clicked in the designation screen G1 and the request for execution of topic extraction has been transmitted, the topic extraction apparatus executes processing of steps S300 to S800 (steps S200—YES).

On the other hand, when a "cancel" button g4 has been clicked in the designation screen G1, the topic extraction apparatus terminates the entire processing (the step S200—NO).

When the request for execution of topic extraction has been transmitted (the step S200—YES), the term extraction unit 31 extracts terms included in the target document set D stored in the document storage unit 10, acquires information of documents in which each term appears or an appearance frequency of each term, and executes term extraction processing of generating the term document table TWT and the term span table TST (the step S300). It is to be noted that particulars of the term extraction processing (the step S300) will be described later.

The topic word extraction unit 33 executes calculation of a topic degree of each term (scoring) with respect to each term in the term span table TST based on information such as documents in which each term appears, a document frequency, an appearance frequency, and others during the span, and executes topic word extraction processing of extracting each topic word (a step S500). Details of the topic word extraction processing will be described later. Additionally, the frequency information, the topic degree, the freshness, and the like obtained by the topic word extraction processing (the step S500) are held in the topic extraction unit 30 as the topic word table TWT.

Further, the topic presentation unit 22 of the user interface unit 2 receives the topic word table TWT from the topic extraction unit 30 and executes topic presentation processing of presenting an extraction result to a user based on this topic word table TWT (the step S800). It is to be noted that details of the topic presentation processing (the step S800) will be described later.

FIG. 9 is a flowchart showing a flow of term extraction processing (the step S300) performed by the term extraction unit 31.

The term extraction unit 31 receives the target span SPN as input from the span designation unit 21 (a step S301). Then, the term extraction unit 31 acquires the target document set D as a target of topic extraction from the document storage unit 10 (a step S302) and creates the blank term document table TDT (a step S303).

Subsequently, the term extraction unit 31 performs morphological analysis with respect to text information of all documents included in the target document set D (a step S304). For example, in the case of document data shown in FIG. 2, assuming that contents of "title" and "body text" are text information, terms "foot-and-mouth disease", "destruction", "public service", "killing", "prevalence", and others are extracted by the morphological analysis. Furthermore, the term extraction unit 31 repeats processing of a step S306 relative to all terms term included in a morphological analysis result (a step S305). Here, the term extraction unit 31 may narrow down target terms based on whether each term is a term corresponding to a predetermined part of speech or whether it is not an unnecessary word. For example, terms are sorted by determining each term whose part of speech corresponds to a noun, a verb formed by adding "suru" to a noun, or a proper noun as a target or determining each term whose part of speech corresponds to a conjunction or an adverb as a non-target. Moreover, in the case of determining whether a newspaper article is a processing target, since terms such as "politics" or "economy" are general terms and do not represent a topic, they are eliminated as unnecessary words.

At the step S306, the term extraction unit 31 obtains an appearance frequency f(term, d) representing the number of times each term "term" appears in a document d in regard to all documents d included in the document set D and repeats processing for storing it in the term document table TDT (a step S307).

At a step S307, for example, in the document data shown in FIG. 2, the appearance frequency f of "foot-and-mouth disease" ("foot-and-mouth disease", d001)=2 is achieved. Further, "2" as the appearance frequency TDT_f having the document ID=d001 is stored in a line TDT_L1 corresponding to "foot-and-mouth disease" in the term document table TDT shown in FIG. 5.

Furthermore, after repetition of the step S306 ends, the term extraction unit 31 obtains the document frequency df(term, D) which is the number of documents in which the term "term" appears and the appearance frequency tf(term, D) which is a sum total of appearance frequencies of the term "term" in the target document set D and stores them in "document frequency" TDT_df and "term frequency" TDT_tf in the term document table TDT, respectively (a step S308).

After the repetition of S305 ends, the term extraction unit 31 executes processing of a step S309 to a step S311.

First, the term extraction unit 31 creates a blank term span table TST (the step S309) and repeats the processing of the step S311 with respect to all terms included in the term document table created by the processing from the beginning to the step S308 (a step S310).

At the step S311, the term extraction unit 31 stores term span data TS={tid, term, SPN} as a set of each term "term" and the target span SPN acquired at the step S301 in the term span table TST. Here, tid is a term ID that is unique to the term span table. Based on the processing from the step S310 to the step S311, the term extraction unit 31 creates initial data TS of the term span table which is a set of term data that can be a target of topic word extraction.

FIG. 10 is a flowchart showing a flow of topic extraction processing (a step S400) performed by the topic word extraction unit 33.

The topic word extraction unit 33 acquires the term document table TDT and the term span table TST (a step S501) and creates a blank topic word table TWT (a step S502).

Then, the topic word extraction unit 33 repeats processing of a step S504 to a step S509 with respect to all pieces of term span data TS in the term span table TST (a step S503). Here, the term span data TS is a set of {term ID tid, term, span SPN} (TS={tid, term, SPN}). Based on this repeated processing, the topic word extraction unit 33 extracts each term that is commensurate with the topic word from terms in the term span data TS and holds as a topic word table TWT statistical information such as frequency information or a topic degree calculated at that moment. Therefore, the topic word extraction unit 33 acquires a column of "document frequency df(term, D)" TDT_df and a column of "term frequency tf(term, D)" TDT_tf in the entire target document set D from the term document table TDT in regard to the term "term" in the term span data TS (a step S504).

Then, the topic word extraction unit 33 makes reference to date and time information in the document storage unit 10 in regard to documents in which each term "term" appears and acquires a set of documents TD(term, Dspn) in which each term "term" appears during the span SPN (a step S505).

Subsequently, the topic word extraction unit 33 calculates the document frequency df(term, Dspn) and the term frequency tf(term, Dspn) of each term "term" during the span SPN from the term document table (a step S506).

Then, the topic word extraction unit 33 calculates the topic degree score(term, SPN) which is a scale representing topic word identity of each term and the freshness fresh (term, SPN) which is a scale representing topicality of each topic by using the information calculated at the steps S504 to S506 (a step S507).

The topic degree score(term, SPN) is calculated based on, e.g., an expression represented by "Expression 1".

[Expression 1]

$$\text{score}(\text{term}, SPN) = \text{topical}(\text{term}, SPN) \times tfidf(\text{term})$$

$$\text{topical}(\text{term}, SPN) = \frac{df(\text{term}, Dspn) - \left(|Dspn|\dfrac{df(\text{term}, D)}{|D|}\right)}{|Dspn|\dfrac{df(\text{term}, D)}{|D|}}$$

$$tfidf(\text{term}) = \frac{tf(\text{term}, D)}{tc(D)} \cdot \log\left(\frac{|D|}{df(\text{term}, D)}\right)$$

Here, a span eccentric value topical (term, SPN) is a value representing significance of an appearance frequency during the span SPN in the entire document set D, and a term that eccentrically appears during the span SPN has a larger value. Moreover, a weighted value tfidf(term) is an index generally used as a weight of each term in document classification or document search. In the case of the topic degree score(term, SPN), the span eccentric value topical (term, SPN) is multiplied by this weighted value tfidf(term) so that a term that has topicality and represents the topic well can have a high topic degree. Additionally, the freshness fresh(term, SPN) is calculated by, e.g., an expression represented by [Expression 2].

[Expression 2]

$$\text{fresh}(\text{term}, SPN) = \left(\text{to} - \frac{\sum_{d \in TD(term, Dspn)} (\text{to} - \text{time}(d))}{df(\text{term}, Dspn)}\right) \cdot \frac{1}{(\text{to} - \text{from})}$$

It is to be noted that, for example, an average appearance time obtained by averaging appearance times time(d) of a document d may be determined as Td and the freshness fresh(term, SPN) may be calculated as follows.

$$\text{fresh}(\text{term}, SPN) = (Td - \text{from}) \cdot \frac{1}{(\text{to} - \text{from})}$$

$$Td = \frac{\sum_{d \in TD(term, Dspn)} \text{time}(d)}{df(\text{term}, Dspn)}$$

The freshness fresh(term, SPN) represents an average of the number of times each term "term" appears during the span SPN and takes a value of 0≤fresh(term, SPN)≤0. When the term "term" appears to be biased toward an end date and time with respect to the span SPN (period from a start date and time to an end date and time), a value of the freshness fresh(term, SPN) approximates 1, and this means that a topic represented by this term is fresh. It is to be noted that, as the topic degree of each term, a value obtained by multiplying the topic degree score(term, SPN) represented in [Expression 1] by this freshness fresh(term, SPN) may be used. In this case, during the span SPN, a topic word is extracted while attaching importance to a recent sensational topic.

Then, the topic word extraction unit 33 judges whether each term "term" is a topic word by using an expression score(term, SPN)>α (a step S508). Here, α is a threshold value used for judging whether the term "term" is appropriate as a topic word, and it may be preset by the topic extraction apparatus or may be set by a user every time the topic extraction processing is executed.

When the term has been determined as a topic word (the step S508—YES), the topic word extraction unit 33 determines this term "term" as the topic word and adds calculated statistical information to the topic word table TWT (a step S509). Here, when a given term "term" has been determined as a topic word, the topic word extraction unit 33 holds values of "term ID" TST_tid, "term" TST_t, and "span" TST_spn in the term span data TS in "term ID" TWT_tid, "term" TWT_t, and "span" TWT_spn in the topic word table TWT in FIG. 7, respectively. Additionally, the topic word extraction unit 33 holds the document set TD(term, Dspn), the document frequency df(term, Dspn), the term frequency tf(term, Dspn), the topic degree score(term, SPN), and the freshness(term, SPN) calculated at the steps S505 to S507 in "appearance document" TWT_did, "document frequency" TWT_df, "term frequency" TWT_tf, "topic degree" TWT_score, and "freshness" TWT_fresh, respectively.

Figure 11:
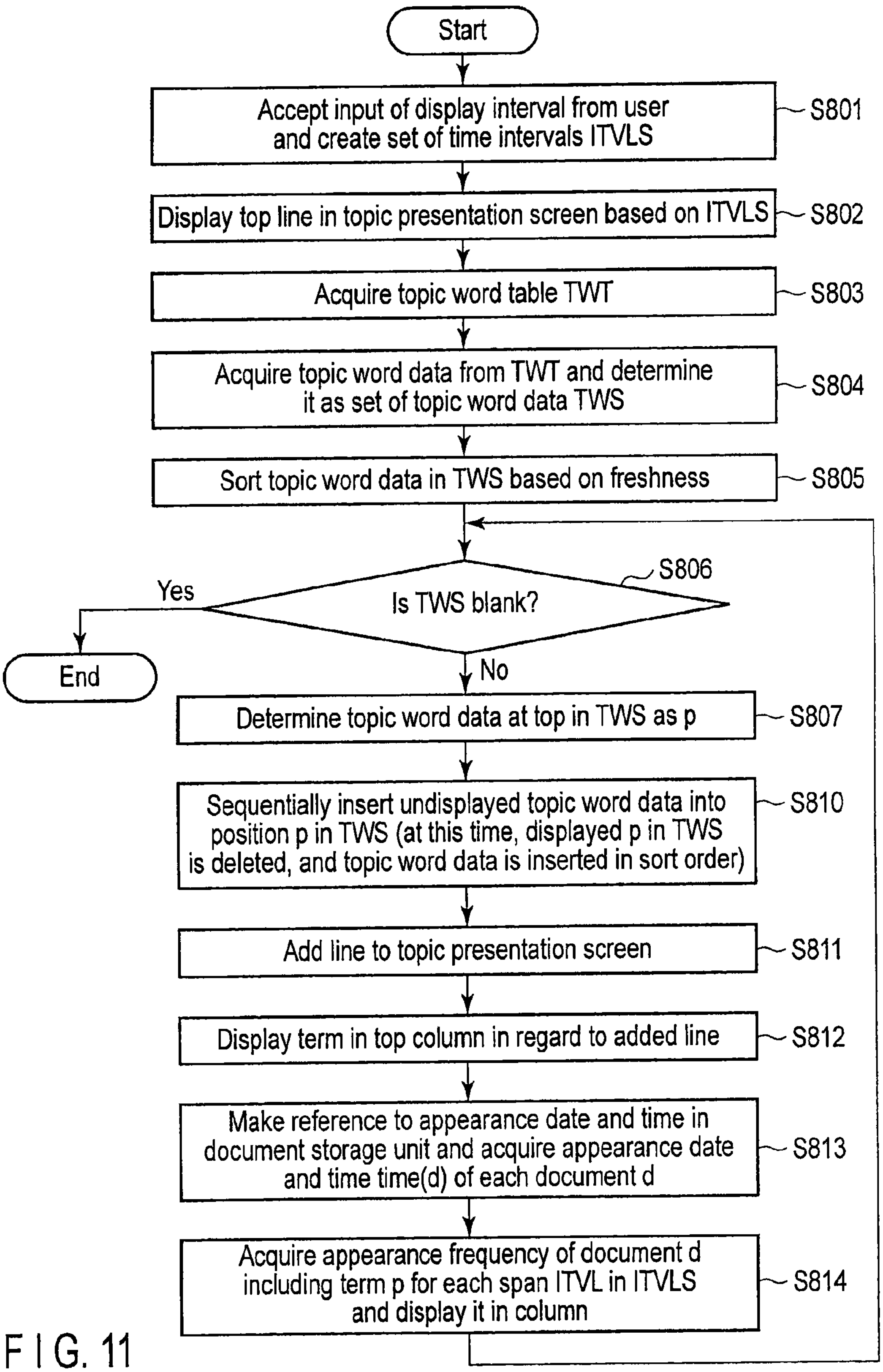
FIG. 11 is a flowchart showing a flow of topic presentation processing in the first embodiment.

FIG. 11 is a flowchart showing a flow of the topic presentation processing (a step S800) performed by the topic presentation unit 22.

The topic presentation unit 22 accepts designation of a time interval for display from a user and creates a set of time intervals ITVLS (a step S801). It is assumed that the time interval is designated by a user with "display interval" g5 in the designation screen G1 shown in FIG. 3 at the time of designating a target span (the step S100). The topic word presentation unit 22 creates each time interval ITVLS obtained by dividing "span" designated in the designation screen G1 by a user in accordance with each "display interval". For example, when "2010/05/01~2010/05/31" is input into "span" and "date" is input into the display span in the designation screen G1, the topic presentation unit 22 creates the time interval ITVLS as follows.

$$
\begin{aligned}
ITVLS = \ &\{2010/05/01\ 00{:}00 \sim 2010/05/01\ 23{:}59,\\
&2010/05/02\ 00{:}00 \sim 2010/05/02\ 23{:}59,\\
&\quad \vdots \qquad\qquad \vdots\\
&2010/05/31\ 00{:}00 \text{ to } 2010/05/31\ 23{:}59
\end{aligned}
$$

It is to be noted that a user may designate arbitrary time intervals for the set of time intervals ITVLS. Then, the topic presentation unit 22 displays contents of each element in the set of time intervals ITVLS in a last line of the presentation screen G10 as shown in FIG. 4. In the example of FIG. 4, each element in the set of time intervals ITVLS is displayed as "May 1, 10", "May 2, 10" . . . , "May 31, 10" in a simplified manner.

Then, the topic presentation unit 22 acquires the topic word table TWT from the topic extraction unit 30 and determines a set of topic word data, which includes topic word data in the topic word table TWT as elements, as TWS (a step S804).

Subsequently, the topic presentation unit 22 sorts the elements in the topic word data set TWS based on "freshness" TWT_fresh (a step S805). As a result, the topic words are sorted in chronological order.

Then, the topic presentation unit 22 repeats processing of steps S807 to S814 until the topic word data set TWS becomes blank (a step S806). First, the topic presentation unit 22 determines topic word data that is provided at the top of the topic word data set TWS as p (the step S807).

Subsequently, the topic presentation unit 22 sequentially inserts undisplayed topic word data into a position of the topic word data p at the top of the topic word data set TWS (a step S810). At the step S810, the topic presentation unit 22 deletes the displayed topic word data p in the topic word data set TWS and then inserts the topic word data in the topic word data set TWS into the position of p in the order of sorting performed at the step S805.

Further, the topic presentation unit 22 displays information of the topic word data p in the topic presentation screen G10 by processing of steps S811 to S814. Therefore, the topic presentation unit 22 adds a line to the topic presentation screen G10 (the step S811) and displays "term" of the topic word data p in a top column in the added line (a step S812).

Subsequently, the topic presentation unit 22 makes reference to the document storage unit 10 in regard to each document d in "appearance document" in the topic word data p and acquires each appearance date and time time(d) (a step S813). The topic presentation unit 22 counts the acquired appearance date and time time(d) of each document in regard to each span ITVL in ITVLS to obtain an appearance frequency of each document including each term "term" in the topic word data p with respect to each span ITVL, and it displays this appearance frequency in a corresponding column (the step S814). To display each appearance frequency, numerical values, a bar chart, a line chart, or the like is used. As a result, the appearance frequency of each document d is displayed in each line of the topic word data in the topic presentation screen G10.

As described above, the topic presentation unit 22 sorts all pieces of topic word data in the topic word table TWT based on the freshness in chronological order by repeating the processing of the steps S807 to S814 until TWS becomes blank, and it displays the obtained data in the topic word presentation screen G10.

As described above, according to this embodiment, in regard to each extracted term, each term whose topic degree, which represents topic word identity, is not lower than a predetermined value is extracted as a topic word, freshness of the extracted topic word is calculated based on an appearance date and time in a target span, the extracted topic word is presented in the order of freshness, the number of appearance documents in which each presented topic word appears per unit span is presented, thereby presenting each topic in the designated target span with respect to a target document set. In particular, a transition of topics with time can be presented with its sensation degree based on the sort using the freshness and the presentation of the number of appearance documents in which each topic word appears per unit time. For example, as shown in FIG. 4, it is possible to present an overall transition of topics, e.g., the most resent sensational topic, a topic that was sensational a while ago, and a topic that attracts attention for a long time.

A description will now be given as to a case where one or more types of processing selected from topic word aggregation processing (a step S600), topic word hierarchy extraction processing (a step S700), and burst span extraction processing (step S400) are added to the processing (the steps S100 to S300, S500, S800) explained in the first embodiment with reference to each of the following embodiments. It is to be noted that each processing (the step S400, S600, or S700) can be independently added (these steps do not functionally have a dependence relationship). However, in the case of adding the processing, the processing must be executed in step number ascending order (the processing order has a dependence relationship).

Second to eighth embodiments will now be sequentially described hereinafter.

<Second Embodiment>

Figure 12:
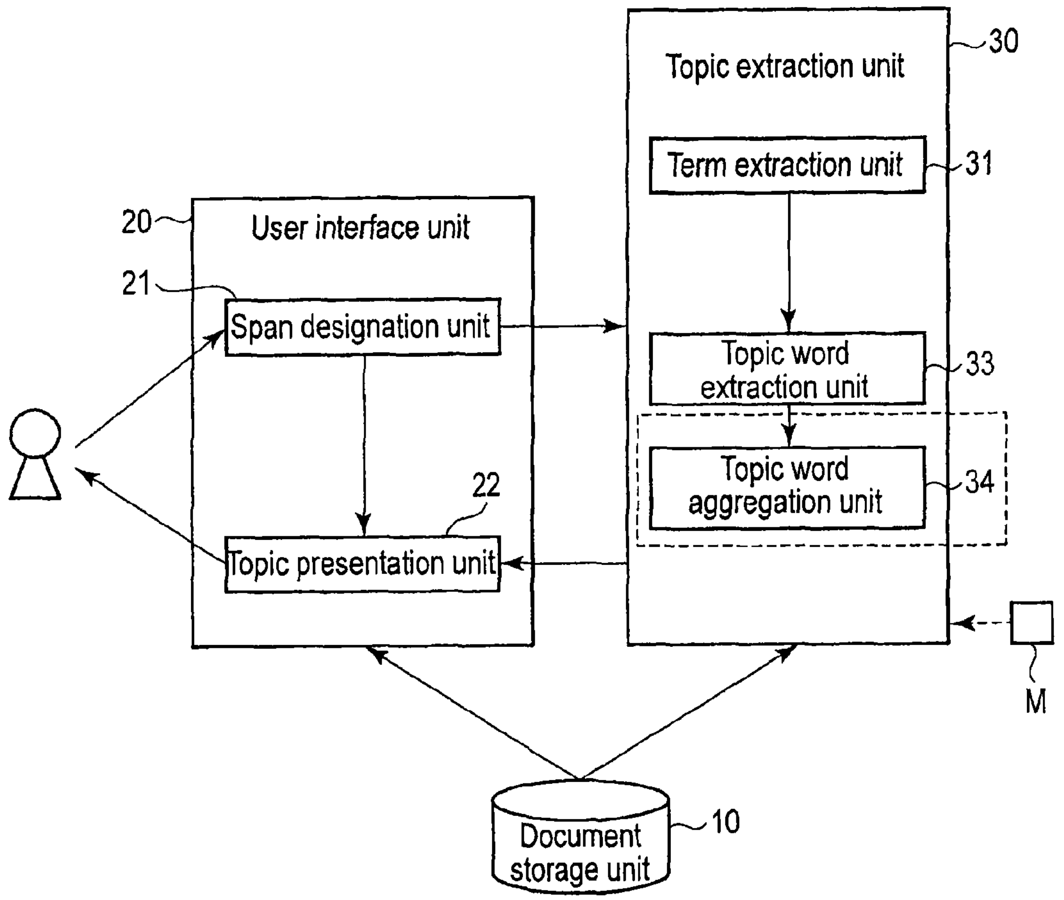
FIG. 12 is a block diagram showing a configuration of a topic extraction apparatus according to a second embodiment.

FIG. 12 is a block diagram showing a configuration of a topic extraction apparatus according to a second embodiment, like reference numerals denote parts equal to those in FIG. 1 to omit a detailed description thereof, and a changed part (a part surrounded by a broken line) will be mainly explained. In each of the following embodiments, a description on overlapping parts will be likewise omitted.

This embodiment is a modification of the first embodiment, and it further comprises a topic aggregation unit 34.

Here, the topic aggregation unit 34 is a device for calculating similarity (sim(TWi, TWj)) between topic words based on each appearance document (Dspni, Dspnj) in a target span, an appearance frequency (df(termi, docs), df(termj, docs)) of the appearance document, date and time information (SPN1, SPN2) of the same relative to each topic word (termi, termj) extracted by the topic word extraction unit 33, extracting a topic word group including topic words representing the same topic in the target span by using the similarity, acquiring a document set (TDm=TDi∩TDj) of the appearance documents in the target span with respect to the topic word group, and recalculating a topic degree and freshness based on frequency information (dfm, tfk) and date and time information of the document set.

Specifically, in regard to terms included in a topic word table TWT, the topic word aggregation unit 34 aggregates terms representing the same topic as one term. In this case, the topic word aggregation unit 34 calculates the similarity of two terms by using information of appearance documents in the topic word table TWT, integrates topic word data of terms having the large similarities, and corrects the topic word table TWT as shown in FIG. 13. In this integration, it also integrates spans and appearance documents of two terms to be integrated and also corrects a document frequency, a term frequency, a topic degree, and freshness based on this integration.

FIG. 13 is a schematic view showing an example of data in the topic word table TWT updated by the topic word aggregation unit 34. In regard to terms in the topic word table TWT, the topic word aggregation unit 34 integrates topic word data (lines in the topic word table TWT) of terms which have been determined to represent the same topic. For example, when the topic word aggregation unit 34 has determined a term TWT_t "foot-and-mouth disease" in a first line TWT_L1 and a term TWT_t "infection" in a second line TWT_L2 in the topic word table TWT as the same topic, it integrates respective pieces of topic word data of these two terms as represented by a first line TWT_L1' in FIG. 6. At the time of integration, values of "appearance document" TWT_did, "document frequency" TWT_df, "term frequency" TWT_tf, "topic degree" TWT_score, and "freshness" TWT_fresh are corrected.

An operation of the thus configured topic extraction apparatus will now be described with reference to flowcharts of FIG. 14 and FIG. 15.

Now, steps S100 and S300 shown in FIG. 14 are executed in the same manner as the above description, and frequency information, a topic degree, freshness, or the like obtained by the topic word extraction processing are held in a topic extraction unit 30 as the topic word table TWT.

Then, the topic word aggregation unit 34 executes topic word aggregation processing of aggregating terms representing the same topic relative to terms in the topic word table TWT (a step S600). Respective pieces of topic word data of terms determined to represent the same topic are integrated by the topic word aggregation processing.

Figure 15:
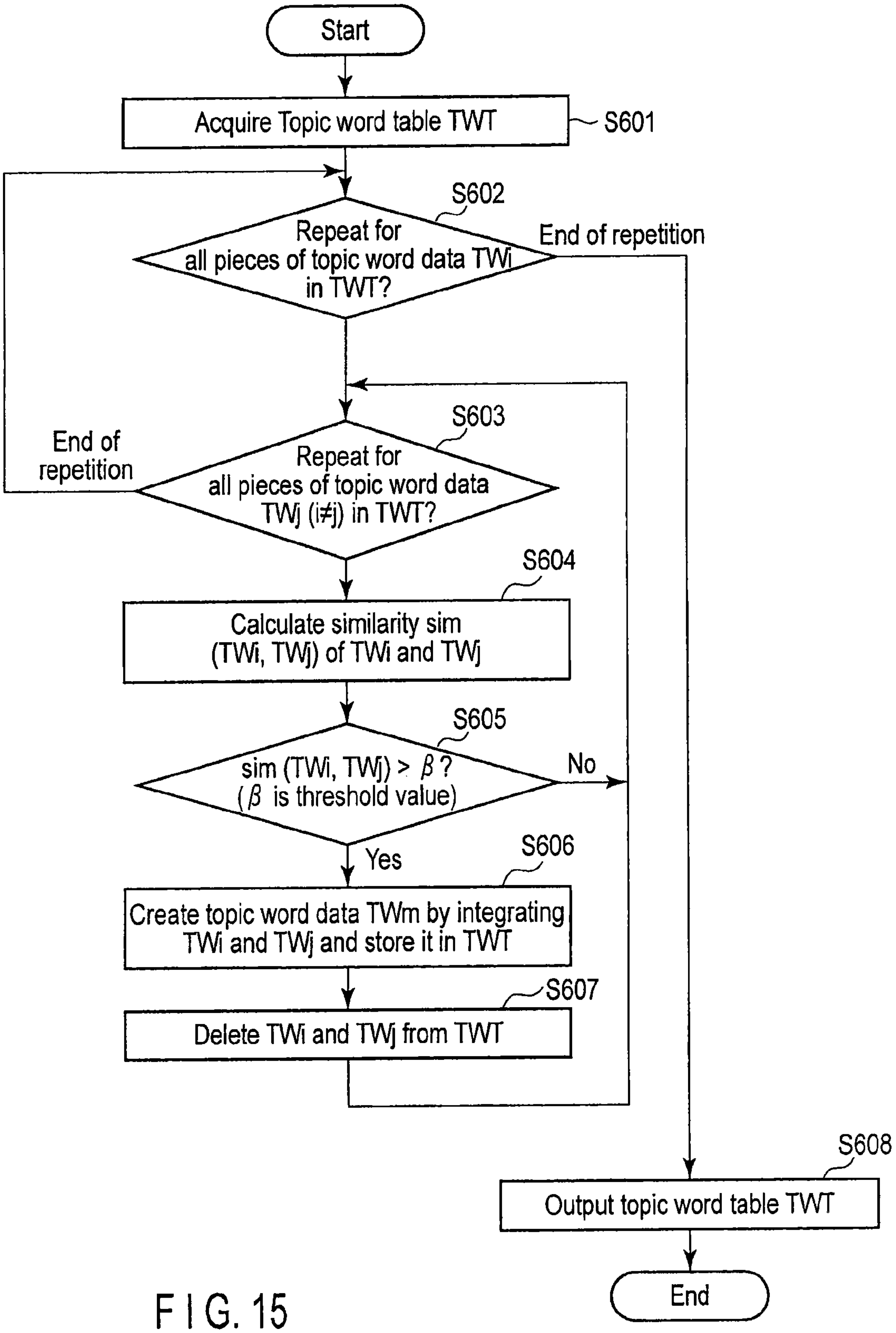
FIG. 15 is a flowchart showing a flow of topic word aggregation processing in the second embodiment.

FIG. 15 is a flowchart showing a flow of the topic word aggregation processing (the step S600) executed by the topic word aggregation unit 34.

The topic word aggregation unit 34 acquires the topic word table TWT (a step S601). Further, the topic word aggregation unit 34 repeats processing of a step S604 to a step S606 with respect to all pieces of topic word data TWi in the topic word table TWT and also all pieces of topic word data TWj in the topic word table TWT (a step S602, a step S603). However, TWi≠TWj is achieved.

Based on the repetition of the steps S602 to S603, the topic word aggregation unit 34 judges whether terms included in the topic word table TWT are to be aggregated. Thus, the topic word aggregation unit 34 calculates similarity sim(TWi, TWj) of pieces of topic word data TWi and TWj by using an expression shown in [Expression 3] at the step S604.

[Expression 3]

$$sim(TWi, TWj) = cosim(termi, termj, Dspni \cup Dspnj) \times cospanrate(SPNi, SPNj)$$

$$cosim(term1, term2, Docs) = \mathrm{dice}(term1, term2, Docs) = \frac{2co(term1, term2, Docs)}{df(term1, Docs) + df(term2, Docs)}$$

$$cospanrate(SPN1, SPN2) = \frac{2cospan(SPN1, SPN2)}{|SPN1| + |SPN2|}$$

Here, co-occurrence similarity cosim(termi, termj, Dspni∪Dspnj) is an index representing the intensity of co-occurrence of two terms, termi and termj. As the co-occurrence similarity, it is possible to adopt a Dice coefficient, a Jaccard coefficient, or the like that is generally used in term extraction or related term extraction. In this embodiment, the Dice coefficient (dice (term1, term2, Docs)) is used. A document union Docs represents the above-described unit Dspni∪Dspnj.

A common span rate cospanrate(SPNi, SPNj) is an index representing a rate of a span that is common in "spans" of TWi and TWj. Furthermore, the topic word aggregation unit 34 judges whether the pieces of topic word data TWi and TWj correspond to the same topic based on the similarity sim(TWi, TWj) and a threshold value β in accordance with whether a relationship of the similarity sim(TWi, TWj)>β is met (a step S605). Here, the threshold value β is a reference value used for judging whether the topic word data TWi and the topic word data TWj represent the same topic, and it may be preset by the topic extraction apparatus or may be set by a user every time topic extraction processing is executed.

If the topic word data TWi and the topic word data TWj have been determined to represent the same topic (the step S605—YES), the topic word aggregation unit 34 creates topic word data TWm obtained by integrating the pieces of topic word data TWi and TWj in the topic word table TWT and stores it in the topic word table TWT (a step S606).

At this time, values of respective items in the integrated topic word data TWm are as follows.

That is, the topic word data TWa={a term ID termIDa, a term terma, a span SPNa, an appearance document TDa, a document frequency dfa, a term frequency tfa, a topic degree scorea, freshness fresha} (a is a subscript i, j, or m) is represented. Furthermore, respective items of the integrated topic word data will be additionally described as follows.

Term ID: a term ID of one of the integrated pieces of topic word data.

termIDm=termIDi

Term: a set of terms in two pieces of topic word data.

termm={termi,termj}

Span: a span that is common to spans of two pieces of topic word data.

SPNm=cospan(SPNi,SPNj)

Set of appearance documents: a set of documents common in appearance frequencies of two pieces of topic word data.

$TDm=TDi \cap TDj$

Document frequency: the number of documents included in TDm $dfm=|TDm|$

Term frequency: an average of appearance frequencies of terms termi, termj included in the term set TDm.

tfk=(tf(termi,TDk)+tf(termj,TDk))/2

Topic degree: a topic degree recalculated by using the above values based on the expression represented in [Expression 3].

scorek=score(termk,SPNk), where df(termk, Dspnk)=dfk, $tf(termk,\mathcal{D})=(tf(termi,\mathcal{D})+tf(termj,\mathcal{D}))/2$ Freshness: Freshness recalculated by using the above values based on the expression represented in [Expression 2].

freshk=fresh(termk,SPNk)

The above is a supplementary explanation of the respective items in the integrated topic word data TWm.

Moreover, after the integration processing, the topic word aggregation unit 34 eliminates the pieces of topic word data TWi, TWj from the topic word table TWT (a step S607). At the end, the topic word aggregation unit 34 outputs the topic word table TWT (a step S608).

After end of the topic word aggregation processing, a topic presentation unit 22 receives the topic word table TWT generated by the above-described processing (the steps S300, S500, S600) from the topic extraction unit 30 and executes topic presentation processing of presenting a topic presentation screen G20 showing an extraction result to a user based on this topic word table TWT as shown in FIG. 16 (a step S800). In the topic presentation screen G20, topic words are aggregated and presented at positions of "foot-and-mouth disease, infection", "Futenma, base", "transfer, outside prefecture", and "destruction, stud bull" in topic words.

As described above, according to this embodiment, in addition to the effects of the first embodiment, the configuration in which terms representing the same topic are appropriately aggregated based on a series of similarities and appearance dates and times enables topic words to be accurately extracted. Furthermore, when a topic is presented as a set of terms, a user can more accurately grasp contents of the topic.

<Third Embodiment>

FIG. 17 is a block diagram showing a configuration of a topic extraction apparatus according to a third embodiment.

This embodiment is a modification of the first embodiment, and the topic extraction unit 30 shown in FIG. 1 further comprises a topic word hierarchy extraction unit 35.

Here, the topic word hierarchy extraction unit 35 is a device for calculating relevance of each topic word (termi, termj) extracted by the topic word extraction unit 33 based on an appearance frequency (df(term1, Docs), df(term2, Docs)) of each appearance document and date and time information (SPNi, SPNj) during a target span and extracting a hierarchical relationship between the topic words based on the relevance.

Specifically, the topic word hierarchy extraction unit 35 extracts a hierarchy of topic words based on a topic word table TWT. The topic word hierarchy extraction unit 35 calculates relevance between the two terms by using information of each appearance document in the topic word table TWT and determines a hierarchical relationship between the terms based on this relevance. Further, a determined result is provided to the topic word table TWT.

FIG. 18 is a schematic view showing an example of data in the topic word table TWT updated by the topic word hierarchy extraction unit 35. The topic word hierarchy extraction unit 35 judges a parent-child relationship between terms of terms in the topic word table TWT and stores a term ID of a parent term of each term in a column "parent term" 709 in the topic word table TWT to express the parent-child relationship. For example, in regard to terms TWT_t "foot-and-mouth disease", "infection", "Futenma", "base", "transfer", "outside prefecture", "Tokunoshima", "stud bull", "destruction", and "Henoko" in the topic word table TWT shown in FIG. 7, when the topic word hierarchy extraction unit 35 extracts such hierarchical relationships as shown in FIG. 19A and FIG. 19B, it stores a value like "parent term" TWT_root in FIG. 18 with respect to each piece of topic word data. Here, "parent term" represents a term ID of a parent term of each term. However, as a parent term for the most significant term (in the above example, "Futenma", "base", "foot-and-mouth disease", and "infection"), a value (root) is stored.

Furthermore, in the topic extraction apparatus, since the topic word hierarchy extraction unit 35 is further provided, a topic presentation unit 22 has a function of presenting a parent-child relationship between topic terms in accordance with a hierarchical relationship of the topic words extracted by the topic word hierarchy extraction unit 35 and presenting the topic words having a sibling relationship in order of freshness.

An operation of the thus configured topic extraction apparatus will now be described with reference to flowcharts of FIG. 20 to FIG. 22.

Figure 20:
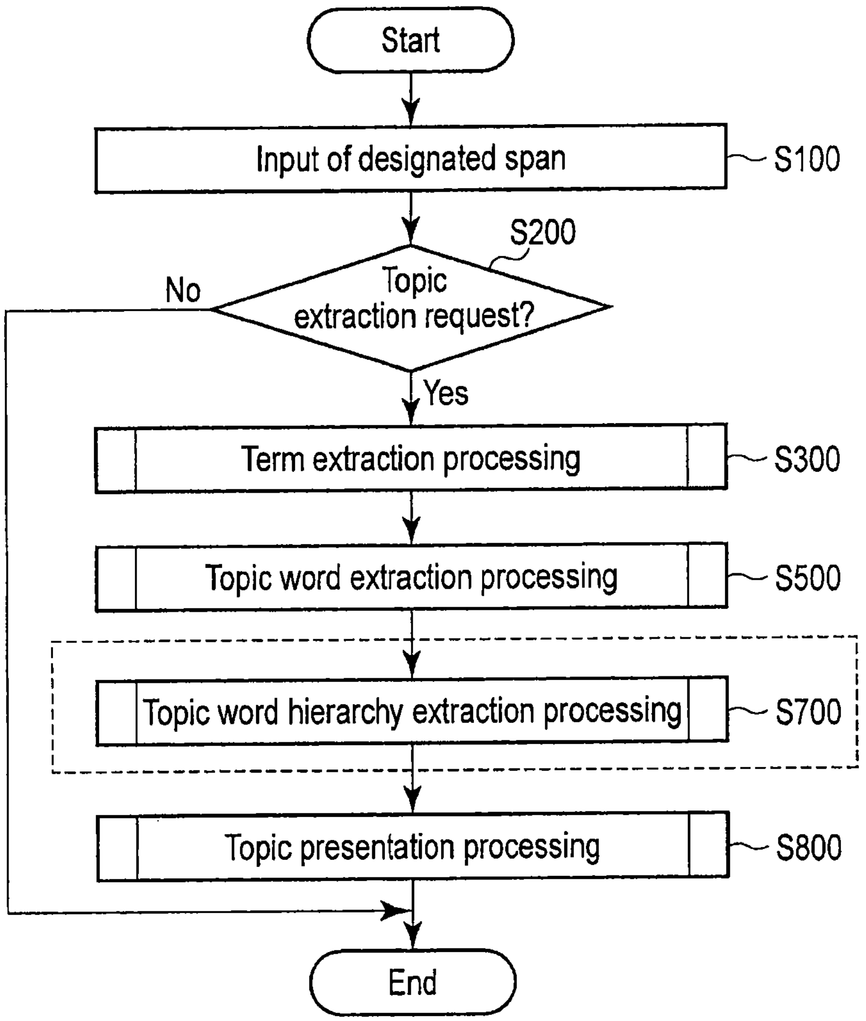
FIG. 20 is a flowchart showing a flow of entire processing in the third embodiment.

Now, steps S100 to S300 and S500 shown in FIG. 20 are executed in the same manner as that described above, and frequency information, topic degrees, freshness and others obtained by topic word extraction processing are held in a topic extraction unit 30 as a topic word table TWT.

Then, the topic word hierarchy extraction unit 35 extracts a hierarchical relationship between terms from the terms in the topic word table TWT and executes topic word hierarchy extraction processing of giving information of this hierarchical structure to the topic word table TWT (a step S700).

It is to be noted that details of the topic word hierarchy extraction processing will be described later.

After end of the topic word hierarchy processing, the topic presentation unit 22 receives the topic word table TWT generated by the above-described processing (the steps S300, S500, S700) from the topic extraction unit 30 and executes topic presentation processing of presenting an extraction result to a user based on this topic word table TWT (a step S800). It is to be noted that details of the topic presentation processing will be described later.

FIG. 21 is a flowchart showing a flow of topic word hierarchy extraction processing (the step S700) performed by the topic word hierarchy extraction unit 35.

The topic word hierarchy extraction unit 35 acquires the topic word table TWT (a step S701). Further, the topic word hierarchy extraction unit 35 repeats processing of a step S704 to a step S706 (steps S702, S703) with respect to all pieces of topic word data TWi in the topic word table TWT and all pieces of topic word data TWj in the topic word table TWT. However, TWi≠TWj is attained.

Based on this repetition of the steps S702 and S703, the topic word hierarchy extraction unit 35 judges parent-child relationships between all terms included in the topic word table TWT. Therefore, the topic word hierarchy extraction unit 35 calculates relevance rel(TWi, TWj) between the pieces of topic word data TWi and TWj by using an expression represented in [Expression 4] at a step S704.

$$rel(TWi, TWj) = mi\left(termi, termj, Dspni \bigcup Dspnj\right) \times cospanrate(SPNi, SPNj) \quad \text{[Expression 4]}$$

$$mi(term1, term2, Docs) = \frac{a}{n}\log\left(\frac{an}{(a+b)(a+c)}\right) + \frac{b}{n}\log\left(\frac{bn}{(a+b)(b+d)}\right) + \frac{c}{n}\log\left(\frac{cn}{(c+d)(a+c)}\right) + \frac{d}{n}\log\left(\frac{dn}{(c+d)(b+d)}\right)$$

where a, b, c, and d in mi(term1, term2, Docs) have the following values.

| | term1 is included | term1 is not included | Sum total |
|---|---|---|---|
| term2 is included | a = co(term1, term2, Docs) | b = y1 − a | y1 = df(term2, Docs) |
| term2 is not included | c = x1 − a | d = y2 − c | y2 = n − y1 |
| Sum total | x1 = df(term1, Docs) | x2 = n − x1 | n = \|Docs\| |

Here, mi(termi, termj, Dspni⋃Dspnj) is an expression used for calculating intensity of a relationship of one term termj seen from the other term termi based on a mutual information amount in a union of appearance documents in which the pieces of topic word data TWi and TWj appear. Furthermore, a co-occurrence span rate cospanrate(SPNi, SPNj) is an index used for considering commonality of a span by using the same expression as that represented in [Expression 3]. Then, whether the pieces of topic word data TWi and TWj have a parent-child relationship is judged by using an expression relevance rel(TWi, TWj)>γ (a step S705). Here, a threshold value γ is a reference value used for judging whether the topic word data TWi should be determined as a parent of the topic word data TWj, and it may be set in advance or may be set by a user every time the topic word extraction processing is executed.

Moreover, if it has been determined that the topic word data TWi and the topic word data TWj have a parent-child relationship (the step S705—YES), the topic word hierarchy extraction unit 35 determines TWi as a parent and TWj as a child and stores a value of "term ID" (TWT_tid shown in FIG. 7) of the topic word data TWi of "parent term" of the topic word data TWj (TWT_root shown in FIG. 7) in "parent term" of the topic word data TWj (TWT_root shown in FIG. 7) (a step S706). In regard to a value stored in "parent term", please see a description of FIG. 18.

The topic word hierarchy extraction unit 35 repeats the judgment on the parent-child relationship between terms in the topic word table TWT based on repetition of the steps S702 to S703 until the parent-child relationship is not extracted (a step S707).

Additionally, if the parent-child relationship is not extracted at all in the repetition of the step S702 and the step S703 (the step S707—YES), the topic word hierarchy extraction unit 35 outputs the topic word table TWT (a step S708). Based on the repetition of the step S707, the topic word hierarchy extraction unit 35 extracts the parent-child relationships between terms in the topic word table TWT in a multi-level manner. Further, a user may designate the level up to which extraction of the hierarchical relation can take place.

FIG. 22 is a flowchart showing a flow of topic presentation processing (a step S800) performed by the topic presentation unit 22.

Now, steps S801 to S803 are executed in the same manner as the above description.

Then the topic presentation unit 22 acquires the topic word table TWT from the topic word extraction unit 30, obtains topic word data having "parent term" being "(root)" (i.e., the most significant in the hierarchy) from the topic word table TWT, and determines as TWS a set of topic word data including such topic word data as an element (a step S804'). For instance, in the example shown in FIG. 7, TWS={"Futenma", "base", "foot-and-mouth disease", "infection"} is achieved.

Then, the topic presentation unit 22 sorts elements in the topic word data set TWS by using "freshness" TWT_fresh (a step S805). As a result, topics hierarchically having a sibling relationship are sorted in chronological order. This can be likewise applied to later-described processing of a step S809;

Subsequently, the topic presentation unit 22 repeats processing of steps S807 to S814 until the topic word data set TWS becomes blank (a step S806).

First, the topic presentation unit 22 determines topic word data provided at the top in the topic word data set TWS as p (a step S807). For example, in the above-described example, the topic word data at the top in TWS={"Futenma", "base", "foot-and-mouth disease", "infection"} is p="Futenma".

Subsequently, the topic presentation unit 22 acquires a set CTS of topic word data having p as a parent from the topic word table TWT. In the above-described example, since p="Futenma" is achieved, CTS={"transfer", "outside prefecture", "xx coalition"} is achieved.

Then, the topic presentation unit 22 sorts elements in the topic word data set CTS having the topic word data p at the top as a parent based on "freshness" (a step S809).

Subsequently, the topic presentation unit 22 inserts all pieces of topic word data in the topic word data set CTS into the position of the topic word data p at the top in the topic word data set TWS (a step S810'). At this time, the topic presentation unit 22 deletes the topic word data p at the top in the topic word data set TWS and then inserts the pieces of topic word data each having p as a parent in the topic word data set CTS into the position of p in the order of sorting performed at the step S809.

For instance, TWS={"Futenma", "base", "foot-and-mouth disease", "infection"}, p="Futenma", and CTS={"transfer", "outside prefecture", "xx coalition"} are provided in the above example, but TWS={"transfer", "outside prefecture", "xx coalition", "base", "foot-and-mouth disease", "infection"} is provided by the processing at the step S810.

Furthermore, the topic presentation unit 22 displays information of the topic word data p in a topic presentation screen by the processing of the steps S811 to S814 as shown in FIG. 23.

As described above, the topic presentation unit 22 displays all pieces of topic word data in the topic word table TWT in the topic word presentation screen G30 by repeating the processing of the steps S807 to S814 until TWS becomes blank while sorting all pieces of topic word data in the topic word table TWT in chronological order in accordance with the hierarchical structure or in accordance with freshness in the case of pieces of topic word data having the sibling relationship.

As described above, according to this embodiment, in addition to the effects of the first embodiment, the structure that topic words are hierarchized based on relevance and a series of appearance dates and times enables hierarchizing the topic words in accordance with not only the scale of the number of documents but also the scale of a span of each topic. A user can look down on large topic trends within a target span by overviewing topic words in upper and lower layers and can be aware of details of a featured topic while delving into this topic. Moreover, since topics in the same level are sorted based on freshness, a transition of topics can be presented based on various gradations.

<Fourth Embodiment>

FIG. 24 is a block diagram showing a configuration of a topic extraction apparatus according to a fourth embodiment.

This embodiment is an example obtained by combining the first embodiment with the second and third embodiments, and the topic extraction unit 30 shown in FIG. 1 further comprises the topic word aggregation unit 34 depicted in FIG. 12 and the topic word hierarchy extraction unit 35 shown in FIG. 17.

Accordingly, each of a topic word table TWT and a hierarchical structure has a hierarchical structure relative to aggregated topic words as shown in FIG. 25, FIG. 26A, and FIG. 26B.

Figure 27:
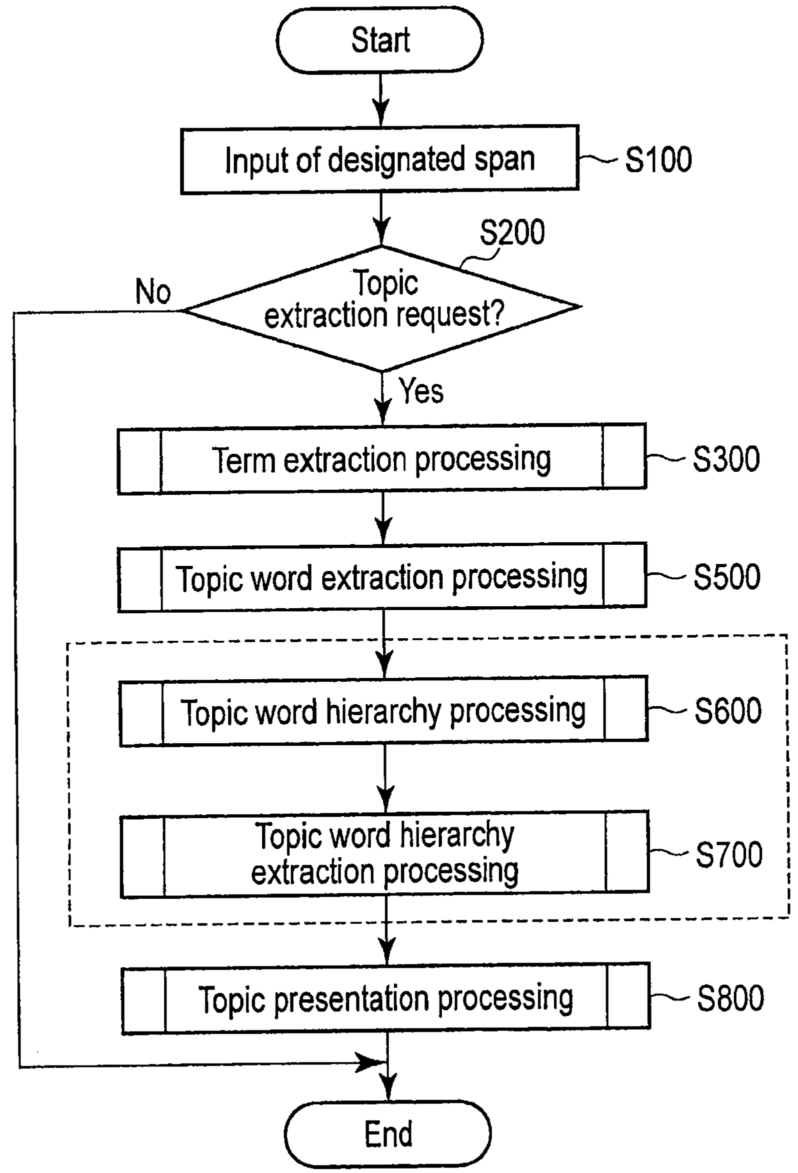
FIG. 27 is a flowchart showing a flow of entire processing in the fourth embodiment.

According to the above-described structure, as shown in FIG. 27, after the above-described topic word extraction processing (a step S500), the topic word aggregation processing (a step S600) and a topic word hierarchy extraction processing (a step S700) are executed.

As a result, as shown in FIG. 28, topic words are aggregated, and a topic presentation screen G40 clearly showing a hierarchical structure of the topic words is presented.

As described above, according to this embodiment, the effects of the first, second, and third embodiments can be obtained at the same time.

<Fifth Embodiment>

FIG. 29 is a block diagram showing a configuration of a topic extraction apparatus according to a fifth embodiment.

This embodiment is a modification of the first embodiment, and the topic extraction unit 30 shown in FIG. 1 further comprises a burst span extraction unit 32.

Here, the burst span extraction unit 32 is a device for acquiring an appearance date and time series (TIMES) in a document set (TD(term, Dspn)) of appearance documents with respect to each term extracted by a term extraction unit 31, extracting burst spans (BST) during which each term ("term") intensively appears by using the appearance date and time series, and holding a set of each term and each burst span (TS={term, BST}) as a different term.

Specifically, the burst span extraction unit 32 performs extraction of a burst span BST in which each term is concentrated with use of a series of dates and times of documents in which each document appears with respect to each of terms included in a term document table TDT, and it writes this burst span in "span" TST_spn in a term span table TST. Here, when one term has burst spans BSTi, BSTj, . . . , sets of {term, span} (term span data) equal to the extracted burst spans BSTi, BSTj, . . . in number are generated, and different "term IDs" are given to these sets, respectively. That is, even if terms are the same in representation, they are processed as different terms when they have different burst spans BSTi, BSTj, . . . . As a result, the term span table TST shown in, e.g., FIG. 30 is generated. The term span table TST generated here is input into the topic word extraction unit 33. In the configuration including the burst span extraction unit 32, the topic word table TWT is generated by the burst span extraction unit 32 based on the generated term span table TST.

It is to be noted that the topic word table TWT in a case where the burst span extraction unit 32 is incorporated in accordance with this term span table TST can be obtained by substituting a span TST_spn in FIG. 30 for the span TWT_span in each of FIG. 7, FIG. 13, FIG. 18, and FIG. 15.

Further, since the topic word extraction apparatus further comprises the burst span extraction unit 32, the topic word extraction unit 33 and the topic word presentation unit 22 have the following functions.

That is, the topic word extraction unit 33 has a function of acquiring a document set (TD(term, Dbst)) of appearance documents in which each term appears during each burst span based on a set (TS={term, BST}) of each term and each burst span extracted by the burst span extraction unit 32 without acquiring a document set of appearance documents in which each term appears during a target span in regard to terms extracted by the burst span extraction unit 32 among the respective terms extracted by term extraction unit 31, calculating a topic degree (score(term, BST)) based on a value representing significance of an appearance frequency of each appearance document (topical (term, BST)) and a weighted value (tfidf(term)), extracting each term whose topic degree is not lower than a predetermined value ($\alpha$) as a topic word, and calculating freshness(fresh(term, BST)) of each extracted topic word based on a series of appearance dates and times during the burst span.

The topic presentation unit 22 has a function of highlighting a part of each presented topic word corresponding to the burst span extracted by the burst span extraction unit 32.

An operation of the thus configured topic extraction apparatus will now be described with reference to flowcharts of FIG. 31 to FIG. 33.

Figure 31:
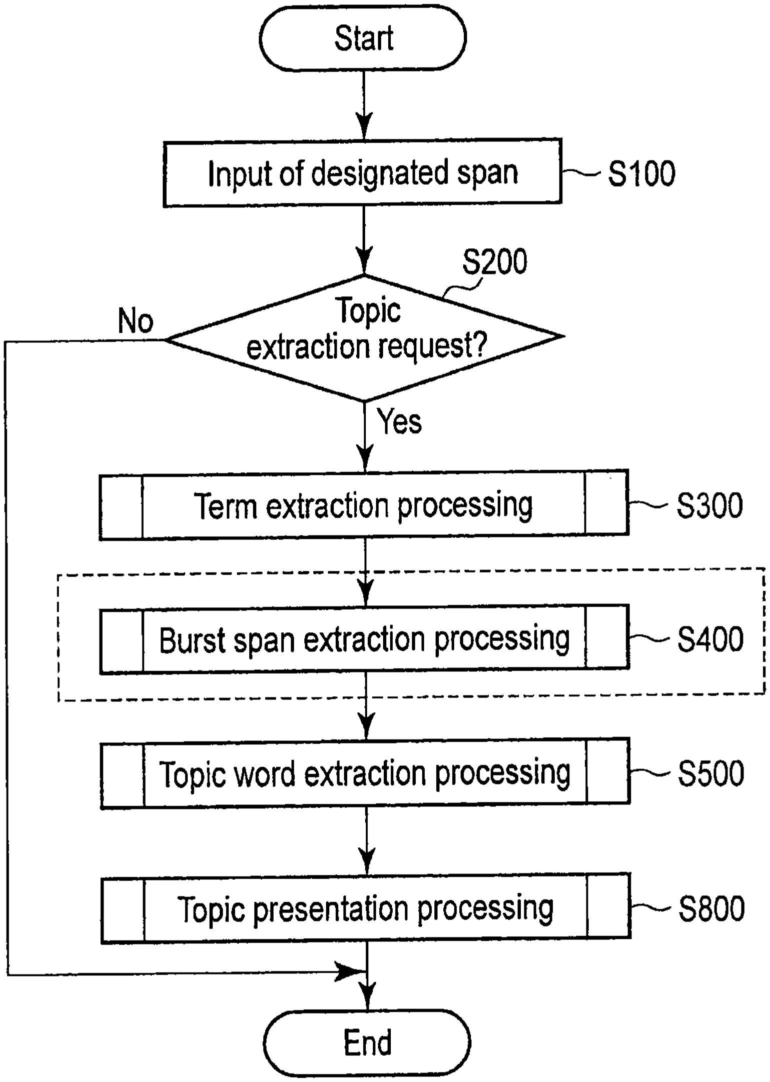
FIG. 31 is a flowchart showing a flow of entire processing in the fifth embodiment.

Now, steps S100 to S300 shown in FIG. 31 are executed in the same manner as in the above description, and the term document table TDT obtained by the term extraction processing is held in the topic extraction unit 30.

Then, the burst span extraction unit 32 executes processing of extracting the burst span BST of each term included in the term document table TDT and generating the term span table TST corresponding to a set of term span data (which will be referred to as burst span extraction processing hereinafter) (a step S400). It is to be noted that details of the burst span extraction processing will be described later.

Subsequently, the topic word extraction unit 33 executes topic word extraction processing of calculating a topic degree (scoring) of each term based on information such as each document in which the term appears during a corresponding span, a document frequency, or an appearance frequency and extracting each topic word (a step S500) with respect to each term included in the term span table TST generated by the burst span extraction processing (step S400). Details of the topic word extraction processing will be described later. Furthermore, frequency information, the topic degree, freshness, and others obtained by this topic word extraction processing are held in the topic extraction unit 30 as the topic word table TWT.

Moreover, the topic presentation unit 22 executes the topic presentation processing of receiving the topic word table TWT generated by the above-described processing (the step S300 to the step S700) from the topic extraction unit 30 and presenting an extraction result to a user based on this topic word table TWT (a step S800). It is to be noted that details of the topic presentation processing will be described later.

Figure 32:
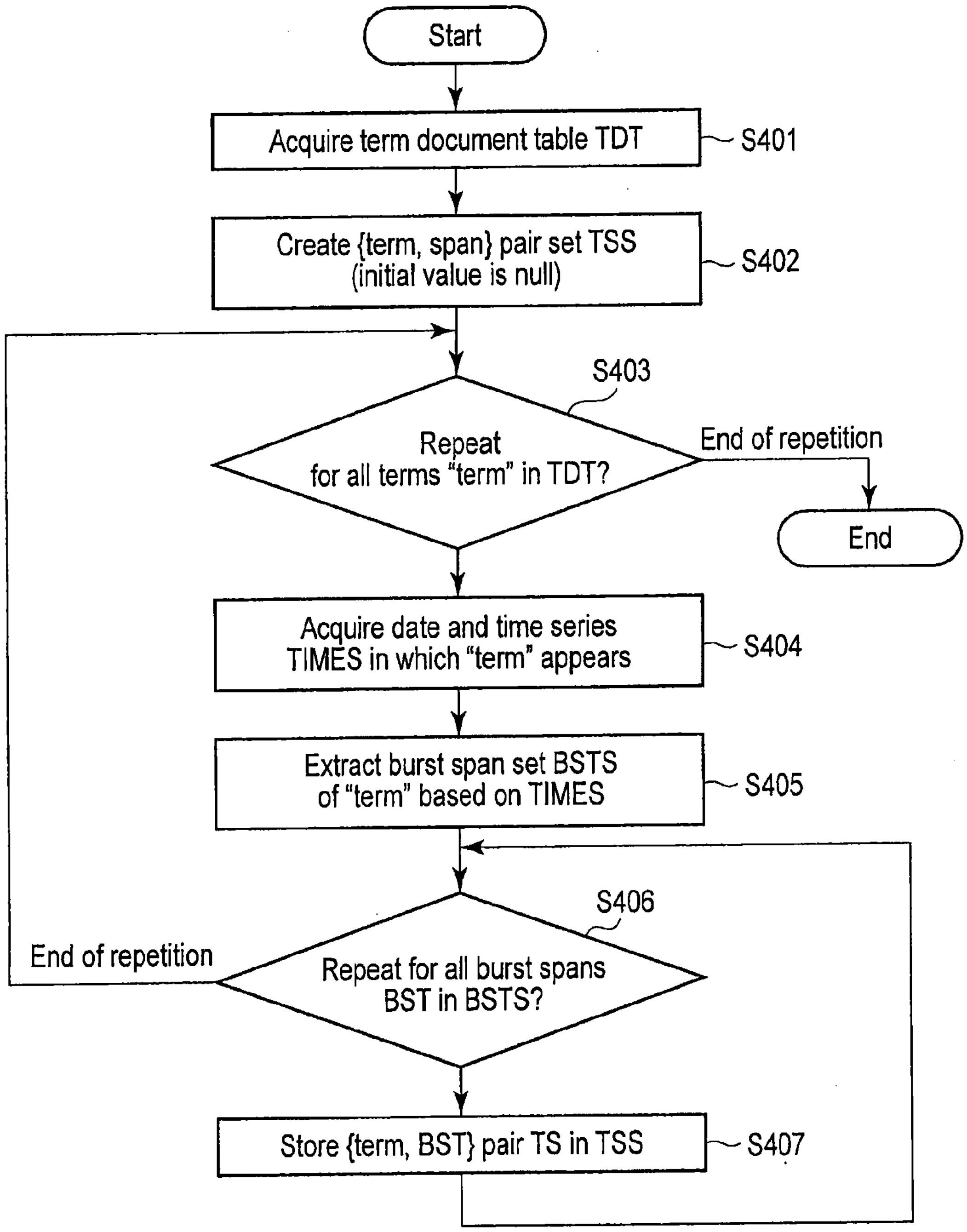
FIG. 32 is a flowchart showing a flow of burst span extraction processing in the fifth embodiment.

FIG. 32 is a flowchart showing a flow of the burst span extraction processing (a step S400) executed by the burst span extraction unit 32.

The burst span extraction unit 32 acquires the term document table TDT (a step S401) and creates a set of {term, span} pairs TSS (a step S402). Here, an initial value of the set of pairs TSS is null.

Then, the burst span extraction unit 32 repeats processing of steps S404 to S407 with respect to all terms term included in the term document table TDT (a step S403).

At the step S404, the burst span extraction unit 32 acquires each appearance document of a term "term" from the term document table TDT (a document having an "appearance frequency" that is 1 or more) and acquires date and time information of this appearance document as an appearance data and time series TIMES of the term "term".

Subsequently, the burst span extraction unit 32 extracts a burst span set BSTS of the term "term" based on the appearance date and time series TIMES of the term "term" (a step S405). Here, as a burst span extraction technique, for example, a technique disclosed in Non-patent Literature 1 can be used. According to this extraction technique, spans in which the term appears with a high frequency are acquired based on an appearance date and time series (which is TIMES here) of the term. In addition, as to a term that evenly appears, the burst span BST is not extracted.

After the step S405, the burst span extraction unit 32 repeats the step S407 with respect to all the burst spans BST in the burst span set BSTS (a step S406) and adds a {term, BST} pair TS to the pair set TSS. With the above-described burst span extraction processing, the terms in the term document table TDT are divided by the burst spans BST, and they are processed as different terms in subsequent processing.

Figure 33:
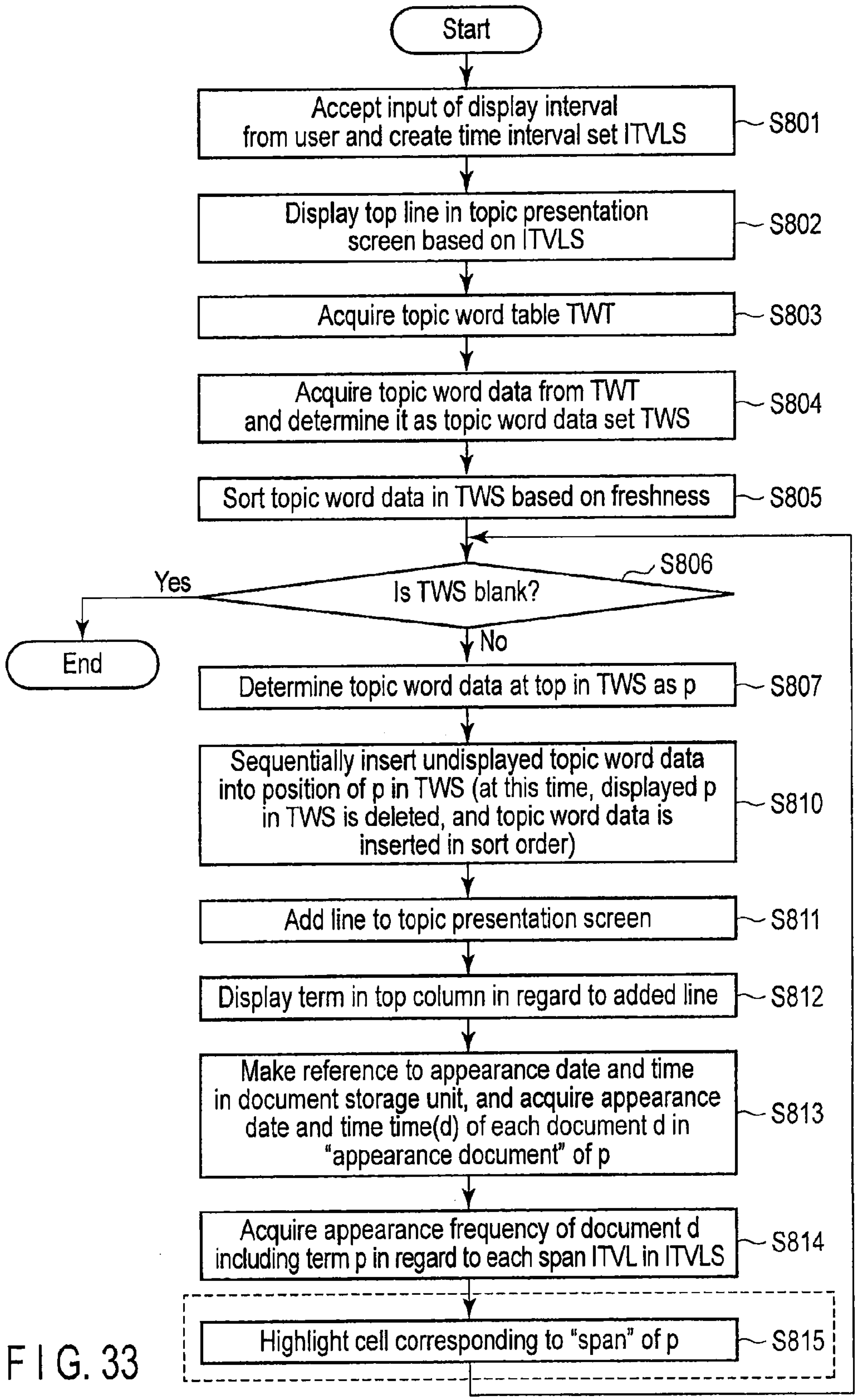
FIG. 33 is a flowchart showing a flow of topic presentation processing of processing in the fifth embodiment.

FIG. 33 is a flowchart showing a flow of the topic presentation processing (the step S800) executed by the topic presentation unit 22.

Here, steps S801 to S814 are executed in the same manner as in the above description. However, the above-described topic degree score(term, SPN) is calculated as a topic degree score(term, BST) based on the burst span BST in place of the span SPN (topical (term, SPN) based on Dspn is calculated as topical (term, BST) based on Dbst). Likewise, the freshness fresh(term, SPN) is calculated as freshness fresh(term, BST) based on the burst span BST in place of the span SPN.

Furthermore, after the step S814, in regard to a line added at a step S811, the topic presentation unit 22 highlights a cell in a column corresponding to "span" of the topic ward data p (a step S815). Based on this processing, as shown in FIG. 34, a timing at which a corresponding topic is lively (the burst span BST) is highlighted in a topic presentation screen G50.

As described above, according to this embodiment, in addition to the effects of the first embodiment, with the configuration where terms are divided in accordance with each burst span and each topic word is extracted, even the same topic words are presented in accordance with each lively timing, thereby presenting relevance between topic words that differ depending on each timing.

In addition, as another conventional topic extraction system different from the conventional topic extraction system described in the prior art, document clustering is hierarchically repeated to provide topics as a document set (a topic cluster), and topic levels, i.e., a topic cluster and a sub-topic cluster are extracted. According to this topic extraction system, each topic word is extracted in accordance with each topic cluster based on an appearance frequency, and it is presented based on date and time information.

However, according to an examination conducted by the present inventor, another topic extraction system is suitable for a use application for delving into a topic and understanding particulars thereof since topics are segmented as a document set, but it is not suitable for a use application for understanding a transition of topics.

Moreover, in news or blogs, terms representing the same topic or terms concerning a topic vary with time. Therefore, in the case of obtaining relevance between terms, a span in which the terms appear must be considered. Additionally, in the case of paying attention to one term to represent a topic, one term may represent a different topic depending on each appearance time, and hence the appearance time of the term must be taken into consideration.

For example, a term "transfer" relative to Futenma Base in Okinawa prefecture represents a topic "transfer to Tokunoshima" at a given time, and it also represents a topic "transfer to Henoko" at anther time. In this manner, one term may represent a topic that differs each time.

However, according to the conventional topic extraction system described in Prior Art, since the appearance time of each term is not considered, different topics may be possibly mixed in and taken as the same topic depending on the appearance time of each term.

In the conventional topic extraction system, extracting topics as a topic cluster enables assimilating mix-up of topics. However, according to another conventional topic extraction system, at the time of extracting topic words, the same mix-up may possibly occur.

On the other hand, according to this embodiment, as described above, the configuration in which terms are divided in accordance with each burst span and then topic words are extracted as described above enables avoiding mix-up of topics.

<Sixth Embodiment>

FIG. 35 is a block diagram showing a configuration of a topic extraction apparatus according to a sixth embodiment.

This embodiment is an example of combining the first embodiment with the second and fifth embodiments, and the topic extraction unit 30 shown in FIG. 1 further comprises the topic word aggregation unit 34 depicted in FIG. 12 and the burst span extraction unit 32 shown in FIG. 29.

According to the above-described configuration, as shown in FIG. 36, after the burst span extraction processing (the step S400), the topic word aggregation processing (the step S600) is executed. Therefore, in the topic word aggregation processing (the step S600), similarity sim(TWi, TWj) based on a span SPN is calculated as similarity sim(TWi, TWj) based on a burst span BST in place of the span SPN. In addition, co-occurrence similarity co(termi, termj, Dspni∪Dspnj) based on the span SPN is calculated as co-occurrence similarity co(termi, termj, Dbsti∪Dbstj) based on the burst span in place of the span SPN. Likewise, a common span rate cospanrate(SPNi, SPNj) based on the span SPN is calculated as a common span rate cospanrate (BSTi, BSTj) based on the burst span BST in place of the span SPN.

As a result, a topic presentation screen G60 in which topic words are aggregated and the burst span is emphasized is presented as shown in FIG. 37.

As described above, according to this embodiment, the effects of the first, second, and fifth embodiments can be obtained at the same time.

<Seventh Embodiment>

FIG. 38 is a block diagram showing a configuration of a topic extraction apparatus according to a seventh embodiment.

This embodiment is an example of combining the first embodiment with the third and fifth embodiments, and the topic extraction unit 30 shown in FIG. 1 further comprises the topic word hierarchy extraction unit 35 depicted in FIG. 17 and the burst span extraction unit 32 shown in FIG. 29.

According to the above-described configuration, as shown in FIG. 39. after the burst span extraction processing (the step S40), the topic word hierarchy extraction processing (the step S700) is executed. Therefore, in the topic word hierarchy extraction processing (the step S700), relevance rel(TWi, TWj) based on a span SPN is calculated as relevance rel(TWi, TWj) based on a burst span BST in place of the span SPN. In addition, a mutual information amount mi(termi, termj, Dspni∪Dbstj) based on the span SPN is calculated as a mutual information amount mi(termi, termj, Dbsti∪Dbstj) based on the burst span BST in place of the span SPN. Likewise, common span rate cospanrate(SPNi, SPNj) based on the span SPN is calculated as a common span rate cospanrate(BSTi, BSTj) based on the burst span BST in place of the span SPN.

Figure 40:
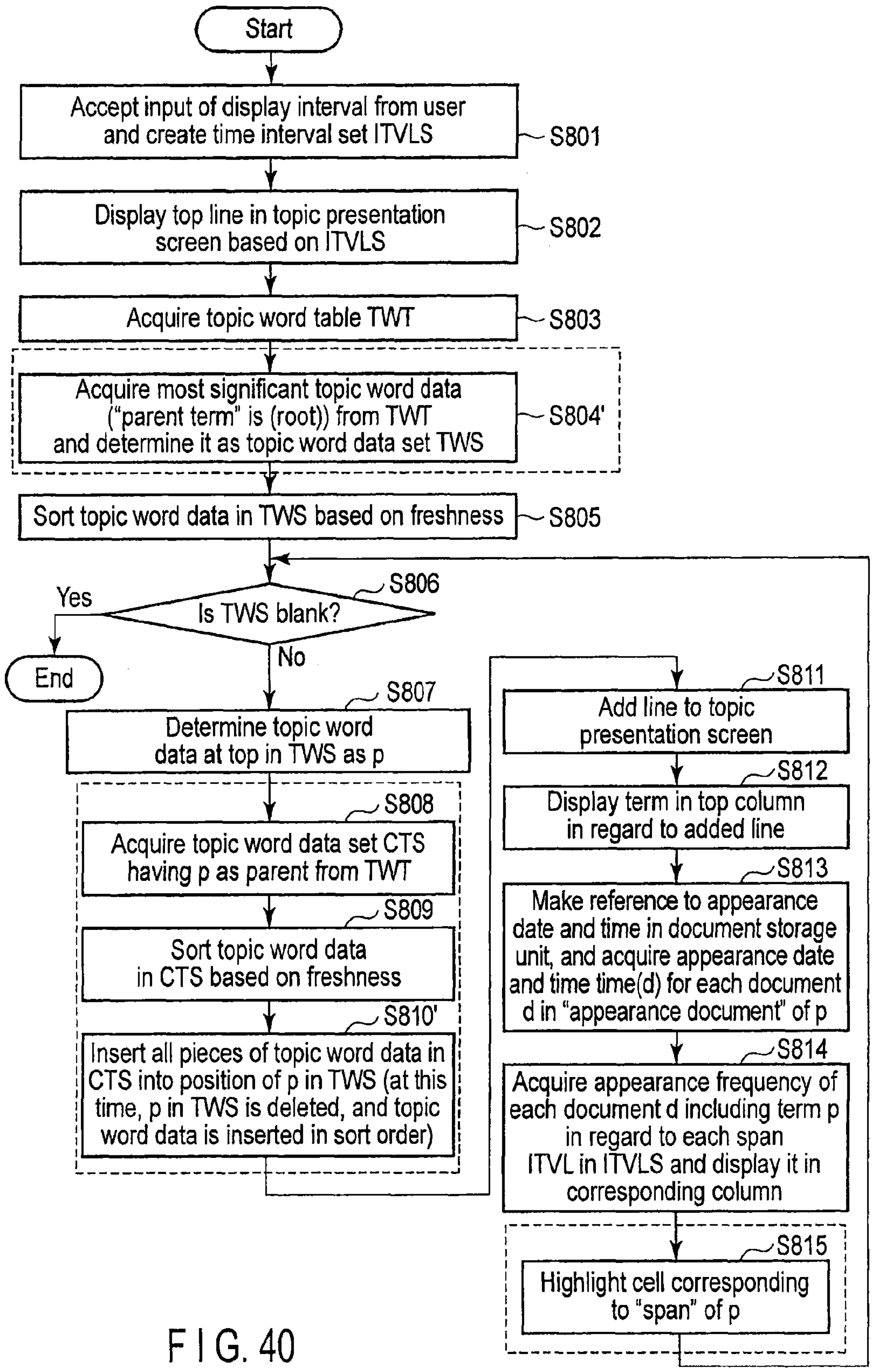
FIG. 40 is a flowchart showing a flow of topic presentation processing of processing in the seventh embodiment.

Further, the topic presentation processing is executed with a step S815 of highlighting the burst span BST as shown in FIG. 40.

As a result, a topic presentation screen G70 in which a hierarchical structure of topic words is clearly shown and each burst span is emphasized is presented as shown in FIG. 41.

As described above, according to this embodiment, the effects of the first, third, and fifth embodiments can be obtained at the same time.

<Eighth Embodiment>

FIG. 42 is a block diagram showing a configuration of a topic extraction apparatus according to an eighth embodiment.

This embodiment is an example of combining the first embodiment with the fourth and the fifth embodiments, and the topic extraction unit 30 shown in FIG. 1 further comprises the topic word aggregation unit 34 and the topic word hierarchy extraction unit 35 depicted in FIG. 24 and the burst span extraction unit 32 shown in FIG. 29.

According to the above-described configuration, as shown in FIG. 43, after the burst span extraction processing (the step S400), the topic word aggregation processing (the step S600) and the topic word hierarchy extraction processing (the step S700) are executed. That is, in each processing (each of the steps S600 and S700), like the sixth and seventh embodiments, similarity sim(TWi, TWj), co-occurrence similarity co(termi, termj, Dbsti∪Dbstj), co-occurrence span rate cospanrate(BSTi, BSTj), relevance rel(TWi, TWj), and a mutual information amount mi(termi, termj, Dbsti∪Dbstj) are calculated based on the burst span BST in place of the span SPN.

As a result, a topic presentation screen G80 in which topic words are aggregated, a hierarchical structure of the topic words is clearly shown, and each burst span is emphasized is presented as shown in FIG. 44.

As described above, according to this embodiment, the effects of the first, fourth, and fifth embodiments can be obtained at the same time.

In addition, terms representing a topic are extracted as topic words, the topic words concerning the same topic are aggregated, and they are hierarchized in accordance with the number of documents or a temporal scale, thereby accurately grasping an entire image or particulars of the topic with a time transition. Furthermore, when the same topics are hierarchized in accordance with each lively timing, it is possible to present relevance between topics that differ depending on each timing.

According to at least one embodiment described above, it is possible to present a transition of topics during a designated target span.

The method described in the embodiment can also be stored in a storage medium such as a magnetic disk (Floppy™ disk, hard disk, or the like), an optical disk (CD-ROM, DVD, or the like), a magneto-optical disk (MO), or a semiconductor memory as a program which can be executed by a computer and distributed.

As the storage medium, any configuration which is a computer-readable storage medium in which a program can be stored may be used regardless of a storage format.

An OS (operating system) which operates on a computer on the basis of an instruction of a program installed from the storage medium in the computer, database management software, and MW (middleware) such as network software may execute a part of the processes to realize the embodiment.

Furthermore, the storage medium according to the present invention includes not only a medium independent of a computer but also a storage medium in which a program transmitted through a LAN, the Internet, or the like is downloaded and stored or temporarily stored.

The number of storage media is not limited to one. A case in which the process in the embodiment is executed from a plurality of media is included in the storage medium according to the present invention. Any medium configuration may be used.

A computer according to the present invention is to execute the processes in the embodiments on the basis of the program stored in a storage medium. The computer may have any configuration such as one apparatus constituted by a personal computer or a system in which a plurality of apparatuses are connected by a network.

A computer in each embodiment includes not only a personal computer but also an arithmetic processing apparatus, a microcomputer, or the like included in an information processing apparatus. The computer is a generic name of an apparatus and a device which can realize the functions of the present invention by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A topic extraction apparatus comprising:

a document storing device which stores a target document set comprising documents each having text information and date and time information;

a span designating device which accepts designation of a target span which is a target of topic extraction;

a topic extracting device which extracts a topic word which is a term representing a topic in the designated target span from the target document set stored in the document storing device, and calculates freshness as a scale representing topicality of each topic word; and a topic presenting device which presents the topic words extracted by the topic extracting device in order of the freshness, and also presents the number of documents in which each of presented topic word appears per unit span, wherein the topic extracting device comprises:

a term extracting device which extracts each term from the target document set stored in the document storing device, and calculates each of an appearance frequency of each term and a document frequency indicative of the number of documents in which each term appears; and a topic word extracting device which acquires a document set of appearance documents in which each term appears during the target span with respect to each term extracted by the term extracting device, calculates a topic degree which is a scale representing topic word identity based on a value representing significance of the appearance frequency of each appearance document and a weighted value of each term based on the appearance frequency of the term and the document frequency, extracts each term whose topic degree is not lower than a predetermined value as a topic word, and calculates freshness of the extracted topic word based on an appearance date and time during the target span.

2. The apparatus according to claim 1, wherein the topic extracting device further comprises a topic word aggregating device which calculates similarity between topic words based on each appearance document during the target span and the appearance frequency and the date and time information of the appearance document with respect to each topic word extracted by the topic word extracting device, extracts a topic word group consisting of topic words representing the same topic during the target span based on the similarity, acquires a document set of the appearance documents during the target span in regard to the topic word group, and recalculates the topic degree and the freshness based on the frequency information and the date and time information of the document set.

3. The apparatus according to claim 2, wherein the topic extracting device further comprises a topic word hierarchy extracting device which calculates relevance between topic words based on the appearance frequency and the date and time information of each appearance document during the target span in regard to the topic words extracted by the topic word extracting device, and extracts a hierarchical relationship between the topic words based on the relevance, and the topic presenting device presents a parent-child relationship between the topic words and also presents the topic words having a sibling relationship in order of the freshness in accordance with the hierarchical relationship between the topic words extracted by the topic word hierarchy extracting device.

4. The apparatus according to claim 3, wherein the topic extracting device further comprises a burst span extracting device which acquires a series of appearance dates and times in the document set of the appearance documents in regard to each term extracted by the term extracting device, extracts each of burst spans in which each term intensively appears by using the series of appearance dates and times, and holds a pair of the term and each burst span as a different term, the topic word extracting device does not acquire a document set of appearance documents in which each term appears during the target span in regard to terms extracted by the burst span extracting device in the respective terms extracted by the term extracting device, but acquires a document set of appearance documents in which each term appears during the burst span based on each pair of the term extracted by the burst span extracting device and each burst span, calculates a topic degree based on the value representing the significance of the appearance frequency of each appearance document and the weighted value, extracts each term whose topic degree is not lower than a predetermined value as a topic word, and calculates freshness with respect to each extracted topic word based on the series of the appearance dates and times during each burst span, and the topic presenting device highlights a portion of each presented topic word corresponding to the burst span extracted by the burst span extracting device.

5. The apparatus according to claim 1, wherein the topic extracting device further comprises a topic word hierarchy extracting device which calculates relevance between topic words based on the appearance frequency and the date and time information of each appearance document during the target span in regard to the topic words extracted by the topic word extracting device, and extracts a hierarchical relationship between the topic words based on the relevance, and the topic presenting device presents a parent-child relationship between the topic words and also presents the topic words having a sibling relationship in order of the freshness in accordance with the hierarchical relationship between the topic words extracted by the topic word hierarchy extracting device.

6. The apparatus according to claim 5, wherein the topic extracting device further comprises a burst span extracting device which acquires a series of appearance dates and times in the document set of the appearance documents in regard to each term extracted by the term extracting device, extracts each of burst spans in which each term intensively appears by using the series of appearance dates and times, and holds a pair of the term and each burst span as a different term, the topic word extracting device does not acquire a document set of appearance documents in which each term appears during the target span in regard to terms extracted by the burst span extracting device in the respective terms extracted by the term extracting device, but acquires a document set of appearance documents in which each term appears during the burst span based on each pair of the term extracted by the burst span extracting device and each burst span, calculates a topic degree based on the value representing the significance of the appearance frequency of each appearance document and the weighted value, extracts each term whose topic degree is not lower than a predetermined value as a topic word, and calculates freshness with respect to each extracted topic word based on the series of the appearance dates and times during each burst span, and the topic presenting device highlights a portion of each presented topic word corresponding to the burst span extracted by the burst span extracting device.

7. The apparatus according to claim 1, wherein the topic extracting device further comprises a burst span extracting device which acquires a series of appearance dates and times in the document set of the appearance documents in regard to each term extracted by the term extracting device, extracts each of burst spans in which each term intensively appears by using the series of appearance dates and times, and holds a pair of the term and each burst span as a different term, the topic word extracting device does not acquire a document set of appearance documents in which each term appears during the target span in regard to terms extracted by the burst span extracting device in the respective terms extracted by the term extracting device, but acquires a document set of appearance documents in which each term appears during the burst span based on each pair of the term extracted by the burst span extracting device and each burst span, calculates a topic degree based on the value representing the significance of the appearance frequency of each appearance document and the weighted value, extracts each term whose topic degree is not lower than a predetermined value as a topic word, and calculates freshness with respect to each extracted topic word based on the series of the appearance dates and times during each burst span, and the topic presenting device highlights a portion of each presented topic word corresponding to the burst span extracted by the burst span extracting device.

8. The apparatus according to claim 2, wherein the topic extracting device further comprises a burst span extracting device which acquires a series of appearance dates and times in the document set of the appearance documents in regard to each term extracted by the term extracting device, extracts each of burst spans in which each term intensively appears by using the series of appearance dates and times, and holds a pair of the term and each burst span as a different term, the topic word extracting device does not acquire a document set of appearance documents in which each term appears during the target span in regard to terms extracted by the burst span extracting device in the respective terms extracted by the term extracting device, but acquires a document set of appearance documents in which each term appears during the burst span based on each pair of the term extracted by the burst span extracting device and each burst span, calculates a topic degree based on the value representing the significance of the appearance frequency of each appearance document and the weighted value, extracts each term whose topic degree is not lower than a predetermined value as a topic word, and calculates freshness with respect to each extracted topic word based on the series of the appearance dates and times during each burst span, and the topic presenting device highlights a portion of each presented topic word corresponding to the burst span extracted by the burst span extracting device.

9. A non-transitory computer-readable storage medium storing a program which is executed by a processor of a topic extraction apparatus comprising a document storing device which stores a target document set consisting of documents each having text information and date and time information, the program comprising:

a first program code which allows the processor to execute topic extraction processing of accepting designation of a target span which is a target of topic extraction;

a second program code which allows the processor to execute processing of extracting each topic word that is a term representing a topic during the designated target span from the target document set stored in the document storing device, and calculating freshness which is a scale representing topicality with respect to each topic word; and a third program code which allows the processor to execute processing of presenting the topic words extracted by the topic word extraction processing in order of the freshness, and also presenting the number of documents in which each of presented topic word appears per unit span, and the topic extraction processing comprises:

extracting each term from the target document set stored in the document storing device;

term extraction processing of calculating an appearance frequency of each term and a document frequency representing the number of documents in which each term appears; and topic word extraction processing of acquiring a document set of appearance documents in which each term appears during the target span with respect to each term extracted by the term extraction processing, calculating a topic degree which is a scale representing a topic word identity based on a value representing significance of the appearance frequency of each appearance document and a weighted value of each term based on the appearance frequency of each term and the document frequency, extracting each term whose topic degree is not lower than a predetermined value as a topic word, and calculating freshness based on an appearance date and time of each extracted topic word during the target span.

10. A topic extraction apparatus comprising:

a document memory which stores a target document set comprising documents each having text information and date and time information; and processing circuitry configured to:

receive information designating a target span in a target of topic extraction;

extract a topic word which is a term representing a topic in the target span from the target document set, and calculate freshness as a scale representing topicality of each topic word; and determine an order of freshness of extracted topic words and a number of documents in which each of presented topic word appears per unit span, extract each term from the target document set and calculate each of an appearance frequency of each term and a document frequency indicative of a number of documents in which each term appears; and acquire a document set of appearance documents in which each term appears during the target span with respect to each extracted term, calculate a topic degree which is a scale representing topic word identity based on a value representing significance of the appearance frequency of each appearance document and a weighted value of each term based on the appearance frequency of the term and the document frequency, extract each term whose topic degree is not lower than a predetermined value as a topic word, and calculate freshness of the extracted topic word based on an appearance date and time during the target span.

11. The apparatus according to claim 10, wherein the processing circuitry is further configured to:

calculate a similarity between topic words based on each appearance document during the target span and the appearance frequency and the date and time information of the appearance document with respect to each extracted topic word, extract a topic word group consisting of topic words representing the same topic during the target span based on the similarity, acquire a document set of the appearance documents during the target span in regard to the topic word group, and recalculate the topic degree and the freshness based on the frequency information and the date and time information of the document set.

12. The apparatus according to claim 11, wherein the processing circuitry is further configured to:

calculate relevance between topic words based on the appearance frequency and the date and time information of each appearance document during the target span in regard to the extracted topic words, extract a hierarchical relationship between the topic words based on the relevance, and presents a parent-child relationship between the topic words and also presents the topic words having a sibling relationship in order of the freshness in accordance with the hierarchical relationship between the extracted topic words.

13. The apparatus according to claim 12, wherein the processing circuitry is further configured to:

acquire a series of appearance dates and times in the document set of the appearance documents in regard to each extracted term, and extracts each of burst spans in which each term appears by using the series of appearance dates and times, and holds a pair of the term and each burst span as a different term, wherein the processing circuitry does not acquire a document set of appearance documents in which each term appears during the target span in regard to the different terms in the respective extracted terms, but acquires a document set of appearance documents in which each term appears during the burst span based on each pair, calculates a topic degree based on the value representing the significance of the appearance frequency of each appearance document and the weighted value, extracts each term whose topic degree is not lower than a predetermined value as a topic word, and calculates freshness with respect to each extracted topic word based on the series of the appearance dates and times during each burst span, and highlights a portion of each presented topic word corresponding to the burst span.

14. The apparatus according to claim 11, wherein the processing circuitry is further configured to:

acquire a series of appearance dates and times in the document set of the appearance documents in regard to each extracted term, extracts each of burst spans in which each term appears by using the series of appearance dates and times, and holds a pair of the term and each burst span as a different term, wherein the processing circuitry does not acquire a document set of appearance documents in which each term appears during the target span in regard to the different terms, but acquires a document set of appearance documents in which each term appears during the burst span based on each pair, calculates a topic degree based on the value representing the significance of the appearance frequency of each appearance document and the weighted value, extracts each term whose topic degree is not lower than a predetermined value as a topic word, and calculates freshness with respect to each extracted topic word based on the series of the appearance dates and times during each burst span, and highlights a portion of each presented topic word corresponding to the burst span.

15. The apparatus according to claim 10, wherein the processing circuitry is further configured to:

calculate relevance between topic words based on the appearance frequency and the date and time information of each appearance document during the target span in regard to the extracted topic words, and extracts a hierarchical relationship between the topic words based on the relevance, and determines a parent-child relationship between the topic words and determines the topic words having a sibling relationship in order of the freshness in accordance with the hierarchical relationship.

16. The apparatus according to claim 15, wherein the processing circuitry is further configured to:

acquire a series of appearance dates and times in the document set of the appearance documents in regard to each extracted term, extracts each of burst spans in which each term appears by using the series of appearance dates and times, and holds a pair of the term and each burst span as a different term, wherein the processing circuitry does not acquire a document set of appearance documents in which each term appears during the target span in regard to the different terms, but acquires a document set of appearance documents in which each term appears during the burst span based on each pair of the term, calculates a topic degree based on the value representing the significance of the appearance frequency of each appearance document and the weighted value, extracts each term whose topic degree is not lower than a predetermined value as a topic word, and calculates freshness with respect to each extracted topic word based on the series of the appearance dates and times during each burst span, and highlights a portion of each presented topic word corresponding to the burst span.

17. The apparatus according to claim 10, wherein the processing circuitry is further configured to:

acquire a series of appearance dates and times in the document set of the appearance documents in regard to each extracted term, extracts each of burst spans in which each term appears by using the series of appearance dates and times, and holds a pair of the term and each burst span as a different term, wherein the processing circuitry does not acquire a document set of appearance documents in which each term appears during the target span in regard to the different terms, but acquires a document set of appearance documents in which each term appears during the burst span based on each pair, calculates a topic degree based on the value representing the significance of the appearance frequency of each appearance document and the weighted value, extracts each term whose topic degree is not lower than a predetermined value as a topic word, and calculates freshness with respect to each extracted topic word based on the series of the appearance dates and times during each burst span, and highlights a portion of each presented topic word corresponding to the burst span.

* * * * *